US007024302B2

(12) United States Patent
Mizuno et al.

(10) Patent No.: US 7,024,302 B2
(45) Date of Patent: Apr. 4, 2006

(54) AIR-FUEL RATIO CONTROL SYSTEM AND METHOD FOR AN INTERNAL COMBUSTION ENGINE, AND ENGINE CONTROL UNIT

(75) Inventors: Takahide Mizuno, Saitama-ken (JP); Yuji Yasui, Saitama-ken (JP); Hidetaka Maki, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/958,553

(22) Filed: Oct. 6, 2004

(65) Prior Publication Data

US 2005/0075781 A1 Apr. 7, 2005

(30) Foreign Application Priority Data

Oct. 6, 2003 (JP) ............................ 2003-347047
Sep. 10, 2004 (JP) ............................ 2004-264348

(51) Int. Cl.
*G05D 1/00* (2006.01)
*F02M 41/14* (2006.01)

(52) U.S. Cl. ............................................ 701/109

(58) Field of Classification Search ................ 701/109, 701/108, 115; 123/478, 480, 674; 60/274, 60/285

See application file for complete search history.

(56) References Cited

U.S. PATENT DOCUMENTS 4,314,534 A * 2/1982 Nakajima et al. ........... 123/438
4,513,721 A * 4/1985 Ina et al. .................... 123/478
5,404,718 A * 4/1995 Orzel et al. ................... 60/274
6,021,767 A * 2/2000 Yasui et al. ................. 123/674

* cited by examiner

*Primary Examiner*—Hieu T. Vo
(74) *Attorney, Agent, or Firm*—Squire, Sanders & Dempsey L.L.P.

(57) ABSTRACT

An air-fuel ratio control system for an internal combustion engine, which is capable of quickly and properly eliminating variation in air-fuel ratio between a plurality of cylinders. The air-fuel ratio control system 1 controls the amount of fuel to be supplied to first to fourth cylinders #1 to #4, on a cylinder-by-cylinder basis, thereby controlling the air-fuel ratio of a mixture supplied to each of the cylinders. A LAF sensor 14 delivers to an ECU 2 an output KACT indicative of the air-fuel ratio of exhaust gases emitted from the cylinders and merged. A cycle filter 23*a* and a rotation filter 23*b* filters the output KACT from the LAF sensor 14 such that components in respective bands of a first frequency fr1 and a second frequency fr2 are allowed to pass therethrough. A final fuel injection amount $TOUT_i$ is determined, on a cylinder-by-cylinder basis, according to a first filtered value KACT_Fc or a second filtered value KACT_Fr such that the amplitude of the filtered value KACT_Fc or KACT_Fr converges to a predetermined value.

42 Claims, 37 Drawing Sheets

F I G. 3

$$KACT_i(k) = b0_i(k) \cdot KSTR_i(k-3) + r1_i(k) \cdot KSTR_i(k-4) + r2_i(k) \cdot KSTR_i(k-5) + r3_i(k) \cdot KSTR_i(k-6) + s0_i(k) \cdot KACT_i(k-3) \quad \cdots\cdots (1)$$

$$KSTR_i(k) = \frac{1}{b0_i(k)} \left\{ KCMD_i(k) - r1_i(k) \cdot KSTR_i(k-1) - r2_i(k) \cdot KSTR_i(k-2) - r3_i(k) \cdot KSTR_i(k-3) - s0_i(k) \cdot KACT_i(k) \right\} \quad \cdots\cdots (2)$$

$$\theta_i(k) = \theta_i(k-1) + KP_i(k) \cdot ide_i(k) \quad \cdots\cdots (3)$$

$$\theta_i(k)^T = [b0_i(k), r1_i(k), r2_i(k), r3_i(k), s0_i(k)] \quad \cdots\cdots (4)$$

$$ide_i(k) = KACT_i(k) - KACT\_HAT_i(k) \quad \cdots\cdots (5)$$

$$KACT\_HAT_i(k) = \theta_i(k-1)^T \cdot \zeta_i(k) \quad \cdots\cdots (6)$$

$$\zeta_i(k)^T = [KSTR_i(k-3), KSTR_i(k-4), KSTR_i(k-5), KSTR_i(k-6), KACT_i(k-3)] \quad \cdots\cdots (7)$$

$$KP_i(k) = \frac{P_i(k) \cdot \zeta_i(k)}{1 + \zeta_i(k)^T \cdot P_i(k) \cdot \zeta_i(k)} \quad \cdots\cdots (8)$$

$$P_i(k+1) = \frac{1}{\lambda_1} \left[ I - \frac{\lambda_2 \cdot P_i(k) \cdot \zeta_i(k) \cdot \zeta_i(k)^T}{\lambda_1 + \lambda_2 \cdot \zeta_i(k)^T \cdot P_i(k) \cdot \zeta_i(k)} \right] P_i(k) \quad \cdots\cdots (9)$$

I : UNIT MATRIX $\lambda_1, \lambda_2$ : WEIGHTING PARAMETER

F I G. 4

$$\theta\_ave(n) = \frac{1}{\alpha+1}\{\theta buf(n) + \cdots + \theta buf(n-\alpha)\} \quad \cdots\cdots (10)$$

$$\theta\_ave(n)^T = [b0\_ave(n), r1\_ave(n), r2\_ave(n), r3\_ave(n), s0\_ave(n)] \quad \cdots\cdots (11)$$

$$KSTR(n) = \frac{1}{b0\_ave(n)}\{KCMD(n) - r1\_ave(n) \cdot KSTR(n-4) - r2\_ave(n) \cdot KSTR(n-8) - r3\_ave(n) \cdot KSTR(n-12) - s0\_ave(n) \cdot KACT(n)\} \quad \cdots\cdots (12)$$

$$\theta_i(k) = \theta_i(k-1) + KP_i(k) \cdot ide_i(k) \quad \cdots\cdots (13)$$

$$\theta_i(k)^T = [b0_i(k), r1_i(k), r2_i(k), r3_i(k), s0_i(k)] \quad \cdots\cdots (14)$$

$$ide_i(k) = KACT_i(k) - KACT\_HAT_i(k) \quad \cdots\cdots (15)$$

$$KACT\_HAT_i(k) = \theta_i(k-1)^T \cdot \zeta_i(k) \quad \cdots\cdots (16)$$

$$\begin{aligned}\zeta_i(k)^T &= [KSTR_i(k-3), KSTR_i(k-4), KSTR_i(k-5), KSTR_i(k-6), KACT_i(k-3)] \\ &= [KSTR_i(n-12), KSTR_i(n-16), KSTR_i(n-20), KSTR_i(n-24), KACT_i(n-12)]\end{aligned} \quad \cdots\cdots (17)$$

$$KP_i(k) = \frac{P_i(k) \cdot \zeta_i(k)}{1 + \zeta_i(k)^T \cdot P_i(k) \cdot \zeta_i(k)} \quad \cdots\cdots (18)$$

$$P_i(k+1) = \frac{1}{\lambda_1}\left[I - \frac{\lambda_2 \cdot P_i(k) \cdot \zeta_i(k) \cdot \zeta_i(k)^T}{\lambda_1 + \lambda_2 \cdot \zeta_i(k)^T \cdot P_i(k) \cdot \zeta_i(k)}\right] P_i(k) \quad \cdots\cdots (19)$$

I : UNIT MATRIX $\lambda_1, \lambda_2$ : WEIGHTING PARAMETER

FIG. 13

$$KACT\_Fc(m)=b0c \cdot KACT(m)+b1c \cdot KACT(m-1)+\cdots+bpc \cdot KACT(m-p) +a1c \cdot KACT\_Fc(m-1)+a2c \cdot KACT\_Fc(m-2)+\cdots+aqc \cdot KACT\_Fc(m-q) \quad \cdots\cdots (20)$$

$$KACT\_Fr(m)=b0r \cdot KACT(m)+b1r \cdot KACT(m-1)+\cdots+bpr \cdot KACT(m-p) +a1r \cdot KACT\_Fr(m-1)+a2r \cdot KACT\_Fr(m-2)+\cdots+aqr \cdot KACT\_Fr(m-q) \quad \cdots\cdots (21)$$

b0c, b1c, bpc, a1c, a2c, aqc, b0r, b1r, bpr, a1r, a2r, aqr : FILTER COEFFICIENT $$KACT\_Fcd(m)=Ac \cdot |KACT\_Fc(m)|+(1-Ac) \cdot |KACT\_Fcd(m-1)| \quad \cdots\cdots (22)$$

$$KACT\_Frd(m)=Ar \cdot |KACT\_Fr(m)|+(1-Ar) \cdot |KACT\_Frd(m-1)| \quad \cdots\cdots (23)$$

Ac, Ar : AVERAGING COEFFICIENT $$keaf_i=1-FI \cdot KACT\_F_i(n)-GI \cdot \sum_{j=0}^{J} KACT\_F_i(n-4j)-HI \cdot [KACT\_F_i(n)-KACT\_F_i(n-4)] \quad \cdots\cdots (24)$$

FI, GI, HI : FEEDBACK GAIN $$KEAFave=\frac{1}{mc} \cdot \sum_{i=1}^{mc} keaf_i \quad \cdots\cdots (25)$$

mc : CYLINDER COUNT $$KEAF_i=\frac{keaf_i}{KEAFave} \quad \cdots\cdots (26)$$

FIG. 34

$$keaf_i = 1 - FS \cdot \sigma_i(n) - GS \cdot \sum_{j=0}^{n} \sigma_i(j) - HS \cdot e_i(n) \quad \cdots\cdots (28)$$

$$e_i(n) = KACT\_F_i(n) - KACT\_F_i(n-4) \quad \cdots\cdots (29)$$

$$\sigma_i(n) = e_i(n) + S \cdot e_i(n-1) \quad \cdots\cdots (30)$$

$\sigma_i(n)$ : SWITCHING FUNCTION
FS, GS, HS : FEEDBACK GAIN
S : SWITCHING FUNCTION-SETTING PARAMETER

F I G. 38

| | SMALL ← | $NE_i'(n-e)$ | LARGE → |
|---|---|---|---|
| LARGE ↑ | $KMEM_i11$ | ⋯ | $KMEM_i1\beta$ |
| $PB_i'(n-e)$ | ⋮ | ⋱ | ⋮ |
| SMALL ↓ | $KMEM_i\alpha 1$ | ⋯ | $KMEM_i\alpha\beta$ |

AIR-FUEL RATIO CONTROL SYSTEM AND METHOD FOR AN INTERNAL COMBUSTION ENGINE, AND ENGINE CONTROL UNIT

BACKGROUND OF THE INVENTION

1. Field of the Invention

The present invention relates to an air-fuel ratio control system and method for an internal combustion engine, and an engine control unit, which control the amount of fuel to be supplied to a plurality of cylinders, on a cylinder-by-cylinder basis, to thereby control the air-fuel ratio of a mixture supplied to each of the cylinders.

2. Description of the Related Art

In general, in an internal combustion engine, if the air-fuel ratio of a mixture supplied to a plurality of cylinders varies between the cylinders due to malfunction of an injector, an EGR system, or an evaporative fuel progressing system, the emission reduction rate of a three-way catalyst is degraded, which increases harmful substances in exhaust gases emitted into the air. To eliminate the inconvenience, there has conventionally been proposed an air-fuel ratio control system e.g. in Japanese Laid-Open Patent Publication (Kokai) No. 2002-213284, which controls the air-fuel ratios of mixtures supplied to the cylinders such that they become equal to each other. This air-fuel ratio control system is comprised of an air-fuel ratio sensor disposed in an exhaust pipe to detect the concentration of oxygen in exhaust gases and output a signal indicative of the sensed oxygen concentration, first and second bandpass filters to which the output from the air-fuel ratio sensor is input, a control unit connected to the first and second bandpass filters, and a plurality of injectors connected to the control unit to supply fuel to the cylinders.

The first and second bandpass filters filter the output from the air-fuel ratio sensor such that components thereof in predetermined frequency bands different from each other are allowed to pass through the filters. The control unit calculates the oxygen concentration of exhaust gases emitted from each cylinder and a target value of the oxygen concentration of the exhaust gases, on a cylinder-by-cylinder basis, based on the filtered values of the output from the air-fuel ratio sensor. Then, the control unit determines the difference between the calculated oxygen concentration of the exhaust gases and the calculated target value of the oxygen concentration, on a cylinder-by-cylinder deviation, and controls the fuel injection amount of the injector of each cylinder based on the difference, to thereby control the oxygen concentrations of exhaust gases from the respective cylinders, i.e. the air-fuel ratios of mixtures supplied to the respective cylinders (hereinafter referred to as "the air-fuel ratios associated with the respective cylinders" or the like), such that they become equal to each other. The amount of fuel injected from each injector is thus controlled based on the values of the output from the air-fuel ratio sensor subjected to filtering by the first and second bandpass filters with a view to enhancing the robustness of the air-fuel ratio control by eliminating noise components generated due to the pressure of exhaust gases and the manufacturing tolerance or wear of intake valves from the output from the air-fuel ratio sensor by the filtering operations of the filters.

However, in the conventional control system described above, the amount of fuel injected from each injector is controlled based on the difference between the oxygen concentration of exhaust gases from the corresponding cylinder and a predetermined target value set when the cylinder-by-cylinder oxygen concentration is determined. Therefore, when the difference is very large, it takes long time for the oxygen concentrations of exhaust gases from all the cylinders to converge to the target value. As a result, it takes a longer time period to eliminate variation in air-fuel ratio between the cylinders, resulting in an increase in the amount of harmful substances emitted from the engine during the time period.

SUMMARY OF THE INVENTION

It is an object of the present invention to provide an air-fuel ratio control system and method for an internal combustion engine, and an engine control unit, which are capable of quickly and properly eliminating variation in air-fuel ratio between a plurality of cylinders.

To attain the above object, in a first aspect of the present invention, there is provided an 1. An air-fuel ratio control system for an internal combustion engine, which controls an amount of fuel to be supplied to a plurality of cylinders on a cylinder-by-cylinder basis, thereby controlling an air-fuel ratio of a mixture supplied to each of the cylinders, comprising:

an air-fuel ratio sensor that outputs a detection signal indicative of an air-fuel ratio of exhaust gases which have been emitted from the cylinders and merged;

a bandpass filter that filters the detection signal output from the air-fuel ratio sensor, such that a component of the detection signal in a predetermined frequency band is allowed to pass therethrough; and fuel amount-determining means for determining the amount of the fuel to be supplied, on a cylinder-by-cylinder basis, according to an output from the bandpass filter such that an amplitude of the output from the bandpass filter becomes equal to a predetermined value.

With the configuration of this air-fuel ratio control system, a detection signal output from the air-fuel ratio sensor, which is indicative of the sensed air-fuel ratio of the exhaust gases is filtered by the bandpass filter such that a component thereof in the predetermined frequency band is allowed to pass through the bandpass filter, and the amount of fuel to be supplied to the cylinders is determined, on a cylinder-by-cylinder basis, by the fuel amount-determining means according to the output from the bandpass filter such that the amplitude of the output becomes equal to a predetermined value.

The present invention is based on the following facts confirmed by experiment; Frequency analysis of the detection signal from the air-fuel ratio sensor showed that when there is variation in air-fuel ratio between the cylinders, the power spectral density the detection signal in a specific frequency band thereof becomes very high. On the other hand, when there is no variation in air-fuel ratio between the cylinders, the phenomenon that the power spectral density in the specific frequency band becomes very high does not occur. Further, when the detection signal from the air-fuel ratio sensor is filtered by a bandpass filter whose passband is set to the specific frequency band of which the power spectral density becomes high when there is variation in air-fuel ratio between the cylinders, the output from the bandpass filter exhibits a sinusoidal waveform in which the output changes across a value of 0 into the positive and negative regions when there is variation in air-fuel ratio between the cylinders, whereas when there is no variation in air-fuel ratio, the output from the bandpass filter is held at a value of 0. Furthermore, the sinusoidal output from the bandpass filter becomes positive at a time corresponding to emission of exhaust gases from a cylinder (hereinafter simply referred to as "time corresponding to a cylinder") to which is supplied a mixture having a richer air-fuel ratio than the air-fuel ratios of mixtures supplied to the other cylinders, whereas the same becomes negative at a time corresponding to a cylinder to which is supplied a mixture having a leaner air-fuel ratio. As is apparent from the above, the presence or absence of an amplitude of the output from the bandpass filter, i.e. a significant change in magnitude of the output indicates the presence or absence of variation in air-fuel ratio between the cylinders, and when the output from the bandpass filter has a significant amplitude, the relationship in air-fuel ratio between the cylinders can be identified based on the positive and negative values of the output.

Therefore, e.g. by setting the above-mentioned specific frequency band to the predetermined frequency band of the bandpass filter in the present invention, and determining the amount of fuel to be supplied to each cylinder, according to the output from the bandpass filter, such that the amplitude of the output becomes equal to a predetermined value, e.g. a value of 0, it is possible to properly eliminate variation in air-fuel ratio between the cylinders. For example, since the relationship in air-fuel ratio between the cylinders can be identified based on the positive and negative values of the output as described above, it is possible to reduce the amount of fuel to be supplied to a cylinder to which is supplied a mixture having a richer air-fuel ratio, and increase the amount of fuel to be supplied to a cylinder to which is supplied a mixture having a leaner air-fuel ratio, to thereby control the air-fuel ratios associated with the respective cylinders such that they are leveled off. This makes it possible to eliminate variation in air-fuel ratio between the cylinders more quickly than by the conventional method in which the oxygen concentrations of exhaust gases from all the cylinders are caused to converge to a predetermined target value.

Preferably, the bandpass filter comprises a plurality of bandpass filters arranged in parallel with each other for filtering the detection signal from the air-fuel ratio sensor such that components thereof in a plurality of frequency bands different from each other are allowed to pass through the respective bandpass filters, and the air-fuel ratio control system further comprise filter-selecting means for selecting one of the bandpass filters based on an output from at least one of the bandpass filters, wherein the fuel amount-determining means determines the amount of the fuel to be supplied, according to the output from the selected one of the bandpass filters such that the amplitude of the output from the one of the bandpass filters becomes equal to the predetermined value.

With the configuration of the preferred embodiment, the detection signal from the air-fuel ratio sensor is filtered by the bandpass filters arranged in parallel with each other such that components of the detection signal in a plurality of frequency bands different from each other are allowed to pass through the respective bandpass filters, and one of the bandpass filters is selected based on an output from at least one of the bandpass filters. Further, the amount of the fuel to be supplied is determined by the fuel amount-determining means according to the output from the selected one of the bandpass filters such that the amplitude of the output from the bandpass filter becomes equal to the predetermined value. This preferred embodiment is based on the following facts confirmed by experiment; When there is variation in air-fuel ratio between the cylinders, the specific frequency band defining the component indicative of the presence of the variation in air-fuel ratio varies e.g. between a case where the air-fuel ratio associated with only one of four cylinders is different from those associated with the other cylinders and a case where the air-fuel ratios associated with two cylinders which are supplied with mixtures having an identical air-fuel ratio are different from those associated with the other two cylinders which are supplied with mixtures having an identical air-fuel ratio. Thus, the specific frequency band for defining the component indicative of the presence or absence of variation in air-fuel ratio between the cylinders depends on the variation pattern.

Therefore, e.g. by setting specific frequency bands corresponding respectively to all patterns of variation in air-fuel ratio between the cylinders as respective predetermined frequency bands of the bandpass filters, it is possible to indicate the presence or absence of variation in air-fuel ratio between the cylinders by the amplitude of an output from one of the bandpass filters, whichever an actual variation pattern may be, and identify the relationship in air-fuel ratio between the cylinders. A bandpass filter excellently indicating the presence or absence of variation in air-fuel ratio between the cylinders is selected based on the outputs from the respective bandpass filters, and the amount of fuel to be supplied is determined based on the output from the selected bandpass filter, whereby variation in air-fuel ratio between the cylinders can be eliminated quickly and properly in any variation pattern.

More preferably, 3. An air-fuel ratio control system as claimed in claim 2, further comprising weighted average value-calculating means for calculating a weighted average value of an output from each of the bandpass filters by calculating a weighted average of an absolute value of an immediately preceding value of the weighted average value and an absolute value of a current value of the output from the bandpass filter, and wherein the filter-selecting means selects the one of the bandpass filters based on at least one of the calculated weighted average values.

With the configuration of this preferred embodiment, the weighted average value of an output from each of the bandpass filters is calculated by calculating a weighted average of the absolute value of the immediately preceding value of the weighted average value and the absolute value of the current value of the output from the bandpass filter. Further, one of the bandpass filters is selected, based on at least one of the calculated weighted average values, for use in determining the amount of fuel to be supplied.

In a case where the bandpass filters having the respective predetermined frequency bands different from each other are employed as in the above-described preferred embodiment, when variation in air-fuel ratio occurs between the cylinders in a variation pattern, an output from a bandpass filter other than a selected one can temporarily indicate the presence of the variation in air-fuel ratio between the cylinders more excellently. In such a case, in determining the amount of fuel to be supplied, if the bandpass filter is selected immediately in direct response to the outputs from the respective bandpass filters, there is a fear of the frequency of switching between bandpass filters being increased, which takes a longer time period to eliminate the variation in air-fuel ratio between the cylinders. However, with the configuration of the present preferred embodiment, one of the bandpass filters is selected based on at least one of the weighted average values calculated as described above, so that even if air-fuel ratios associated with the cylinders have changed temporarily, the influence of the changes can be accommodated by the weighted average. As a result, frequent switching between bandpass filters can be prevented, and therefore, even when air-fuel ratios associated with the cylinders have changed temporarily, it is possible to quickly and properly eliminate variation in air-fuel ratio between the cylinders.

Preferably, the bandpass filter comprises a plurality of bandpass filters arranged in parallel with each other for filtering the detection signal from the air-fuel ratio sensor such that components thereof in a plurality of frequency bands different from each other are allowed to pass through the respective bandpass filters, and the air-fuel ratio control system further comprises total-calculating means for calculating a total of outputs from the bandpass filters, wherein the fuel amount-determining means determines the amount of the fuel to be supplied, according to the calculated total, such that the total becomes equal to the predetermined value.

This preferred embodiment is based on the following facts confirmed by experiment; For example, in a variation pattern where the air-fuel ratio associated with only one cylinder (n-th cylinder) of the four cylinders is deviated toward the leaner side, the output from a bandpass filter which filters the detection signal from the air-fuel ratio sensor so as to allow the passage of the component thereof in a specific frequency band, which indicates variation in air-fuel ratio in this case, exhibits a sinusoidal waveform in which the output changes across a value of 0, reaching negative peaks at respective times corresponding to the n-th cylinder and reaching positive peaks at respective times corresponding to an (n+2)-th cylinder which is the second cylinder to perform combustion after the n-th cylinder, even though there is no deviation in air-fuel ratio in this cylinder. Further, when a plurality of bandpass filters allowing the passage of components in predetermined frequency bands different from each other are employed by using other bandpass filters in addition to the above-mentioned bandpass filter to filter the detection signal from the air-fuel ratio sensor, the total sum of outputs from the respective filters also exhibits a sinusoidal waveform, but the absolute value of each negative peak value that the total sum reaches at a time corresponding to the n-th cylinder is larger than that of the corresponding negative peak value of the output from the above-mentioned bandpass filter, whereas a positive peak that the total sum reaches at a time corresponding to the (n+2)-th cylinder is smaller. In short, the total sum of the outputs represents a characteristic closer to actual variation in air-fuel ratio between the cylinders.

With the configuration of the present preferred embodiment described above, the bandpass filters arranged in parallel with each other filters the detection signal from the air-fuel ratio sensor such that components thereof in a plurality of frequency bands different from each other are allowed to pass through the respective bandpass filters, and the fuel amount-determining means determines the amount of the fuel to be supplied, according to the total of the amplitudes of the outputs from the respective bandpass filters such that the total becomes equal to the predetermined value. Therefore, by setting the predetermined frequency bands of the bandpass filters such that the total sum of the outputs from the bandpass filters represents a characteristic closer to actual variation in air-fuel ratio between the cylinders, and determining the amount of the fuel to be supplied to each of the cylinders such that the total of the outputs from the bandpass filters becomes equal to the predetermined value, e.g. a value of 0, it is possible to eliminate variation in air-fuel ratio between the cylinders quickly and properly.

Preferably, the fuel amount-determining means determines the amount of the fuel to be supplied, in a predetermined cycle, and the air-fuel ratio control system further comprises sampling means for sampling the detection signal from the air-fuel ratio sensor in a shorter cycle than the predetermined cycle and outputting the sampled detection signal to the bandpass filter.

With the configuration of this preferred embodiment, the detection signal from the air-fuel ratio sensor is sampled in a cycle equal to or shorter than the cycle in which the amount of the fuel to be supplied to each cylinder is determined, and the sampled value is output to the bandpass filter. Since the detection signal from the air-fuel ratio sensor is sampled in a cycle equal to or shorter than the cycle in which the amount of the fuel to be supplied to each cylinder is determined, i.e. a cycle in which exhaust gases are emitted from each cylinder, the detection signal from the air-fuel ratio sensor thus sampled represents changes in the air-fuel ratio of the exhaust gases emitted from each cylinder in a fine-grained manner. As a result, the output from the bandpass filter can indicate the presence or absence of variation in air-fuel ratio between the cylinders and represent the relationship in air-fuel ratio between the cylinders, in a finer-grained manner, which makes it possible to eliminate variation in air-fuel ratio between the cylinders more quickly and properly.

Preferably, the air-fuel ratio control system further comprises crank angle-detecting means for detecting a crank angle of the engine, and dead time-setting means for setting a dead time from emission of the exhaust gasses from the cylinders to arrival of the exhaust gasses at the air-fuel ratio sensor, with respect to the crank angle, wherein the fuel amount-determining means determines the amount of the fuel to be supplied, according to the output from the bandpass filter which is produced by filtering the detection signal from the air-fuel ratio sensor which is generated at a time of lapse of the set dead time after emission of exhaust gases from the cylinder.

With the configuration of this preferred embodiment, the dead time-setting means sets the dead time from emission of exhaust gasses from the cylinder to arrival of the exhaust gasses at the air-fuel ratio sensor with respect to the crank angle, and the fuel amount-determining means determines the amount of the fuel to be supplied to the cylinder according to the output from the bandpass filter having filtered the detection signal from the air-fuel ratio sensor which is generated at the time of the lapse of the set dead time after emission of exhaust gases from the cylinder. In the present invention, the air-fuel ratio sensor is disposed at a location where flows of exhaust gases emitted from the respective cylinders merge with each other, and hence dead time occurs between emission of exhaust gasses from the cylinder and arrival of the exhaust gasses at the air-fuel ratio sensor. For this reason, an output from the bandpass filter, generated based on the detection signal from the air-fuel ratio sensor which is generated at the time of the lapse of the dead time after emission of exhaust gases from each cylinder, is employed as the output from the air-fuel ratio sensor for use in determining the amount of fuel to be supplied to the cylinder, so that the amount of fuel to be supplied to each cylinder can be determined using the output excellently reflecting the air-fuel ratio of exhaust gases emitted from the corresponding cylinder. This makes it possible to properly determine the amount of fuel to be supplied to each cylinder while compensating for the dead time.

More preferably, the air-fuel ratio control system further comprises operating condition-detecting means for detecting an operating condition of the engine, and the dead time-setting means sets the dead time according to the detected operating condition of the engine.

The length of the dead time from emission of exhaust gasses from each cylinder to arrival of the exhaust gasses at the air-fuel ratio sensor varies with a change in the operating condition of the engine. With the configuration of this preferred embodiment, the dead time is set according to the detected operating condition of the engine in view of the above fact, so that it is possible to optimally obtain the output from the bandpass filter excellently reflecting the air-fuel ratio of exhaust gases emitted from each cylinder, while properly compensating for the dead time.

Preferably, the air-fuel ratio control system further comprises correction parameter-calculating means for calculating a correction parameter for correcting variation in air-fuel ratio between the cylinders, on a cylinder-by-cylinder basis, based on the output from the bandpass filter, average value-calculating means for calculating an average value of the correction parameters calculated, on a cylinder-by-cylinder basis, and correction coefficient-calculating means for calculating a cylinder-by-cylinder correction coefficient by dividing the correction parameter by the calculated average value of the correction parameters, and the fuel amount-determining means determines the amount of the fuel to be supplied, according to the calculated correction coefficient.

With the configuration of this preferred embodiment, the correction parameter-calculating means calculates the correction parameter for correcting variation in air-fuel ratio between the cylinders, on a cylinder-by-cylinder basis, based on the output from the bandpass filter, and the average value-calculating means calculates the average value of the correction parameters. Further, the correction coefficient-calculating means calculates the cylinder-by-cylinder correction coefficient by dividing the correction parameter by the calculated average value of the correction parameters, and the fuel amount-determining means determines the amount of the fuel to be supplied to each cylinder according to the calculated correction coefficient.

An output from the bandpass filter having filtered the detection signal from the air-fuel ratio sensor can contain noise. In such a case, if the output from the bandpass filter is directly used to calculate the cylinder-by-cylinder correction coefficient for correcting variation in air-fuel ratio between the cylinders, and the amount of the fuel to be supplied to each cylinder is determined according to the calculated correction coefficient, the influence of the noise can hinder correct calculation, which causes a change in the air-fuel ratio of a mixture supplied to each cylinder. According to the present preferred embodiment, the correction coefficient calculated by dividing the cylinder-by-cylinder correction parameter by the average value of the correction parameters is used to determine the amount of the fuel to be supplied to each cylinder, as described above. Therefore, even when noise is contained in an output from the bandpass filter, the influences of noise on the correction coefficients for the respective cylinders can be leveled off. As a result, the cylinder-by-cylinder correction coefficient can be properly calculated, which makes it possible to avoid changes in the air-fuel ratio associated with each cylinder.

Preferably, the air-fuel ratio control system further comprises operation characteristic-determining means for determining deviation from a predetermined operation characteristic of fuel supply systems for supplying fuel to the cylinders, on a cylinder-by-cylinder basis, based on the correction coefficient.

With the configuration of this preferred embodiment, the operation characteristic-determining means determines the cylinder-by-cylinder deviation from the predetermined operation characteristic of the fuel supply systems, based on the correction coefficient. The correction coefficient, which is calculated as a value obtained by leveling off the influences of noise contained in the bandpass filter, based on the correction parameter for correcting variation in air-fuel ratio between the cylinders, as described hereinbefore, represents the degree of original relative variation in air-fuel ratio between the cylinders. The original relative variation in air-fuel ratio between the cylinders occurs due to variation in the operation characteristic between the fuel supply systems for the cylinders, each including an injector and an intake valve. Therefore, according to the present preferred embodiment, it is possible to properly determine the cylinder-by-cylinder deviation in the predetermined operation characteristic of the fuel supply systems based on the cylinder-by-cylinder correction coefficient. Particularly when the determined deviation is too large, it is possible to determine that an injector or the like associated with the cylinder is not operating normally.

Preferably, the air-fuel ratio control system further comprises correction coefficient-calculating means for calculating a correction coefficient for correcting variation in air-fuel ratio between the cylinders based on the output from the bandpass filter, and correction coefficient-fixing means operable, when an absolute value of the output from the bandpass filter becomes smaller than a predetermined threshold value, for fixing the correction coefficient to a value of the correction coefficient calculated by the correction coefficient-calculating means immediately before the absolute value of the output from the bandpass filter has become smaller than the predetermined threshold value, wherein the fuel amount-determining means determines the amount of the fuel to be supplied, according to the correction coefficient.

With the configuration of this preferred embodiment, the correction coefficient for correcting variation in air-fuel ratio between the cylinders is calculated by the correction coefficient-calculating means, based on the output from the bandpass filter, and the amount of the fuel to be supplied to each cylinder is determined according to the calculated correction coefficient. When the amplitude of the output from the bandpass filter converges to a predetermined value, e.g. a value of 0, the variation in air-fuel ratio between the cylinders is eliminated. Further, when the absolute value of the output from the bandpass filter becomes smaller than the threshold value, the correction coefficient-fixing means fixedly holds the correction coefficient at the value calculated immediately before the absolute value of the output has become smaller than the threshold value.

The reason for this is as follows: An output from the bandpass filter having filtered the detection signal from the air-fuel ratio sensor usually contains noise, and hence even when the air-fuel ratios associated with the respective cylinders are equal to each other, the output from the bandpass filter does not completely converge to 0. Therefore, if the amount of the fuel to be supplied is continuously determined according to the correction coefficient calculated based on the output from the bandpass filter, the hunting phenomenon can occur in which after temporary elimination of variation in air-fuel ratio between the cylinders, the correction coefficient is changed due to noise contained in the output from the bandpass filter, which causes variation in air-fuel ratio between the cylinders again, and thereafter, the variation in air-fuel ratio is eliminated.

According to the present preferred embodiment, when the absolute value of the output from the bandpass filter has become smaller than the threshold value, i.e. when it is judged that variation in air-fuel ratio between the cylinders has been eliminated, the correction coefficient is fixedly held at the value calculated by the correction coefficient-calculating means immediately before the absolute value of the output has become smaller than the threshold value. This omits the calculation and update of the correction coefficient based on the output from the bandpass filter, whereby it is possible to prevent the correction coefficient from being changed due to noise contained in the output from the bandpass filter, to thereby avoid the above-described hunting phenomenon.

As described above, the amount of fuel to be supplied to each cylinder is determined according to the coefficient calculated based on the output from the bandpass filter, whereby variation in air-fuel ratio between the cylinders is eliminated, and thereafter, the coefficient calculated is held at the value calculated in the immediately preceding occasion or loop, whereby a state free of variation in air-fuel ratio between the cylinders is maintained.

Preferably, the air-fuel ratio control system further comprises learned correction coefficient-calculating means for calculating a learned correction coefficient for correcting variation in air-fuel ratio between the cylinders based on the output from the bandpass filter, when an absolute value of the output from the bandpass filter is smaller than a predetermined threshold value, operating condition-detecting means for detecting an operating condition of the engine, and storage means for storing the calculated learned correction coefficient in association with the detected operating condition of the engine, and the fuel amount-determining means determines the amount of the fuel to be supplied, according to one of the learned correction coefficients stored in the storage means which corresponds to a current detected operating condition of the engine.

With the configuration of this preferred embodiment, when the absolute value of the output from the bandpass filter is smaller than the predetermined threshold value, a learned correction coefficient for correcting variation in air-fuel ratio between the cylinders is calculated by the learned correction coefficient-calculating means, based on the output from the bandpass filter. Then, the calculated learned correction coefficient is stored in the storage means, in association with the detected operating condition of the engine. Further, the amount of the fuel to be supplied is determined according to one of the learned correction coefficients, which corresponds to the detected current operating condition of the engine.

Since variation in air-fuel ratio between the cylinders occurs due to malfunction of an injector or the like, as described above, the degree of the variation tends to vary with the operating condition of the engine. For this reason, as described hereinbefore, even if variation in air-fuel ratio between the cylinders is temporarily eliminated by determining the amount of fuel to be supplied, according to the output from the bandpass filter, variation in air-fuel ratio can occur again due to a change in the operating condition of the engine.

According to the present preferred embodiment, however, since the learned correction coefficient is calculated when the absolute value of the output from the bandpass filter is smaller than the predetermined threshold value, i.e. when it is judged that there is little variation in air-fuel ratio between the cylinders, the learned correction coefficient is obtained as an optimum value suitable for correcting variation in air-fuel ratio. Further, the thus calculated learned correction coefficient is stored in association with the detected operating condition of the engine, so that the amount of fuel to be supplied can be determined according to the operating condition of the engine, using a value of the learned correction coefficient most suitable for the current operating condition of the engine. This makes it possible to execute feedforward control of the amount of fuel to be supplied, using the learned correction coefficient, to thereby correct variation in air-fuel ratio properly according to the operating condition of the engine, and hence reduce the variation in air-fuel ratio.

More preferably, the storage means is a non-volatile memory.

According to this preferred embodiment, the learned correction coefficient is stored in the non-volatile memory. Therefore, e.g. at the start of the engine, the amount of fuel to be supplied can be determined using the value of the learned correction coefficient stored during operation of the engine in the past. When the amount of fuel to be supplied is determined according to the output from the bandpass filter having filtered the detection signal output from the air-fuel ratio sensor, as described hereinbefore, the amount of fuel cannot be determined until the air-fuel ratio sensor is activated after the start of the engine, and hence variation in air-fuel ratio having occurred may not be eliminated. However, according to the present preferred embodiment, since the amount of fuel to be supplied can be determined using the learned correction coefficients stored during operation of the engine in the past, it is possible to correct variation in air-fuel ratio properly even before the air-fuel ratio sensor is activated, to thereby reduce the variation in air-fuel ratio.

More preferably, the learned correction coefficient-calculating means comprises correction coefficient-calculating means for calculating a correction coefficient based on the output from the bandpass filter, and calculates the learned correction coefficient according to the calculated correction coefficient and the learned correction coefficient stored in the storage means in association with the same operating condition of the engine that has been detected when the correction coefficient has been calculated.

With the configuration of this preferred embodiment, a correction coefficient is calculated by the correction coefficient-calculating means, based on the output from the bandpass filter. Further, the learned correction coefficient is calculated according to the calculated correction coefficient and the learned correction coefficient stored in the storage means in association with the same operating condition of the engine that has been detected when the correction coefficient has been calculated. Then, the calculated learned correction coefficient is stored and updated, for use in determining the amount of fuel to be supplied.

An output from the bandpass filter, which is generated by filtering the detection signal from the air-fuel ratio sensor, can contain noise. Therefore, even if the learned correction coefficient is calculated based on the output from the bandpass filter when it is judged that there is little variation in air-fuel ratio between the cylinders, the direct use of the calculated learned correction coefficient can be sometimes improper e.g. due to the influence of noise. According to the present preferred embodiment, however, the correction coefficient calculated based on the output from the bandpass filter is not directly used as the learned correction coefficient, but the correction coefficient thus calculated and one of the learned correction coefficients stored in the past are used for calculation of the learned correction coefficient, so that it is possible to reduce the influence of noise contained in the output from the bandpass filter on the calculated learned correction coefficient. Further, since the learned correction coefficient is calculated using a value of the learned correction coefficient associated with the same operating condition of the engine detected when the correction coefficient has been calculated, it is possible to properly calculate the learned correction coefficient according to the operating condition of the engine.

To attain the above object, in a second aspect of the present invention, there is provided a method of controlling an air-fuel ratio of a mixture supplied to each of a plurality of cylinders of an internal combustion engine, by controlling an amount of fuel to be supplied to the cylinders, on a cylinder-by-cylinder basis, comprising the steps of:

detecting an air-fuel ratio of exhaust gases which have been emitted from the cylinders and merged;

filtering the detection signal indicative of the detected air-fuel ratio, such that a component of the detection signal in a predetermined frequency band is allowed to pass; and determining the amount of the fuel to be supplied, on a cylinder-by-cylinder basis, according to a filtered signal obtained by filtering the detection signal, such that an amplitude of the filtered signal becomes equal to a predetermined value.

Preferably, the filtering is performed by a plurality of filterings parallel with each other for allowing passage of components of the filtered signal in a plurality of frequency bands different from each other, and the method further comprises the step of selecting one of the filterings based on at least one of filtered signals obtained by the respective filterings, wherein the step of determining the amount of fuel to be supplied includes determining the amount of the fuel to be supplied, according to the selected one of the filtered signals, such that the amplitude of the selected one of the filtered signals becomes equal to the predetermined value.

More preferably, the method further comprises the step of calculating a weighted average value of the filtered signals by calculating a weighted average of an absolute value of an immediately preceding value of the weighted average value and an absolute value of a current value of the filtered signal, and the step of selecting the filtered signal includes selecting the one of the filtered signals based on at least one of the calculated weighted average values.

Preferably, the filtering is performed by a plurality of filterings parallel with each other for allowing passage of components of the filtered signal in a plurality of frequency bands different from each other, and the method further comprises the step of calculating a total of the filtered signals obtained by the respective filterings, wherein the step of determining the amount of fuel to be supplied includes determining the amount of the fuel to be supplied, according to the calculated total such that the total becomes equal to the predetermined value.

Preferably, the step of determining the amount of fuel to be supplied includes determining the amount of fuel to be supplied, in a predetermined cycle, and the method further comprises the step of sampling the detection signal to be filtered, in a shorter cycle than the predetermined cycle.

Preferably, the engine includes crank angle-detecting means for detecting a crank angle of the engine, and an air-fuel ratio sensor for detecting the air-fuel ratio, and the method comprises the step of setting a dead time from emission of the exhaust gasses from the cylinders to arrival of the exhaust gasses at the air-fuel ratio sensor, with respect to the crank angle, wherein the step of determining the amount of fuel to be supplied includes determining the amount of the fuel to be supplied, according to the filtered signal which is produced by filtering the detection signal from the air-fuel ratio sensor which is generated at a time of lapse of the set dead time after emission of exhaust gases from the cylinder.

More preferably, the method further comprises the step of detecting an operating condition of the engine, and the step of setting the dead time includes setting the dead time according to the detected operating condition of the engine.

Preferably, the method further comprises the steps of calculating a correction parameter for correcting variation in air-fuel ratio between the cylinders, on a cylinder-by-cylinder basis, based on the filtered signal, calculating an average value of the correction parameters calculated, on a cylinder-by-cylinder basis, and calculating a cylinder-by-cylinder correction coefficient by dividing the correction parameter by the calculated average value of the correction parameters, and the step of determining the amount of fuel to be supplied includes determining the amount of the fuel to be supplied, according to the calculated correction coefficient.

More preferably, the method further comprises the step of determining deviation from a predetermined operation characteristic of fuel supply systems for supplying fuel to the cylinders, on a cylinder-by-cylinder basis, based on the correction coefficient.

Preferably, the method further comprises the steps of calculating a correction coefficient for correcting variation in air-fuel ratio between the cylinders based on the filtered signal, and fixing, when an absolute value of the filtered signal becomes smaller than a predetermined threshold value, the correction coefficient to a value of the correction coefficient calculated in the step of calculating the correction coefficient immediately before the absolute value of the filtered signal has become smaller than the predetermined threshold value, and the step of determining the amount of fuel to be supplied includes determining the amount of the fuel to be supplied, according to the correction coefficient.

Preferably, the method further comprises the steps of calculating a learned correction coefficient for correcting variation in air-fuel ratio between the cylinders based on the filtered signal, when an absolute value of the filtered signal is smaller than a predetermined threshold value, detecting an operating condition of the engine, and storing the calculated learned correction coefficient in association with the detected operating condition of the engine, and the step of determining the amount of fuel to be supplied includes determining the amount of the fuel to be supplied, according to one of the learned correction coefficients stored which corresponds to a current detected operating condition of the engine.

More preferably, the storing step includes storing the calculated learned correction coefficient in a non-volatile memory.

More preferably, the step of calculating the learned correction coefficient comprises the steps of calculating a correction coefficient based on the filtered signal, and calculating the learned correction coefficient according to the calculated correction coefficient and the learned correction coefficient stored in the step of storing the learned correction coefficient in association with the same operating condition of the engine that has been detected when the correction coefficient has been calculated.

To attain the above object, in a third aspect of the present invention, there is provided an engine control unit including a control program for causing a computer to control an air-fuel ratio of a mixture supplied to a plurality of cylinders of an internal combustion engine, by controlling an amount of fuel to be supplied to the cylinders, on a cylinder-by-cylinder basis, wherein the control program causes the computer to detect the air-fuel ratio of exhaust gases which have been emitted from the cylinders and merged, filter the detection signal indicative of the detected air-fuel ratio, such that a component of the detection signal in a predetermined frequency band is allowed to pass, and determine the amount of the fuel to be supplied, on a cylinder-by-cylinder basis, according to a filtered signal obtained by filtering the detection signal, such that an amplitude of the filtered signal becomes equal to a predetermined value.

Preferably, the filtering is performed by a plurality of filterings parallel with each other for allowing passage of components of the filtered signal in a plurality of frequency bands different from each other, and the control program further causes the computer to select one of the filterings based on at least one of filtered signals obtained by the respective filterings, and determine the amount of the fuel to be supplied, according to the selected one of filtered signals, such that the amplitude of the selected one of the filtered signals becomes equal to the predetermined value.

More preferably, the control program causes the computer to further calculate a weighted average value of the filtered signals by calculating a weighted average of an absolute value of an immediately preceding value of the weighted average value and an absolute value of a current value of the filtered signal, and select the one of the filtered signals based on at least one of the calculated weighted average values.

Preferably, the filtering is performed by a plurality of filterings parallel with each other for allowing passage of components of the filtered signal in a plurality of frequency bands different from each other, and the program causes the computer to further calculating a total of the filtered signals obtained by the respective filterings, and determine the amount of the fuel to be supplied, according to the calculated total such that the total becomes equal to the predetermined value.

Preferably, the control program causes the computer to determine the amount of fuel to be supplied, in a predetermined cycle, and sample the detection signal to be filtered, in a shorter cycle than the predetermined cycle.

Preferably, the engine includes crank angle-detecting means for detecting a crank angle of the engine, and an air-fuel ratio sensor for detecting the air-fuel ratio, and the control program causes the computer to set a dead time from emission of the exhaust gasses from the cylinders to arrival of the exhaust gasses at the air-fuel ratio sensor, with respect to the crank angle, and determine the amount of the fuel to be supplied, according to the filtered signal which is produced by filtering the detection signal from the air-fuel ratio sensor which is generated at a time of lapse of the set dead time after emission of exhaust gases from the cylinder.

More preferably, the control program causes the computer to detect an operating condition of the engine, and set the dead time according to the detected operating condition of the engine.

Preferably, the control program causes the computer to further calculate a correction parameter for correcting variation in air-fuel ratio between the cylinders, on a cylinder-by-cylinder basis, based on the filtered signal, calculate an average value of the correction parameters calculated, on a cylinder-by-cylinder basis, calculate a cylinder-by-cylinder correction coefficient by dividing the correction parameter by the calculated average value of the correction parameters, and determine the amount of the fuel to be supplied, according to the calculated correction coefficient.

More preferably, the control program further causes the computer to determine deviation from a predetermined operation characteristic of fuel supply systems for supplying fuel to the cylinders, on a cylinder-by-cylinder basis, based on the correction coefficient.

Preferably, the control program further causes the computer to calculate a correction coefficient for correcting variation in air-fuel ratio between the cylinders based on the filtered signal, fix, when an absolute value of the filtered signal becomes smaller than a predetermined threshold value, the correction coefficient to a value of the correction coefficient calculated when the control program causes the computer to calculate the correction coefficient immediately before the absolute value of the filtered signal has become smaller than the predetermined threshold value, and determine the amount of the fuel to be supplied, according to the correction coefficient.

Preferably, the control program further causes the computer to calculate a learned correction coefficient for correcting variation in air-fuel ratio between the cylinders based on the filtered signal, when an absolute value of the filtered signal is smaller than a predetermined threshold value, detect an operating condition of the engine, store the calculated learned correction coefficient in association with the detected operating condition of the engine, and determine the amount of the fuel to be supplied, according to one of the learned correction coefficients stored which corresponds to a current detected operating condition of the engine.

More preferably, the control program causes the computer to store the calculated learned correction coefficient in a non-volatile memory.

More preferably, the control program causes the computer to calculate a correction coefficient based on the filtered signal, and calculate the learned correction coefficient according to the calculated correction coefficient and the learned correction coefficient stored when the control program caused the computer to store the learned correction coefficient in association with the same operating condition of the engine has been detected when the correction coefficient has been calculated.

The above and other objects, features, and advantages of the present invention will become more apparent from the following detailed description taken in conjunction with the accompanying drawings.

BRIEF DESCRIPTION OF THE DRAWINGS

FIG. 3 is a diagram useful in explaining an algorithm with which an STR calculates a feedback correction coefficient;

FIG. 4 is a diagram showing mathematical expressions of an algorithm with which an STR in embodiments of the present invention calculates a feedback correction coefficient;

FIGS. 5A to 5C are diagrams showing a power spectrum of an output from a LAF sensor, in which:

FIG. 5A shows a case where air-fuel ratios associated with four cylinders are equal to each other;

FIG. 5B shows a case where there is variation in air-fuel ratio between the four cylinders in a non-two-cylinder deviation pattern; and FIG. 5C shows a case where there is variation in air-fuel ratio between the four cylinders in a two-cylinder deviation pattern;

FIG. 13 is a diagram showing mathematical expressions of an algorithm with which the first and second filtered values and a variation correction coefficient are calculated;

FIGS. 33A and 33B are diagrams useful in explaining the relationship between first to third simulative outputs and a first filtered value, in which:

FIG. 33A shows a case where the relationship of first simulative output=third simulative output>second simulative output holds; and FIG. 33B shows a case where the relationship of first simulative output<second simulative output< third simulative output holds;

FIG. 34 is a diagram useful in explaining another example of an algorithm with which the variation-correcting section calculates a variation correction coefficient provisional value;

FIG. 38 is a diagram showing a KMEMi memory; and

DETAILED DESCRIPTION OF THE PREFERRED EMBODIMENTS

Figure 1:
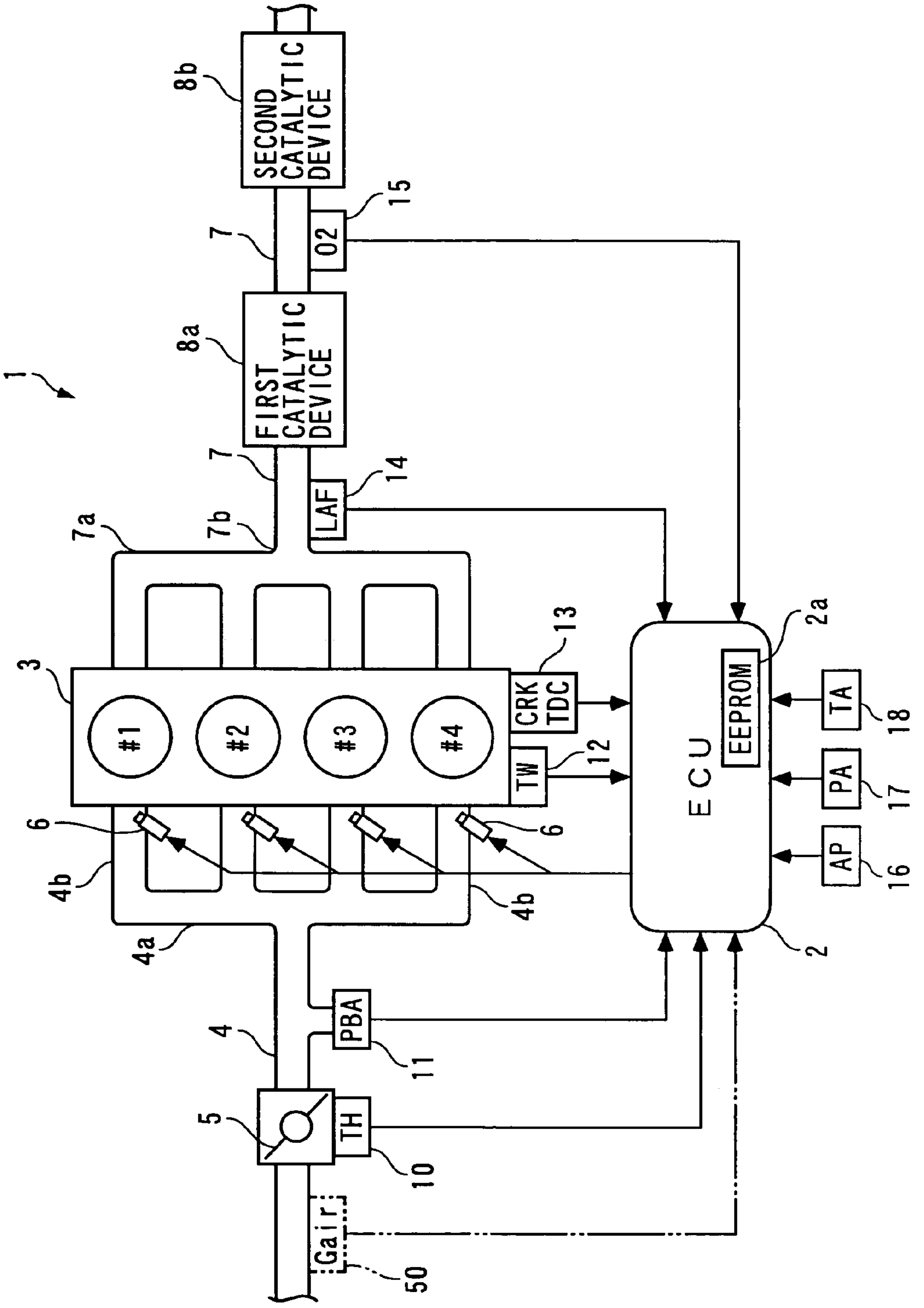
FIG. 1 is a diagram schematically showing the arrangement of an internal combustion engine to which is applied an air-fuel ratio control system according to a first embodiment of the present invention.

The invention will now be described in detail with reference to the drawings showing preferred embodiments thereof. As shown in FIG. 1, an air-fuel ratio control system 1 for an internal combustion engine 3 (hereinafter referred to as "the engine 3") includes an ECU 2, and the engine 3 is an in-line four-cylinder four-stroke gasoline engine installed on an automotive vehicle (not shown) and having first to fourth cylinders #1 to #4 (a plurality of cylinders).

In the vicinity of a throttle valve 5 disposed in an intake pipe 4 of the engine 3, there is provided a throttle valve opening sensor 10 implemented e.g. by a potentiometer, for detecting the degree of opening (hereinafter referred to as "throttle valve opening") TH of the throttle valve 5 and delivering an electric signal indicative of the sensed throttle valve opening TH to the ECU 2.

Further, an intake pipe absolute pressure sensor 11 (operating condition-detecting means) is disposed at a location downstream of the throttle valve 5 in the air intake pipe 4 in communication with the inside of the intake pipe 4. The intake pipe absolute pressure sensor 11 is implemented e.g. by a semiconductor pressure sensor for detecting an intake pipe absolute pressure PBA (parameter indicative of an operating condition of the engine) within the intake pipe 4 and delivering an electric signal indicative of the sensed intake pipe absolute to the ECU 2.

The intake pipe 4 is connected to the four cylinders #1 to #4 via four branch portions 4*b* of an intake manifold 4*a*. In the branch portions 4*d*, injectors 6 are inserted at respective locations upstream of intake ports (not shown) for the cylinders. During operation of the engine 3, each injector 6 is controlled in respect of a fuel injection amount, i.e. a time period over which the injector 6 is open, and fuel injection timing, by a drive signal delivered from the ECU 2. It should be noted that the fuel injection is carried out in the four cylinders #1 to #4 in the order of #1, #3, #4, and #2.

Further, an engine coolant temperature sensor 12 is mounted in the cylinder block of the engine 3, and a crank angle position sensor 13 (crank angle-detecting means, and operating condition-detecting means) is provided for a crankshaft (not shown) of the engine 3. The engine coolant temperature sensor 12 implemented e.g. by a thermistor senses an engine coolant temperature TW which is the temperature of an engine coolant circulating through the cylinder block of the engine 3, and delivers a signal indicative of the sensed engine coolant temperature TW to the ECU 2. The crank angle position sensor 13 delivers a CRK signal and a TDC signal, which are both pulse signals, to the ECU 2 in accordance with rotation of the crankshaft. Each pulse of the CRK signal is generated whenever the crankshaft rotates through a predetermined angle (e.g. 30 degrees). The ECU 2 determines the rotational speed NE of the engine 3 (hereinafter referred to as "the engine speed NE") (parameter indicative of an operating condition of the engine) based on the CRK signal. The TDC signal indicates that each piston (not shown) in the associated cylinder is in a predetermined crank angle position immediately before the TDC position at the start of the intake stroke, and each pulse of the TDC signal is generated whenever the crankshaft rotates through 180 degrees in the case of the four-cylinder engine employed, by way example, in the present embodiment.

Further, the engine 3 is provided with a cylinder-discriminating sensor (not shown). The cylinder-discriminating sensor generates a cylinder-discriminating signal which is a pulse signal for discriminating each of the four cylinders #1 to #4 from the other ones to deliver the signal to the ECU 2.

An exhaust pipe 7 has an exhaust manifold 7*a* configured such that four exhaust pipe sections extending from the respective four cylinders #1 to #4 are combined into a collecting section 7*b*. Further, a first catalytic device 8*a* and a second catalytic device 8*b* are arranged in the exhaust pipe 7 from upstream to downstream in the mentioned order in a spaced relationship at respective locations downstream of the collecting section 7*d* of the exhaust manifold 7*a*. Each of the catalytic devices 8*a* and 8*b* is a combination of a NOx catalyst and a three-way catalyst, and the NOx catalyst is comprised of a honeycomb structure base, an iridium catalyst (sintered body of silicon carbide whisker carrying iridium and silica) coated on the surface of the honeycomb structure base, and Perovskite double oxide (sintered body of $LaCoO_3$ powder and silica) further coated on the iridium catalyst. Further, the first and second catalytic devices 8*a* and 8*b* eliminate NOx from exhaust gases emitted during a lean burn operation of the engine 3 by oxidation-reduction catalytic actions of the NOx catalyst, and eliminate CO, HC, and NOx from exhaust gases emitted during other operations of the engine 3 than the lean burn operation by oxidation-reduction catalytic actions of the three-way catalyst.

An oxygen concentration sensor (hereinafter referred to as "the O2 sensor") 15 is inserted into the exhaust pipe 7 between the first and second catalytic devices 8*a* and 8*b*. The O2 sensor 15 is comprised of a zirconia layer and platinum electrodes, and delivers to the ECU 2 an output Vout dependent on the concentration of oxygen contained in exhaust gases downstream of the first catalytic device 8*a*. The output Vout assumes a high-level voltage value (e.g. 0.8 V) when an air-fuel mixture having a richer air-fuel ratio than the stoichiometric air-fuel ratio has been burned, whereas it assumes a low-level voltage value (e.g. 0.2 V) when an air-fuel mixture having a leaner air-fuel ratio than the stoichiometric air-fuel ratio has been burned. Further, when the air-fuel ratio of the mixture is close to the stoichiometric air-fuel ratio, the output Vout assumes a predetermined target value Vop (e.g. 0.6 V) between the high-level and low-level voltage values.

Further, a LAF sensor 14 (air-fuel ratio sensor) is mounted in the vicinity of the collecting section 7*b* of the exhaust manifold 7*a* at a location upstream of the first catalytic device 8*a*. The LAF sensor 14 is formed by combining a sensor similar to the O2 sensor 15 and a detection circuit, such as a linearizer, and detects the concentration of oxygen contained in exhaust gases linearly over a wide range of the air-fuel ratio ranging from a rich region to a lean region, thereby delivering an output KACT (detection signal of the air-fuel ratio sensor) proportional to the sensed oxygen concentration to the ECU 2. The output KACT is expressed as an equivalent ratio proportional to the air-fuel ratio of exhaust gases in the vicinity of the collecting section 7*b*. The ECU 2 reads the output KACT from the LAF sensor 14 in synchronism with generation of each pulse of the CRK signal and stores the read data in the RAM.

The ECU 2 receives a signal indicative of a stepped-on amount (hereinafter referred to as "the accelerator pedal opening") AP of an accelerator pedal (not shown) of the vehicle from an accelerator opening sensor 16, a signal indicative of atmospheric pressure PA from an atmospheric pressure sensor 17, and a signal indicative of intake air temperature TA from an intake air temperature sensor 18.

The ECU 2 is implemented by a microcomputer comprised of an I/O interface, a CPU, a RAM, a ROM and an EEPROM 2*a* (storage means). The signals from the aforementioned sensors 10 to 18 are input to the CPU after the I/O interface performs A/D conversion and waveform shaping thereon.

In response to these input signals, the CPU determines the operating conditions of the engine 3, and executes an air-fuel ratio control process, based on the determined operating conditions, in accordance with control programs read from the ROM, thereby controlling the air-fuel ratio of a mixture to be supplied to each cylinder. Further, as will be described in detail hereinafter, the CPU determines whether or not the fuel supply system of each cylinder, including the injector 6 and an intake valve (not shown), is operating normally. It should be noted that in the present embodiment, the ECU 2 implements a bandpass filter, fuel amount-determining means, a plurality of bandpass filters, filter-selecting means, weighted average value-calculating means, total-calculating means, sampling means, dead time-setting means, operating condition-detecting means, correction parameter-calculating means, average value-calculating means, correction coefficient-calculating means, operation characteristic-determining means, correction coefficient-fixing means, learned correction coefficient-calculating means, and storage means.

Figure 2:
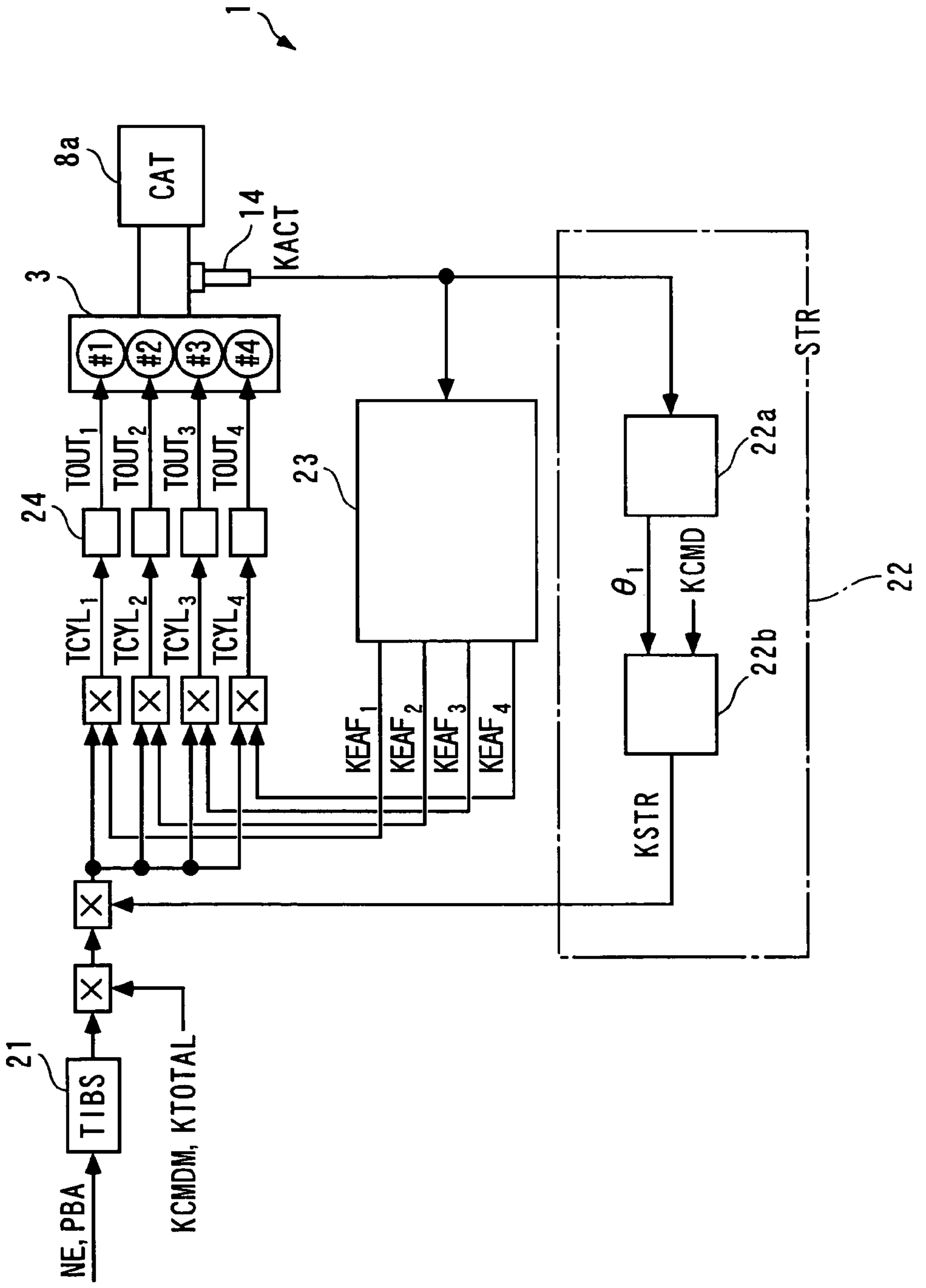
FIG. 2 is a block diagram schematically showing the configuration of the air-fuel ratio control system according to the first embodiment.

As shown in FIG. 2, the air-fuel ratio control system 1 is comprised of a basic fuel injection amount-calculating section 21, a STR (Self Tuning Regulator) 22, a variation-correcting section 23, and a fuel attachment-dependent correction section 24, which are all implemented by the ECU 2.

In the air-fuel ratio control system 1, first, the basic fuel injection amount-calculating section 21 calculates a basic fuel injection amount TIBS according to the engine speed NE and the intake pipe absolute pressure PBA by searching a map (not shown). Then, as will be described in detail hereinafter, the STR 22 calculates a feedback correction coefficient KSTR, and the variation-correcting section 23 calculates a variation correction coefficient $KEAF_i$ (correction coefficient), on a cylinder-by-cylinder basis.

Then, a demanded fuel injection amount $TCYL_i$ is calculated on a cylinder-by-cylinder basis by multiplying the basic fuel injection amount TIBS by a corrected target air-fuel ratio KCMDM, a total correction coefficient KTOTAL, the feedback correction coefficient KSTR, and the variation correction coefficient $KEAF_i$. Then, the fuel attachment-dependent correction section 24 calculates the ratio of fuel attached to the inner wall of a combustion chamber to all fuel injected from the injector 6 in the current combustion cycle and the like, according to an operating condition of the engine, and then corrects the corresponding demanded fuel injection amount $TCYL_i$ based on the calculated ratio of attached fuel and the like, thereby calculating a final fuel injection amount $TOUT_i$ (amount of fuel to be supplied), on a cylinder-by-cylinder basis. Further, the injector 6 is driven by a drive signal generated based on the calculated final fuel injection amount $TOUT_i$, whereby the air-fuel ratio of a mixture is controlled on a cylinder-by-cylinder basis. It should be noted that the subscript "i" in $TOUT_i$ is a cylinder number indicative of a number assigned to each cylinder (i=1 to 4).

Next, a description will be given of the above-mentioned STR 22. The STR 22 calculates the feedback correction coefficient KSTR so as to cause the output KACT from the LAF sensor 14 to become equal to a target air-fuel ratio KCMD. The STR 22 is comprised of an onboard identifier 22a and an STR controller 22b. In the STR 22, the onboard identifier 22a identifies a model parameter vector $\theta_i$ by an algorithm described in detail hereinafter, and the STR controller 22b calculates the feedback correction coefficient KSTR.

First, the first to fourth cylinders #1 to #4 are each regarded as a controlled object to which is input an associated feedback correction coefficient $KSTR_i$ and from which is output the output KACT from the LAF sensor 14, and the system including these controlled objects is modeled into a discrete-time system model, which is expressed by an equation (1) appearing in FIG. 3. In the equation (1), the symbol k represents a discretized time, and each portion with (k) represents discrete data sampled every combustion cycle, i.e. whenever a total of four successive pulses of the TDC signal are generated. This also applies to discrete data (time-series data) referred to hereinafter.

The dead time of the output KACT from the LAF sensor 14 with respect to the target air-fuel ratio KCMD is estimated to correspond to about three combustion cycles, and therefore, there is a relationship of KCMD(k)=KACT (k+3). When this relationship is applied to the equation (1), there is derived an equation (2) in FIG. 3.

Further, the model parameter vector $\theta_i(k)$ of model parameters $b0_i(k)$, $r1_i(k)$, $r2_i(k)$, $r3_i(k)$, and $sO_i(k)$ in the equation (1) is identified with an identification algorithm of equations (3) to (9) in FIG. 3. $KP_i(k)$ in the equation (3) represents a vector of a gain coefficient, and $ide_i(k)$ an identification error. Further, $\theta_i(k)^T$ in the equation (4) represents a transposed matrix of $\theta_i(k)$. It should be noted in the following description, the notation of "vector" is omitted unless otherwise required.

The identification error $ide_i(k)$ in the equation (3) is calculated using the equations (5) to (7) in FIG. 3, and $KACT\_HAT_i(k)$ in the equation (6) represents an identified value of the output KACT from the LAF sensor 14. Further, the vector $KP_i(k)$ of the gain coefficient is calculated using the equation (8) in FIG. 3, and $P_i(k)$ in the equation (8) is a square matrix of order 5 defined by an equation (9) in FIG. 3.

Then, in order to calculate the feedback correction coefficient KSTR such that the output KACT from the LAS sensor 14 becomes equal to the target air-fuel ration KCMD, the model parameter vector $\theta_i$ of the first cylinder #1 identified by the onboard identifier 22a is oversampled in timing synchronous with generation of each pulse of the TDC signal, and at the same time, a moving average value θ_ave of the model parameter vector θ is calculated.

More specifically, the moving average value θ_ave (n) of the model parameter vector $\theta_1$ is calculated using an equation (10) in FIG. 4, and the feedback correction coefficient KSTR (n) is calculated using the moving average value θ_ave (n) by an equation (12) in FIG. 4. It should be noted that θbuf in the equation (10) indicates an oversampled value of the model parameter vector $\theta_1$ for the first cylinder #1, and the transposed matrix of the moving average value θ_ave (n) is defined by an equation (11) in FIG. 4. In these equations (10) to (12), the symbol n represents a discretized time, and each portion with (n) represents discrete data sampled in timing synchronous with generation of each pulse of the TDC signal. This also applies to discrete data referred to hereinafter. Therefore, there is a relationship of $k-f=n-4\cdot f$ (f: integer), and when this relationship is applied to the equation (2) in FIG. 3, there is derived the above equation (12).

Further, the symbol a in the equation (10) represents a predetermined integer, and in the present embodiment, α is set to 11. The reason for this is as follows: As described hereinabove, the dead time of the output KACT from the LAF sensor 14 with respect to the target air-fuel ratio KCMD corresponds to three combustion cycles, and therefore, the period of resonance of the control system caused by updating the model parameter vector θ also corresponds to three cycles of the combustion. Therefore, for suppressing the oscillation of the control system, a 12-tap moving average filter is optimal which has stop bands at intervals corresponding to the three cycles of the combustion, and therefore, α is set to 11, as described above. Further, the identification algorithm with which the model parameter vector $\theta_i$ (k) is identified is expressed by equations (13) to (19) shown in FIG. 4.

As described above, the onboard identifier 22a of the STR 22 identifies the model parameter vector $\theta_i$ (k) by the identification algorithm shown in the equations (13) to (19) in FIG. 4, while the STR controller 22b calculates the feedback correction coefficient KSTR (n) using the equations (10) to (12) in FIG. 4.

Next, a description will be given of the variation-correcting section 23. The variation-correcting section 23 calculates a variation correction coefficient $KEAF_i$ on a cylinder-by-cylinder basis to eliminate variation in air-fuel ratio between the four cylinders #1 to #4 to each of which a mixture is supplied. First, the concept of the operation of the variation-correcting section 23 will be described.

Figure 5A:
Figure 5B:
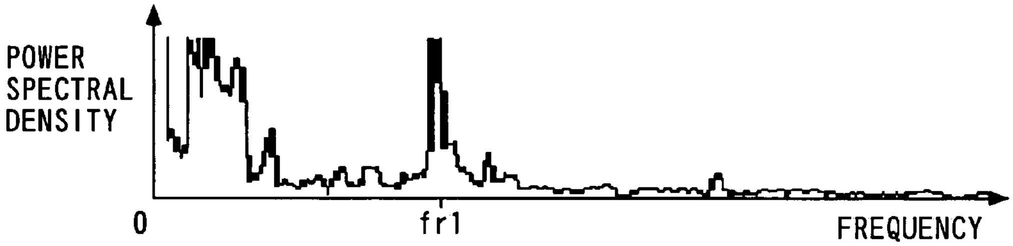
Figure 5C:

FIGS. 5A to 5C show power spectra obtained by frequency analysis of the output KACT from the LAF sensor 14. More specifically, FIG. 5A shows a case where the air-fuel ratios of mixtures supplied to the respective four cylinders are equal to each other; FIG. 5B shows a case where there is variation in air-fuel ratio between the cylinders in a variation pattern other than a two-cylinder deviation pattern (hereinafter referred to as "the non-two-cylinder deviation pattern"); and FIG. 5C shows a case where there is variation in air-fuel ratio between the cylinders in the two-cylinder deviation pattern. The term "two-cylinder deviation pattern" is intended to mean a variation pattern in which when fuel injection is carried out in the order of #1, #3, #4, and #2 as described hereinbefore, the air-fuel ratios of mixtures supplied to the respective first and fourth cylinders #1 and #4 are equal to each other, whereas the air-fuel ratios of mixtures supplied to the respective third and second #3 and #2 are also equal to each other, but different from the air-fuel ratios associated with the for example, the air-fuel ratios of the mixtures supplied to the first and fourth cylinders #1 and #4 are equal to each other and richer than the stoichiometric air-fuel ratio, whereas the air-fuel ratios of the mixtures supplied to the second and fourth cylinders #2 and #3 are equal to each other and leaner than the stoichiometric air-fuel ratio. On the other hand, the term "non-two-cylinder deviation pattern" is intended to mean variation patterns other than the two-cylinder deviation pattern, in which, for example, the air-fuel ratios of mixtures supplied to the respective first and third cylinders #1 and #3 are richer than the stoichiometric air-fuel ratio, whereas the air-fuel ratios of mixtures supplied to the second and fourth #2 and #4 are leaner than the stoichiometric air-fuel ratio. It has been confirmed that when there is variation in air-fuel ratio between the cylinders #1 to #4 in either the non-two-cylinder deviation pattern or the two-cylinder deviation pattern, very high power spectral density (hereinafter referred to as "PSD") is obtained in each of specific bands of first and second frequencies fr1 and fr2 (predetermined frequencies) as shown in FIGS. 5B and 5C, whereas when there is no variation, as shown in FIG. 5A, no such an event occurs. The first frequency fr1 is a pulsation frequency synchronous with one combustion cycle, i.e. generation of a total of four successive pulses of the TDC signal, while the second frequency fr2 is a pulsation frequency synchronous with one rotation of the crankshaft of the engine 3, i.e. generation of a total of two successive pulses of the TDC signal.

Figure 6:
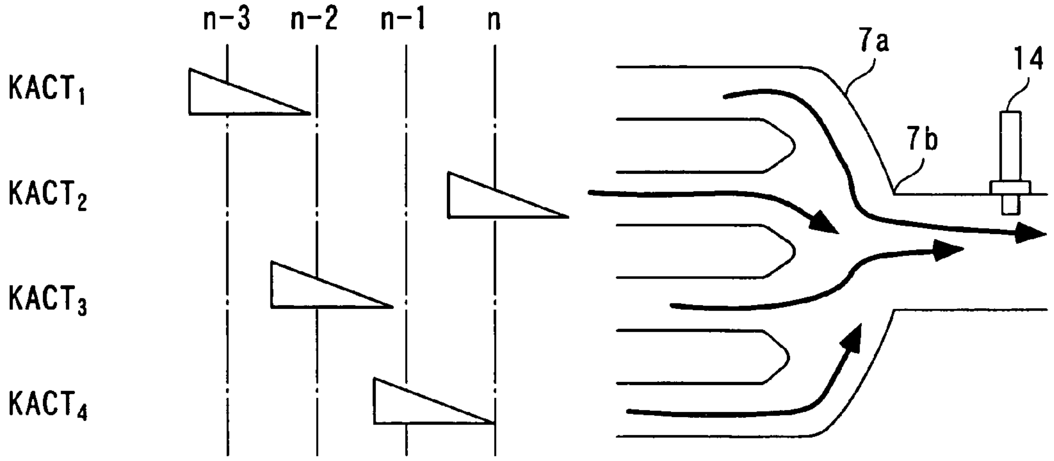
FIG. 6 is a diagram schematically showing how flows of exhaust gases emitted from the respective cylinders merge with each other at a collecting section of an exhaust pipe.
Figure 7:
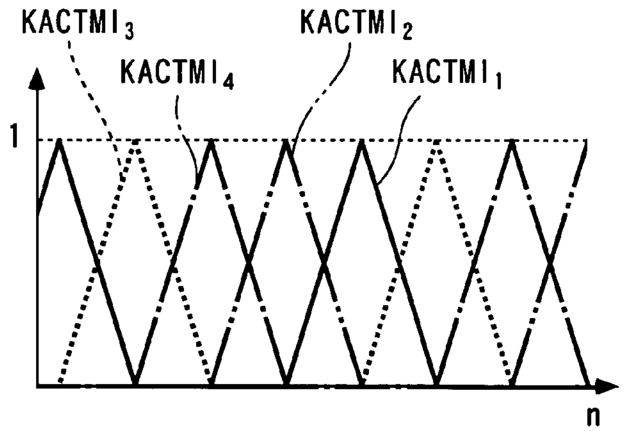
FIG. 7 is a diagram showing first to fourth simulative outputs.

Further, by paying attention to the above points, an experiment described below was performed by simulating variation in air-fuel ratio between the cylinders. In an in-line four-cylinder four-stroke engine, such as the engine 3, as shown in FIG. 6, flows of exhaust gasses emitted from the cylinders in the order of the cylinders #1, #3, #4, and #2 whenever a pulse of the TDC signal (represented by a symbol n in FIG. 6) is output merge with each other at the collecting section 7*b* of the exhaust pipe 7, and the air-fuel ratio of the exhaust gasses at the collecting section 7*b* can be regarded as the output KACT from the LAF sensor 14. Accordingly, as shown in FIG. 7, respective air-fuel ratios $KACT_1$ to $KACT_4$ of the exhaust gasses from the four cylinders #1 to #4 were simulatively generated as triangular wave-shaped first to fourth simulative outputs $KACTMI_1$ to $KACTMI_4$ output every combustion cycle, and the total of these outputs was set as a simulative output KACTMI from the LAF sensor 14. Then, the simulative output KACTMI was input to first and second bandpass filters that perform filtering for passage of components of the simulative output KACTMI in the respective bands of the first and second frequencies fr1 and fr2. It should be noted the ordinate in FIG. 7 represents an equivalent ratio.

Figure 8:
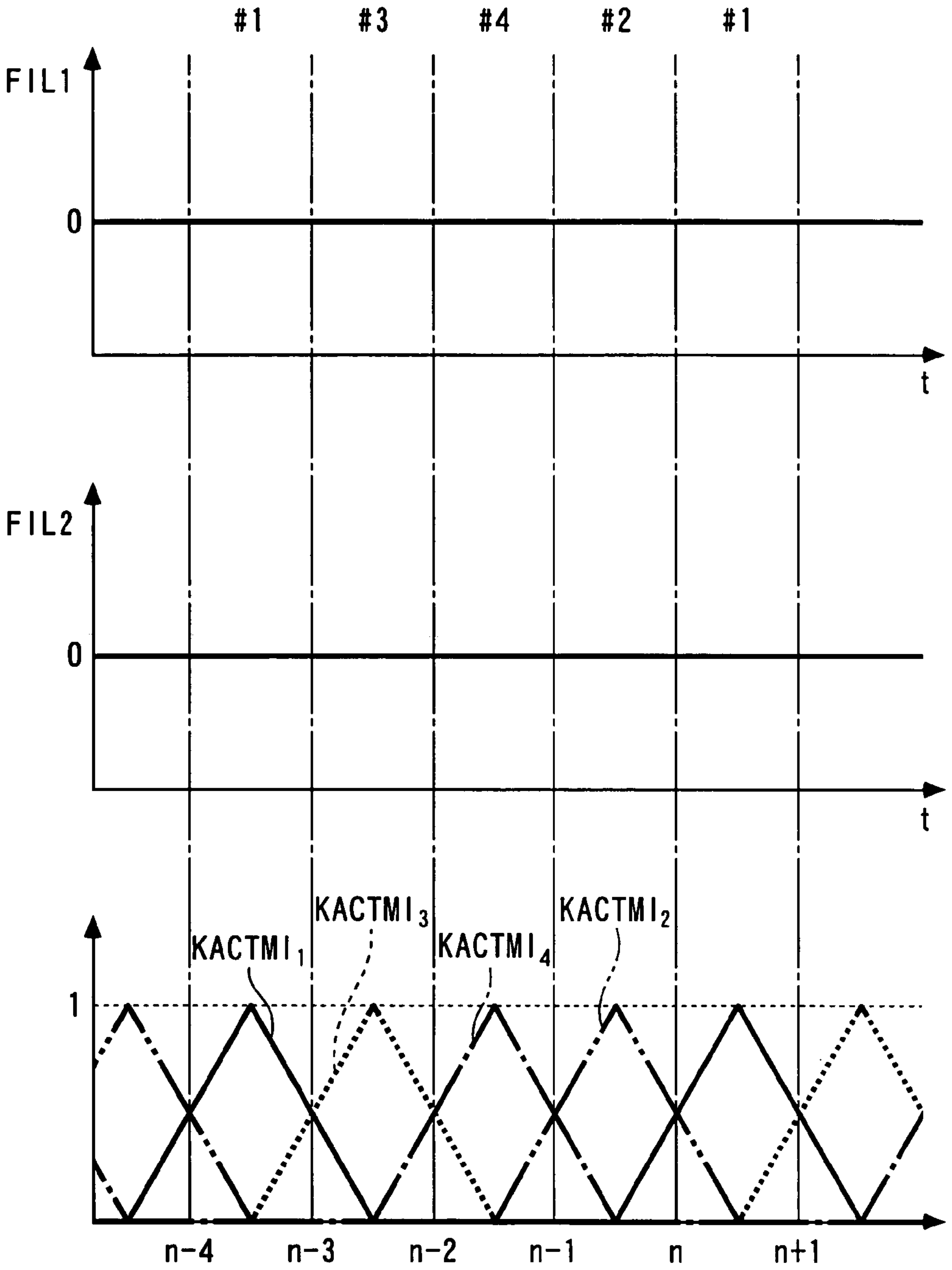
FIG. 8 is a diagram useful in explaining the relationship between the first to fourth simulative outputs and first and second filtered values in a case where the first to fourth simulative outputs are equal to each other.

As a result, as shown in FIG. 8, first and second filtered values FIL1 and FIL2, i.e. respective outputs from the first and second bandpass filters both exhibited a value of 0 when the first to fourth simulative outputs $KACTMI_1$ to $KACTMI_4$ were equal to each other, i.e. when there was no variation in air-fuel ratio between the cylinders.

Figure 9:
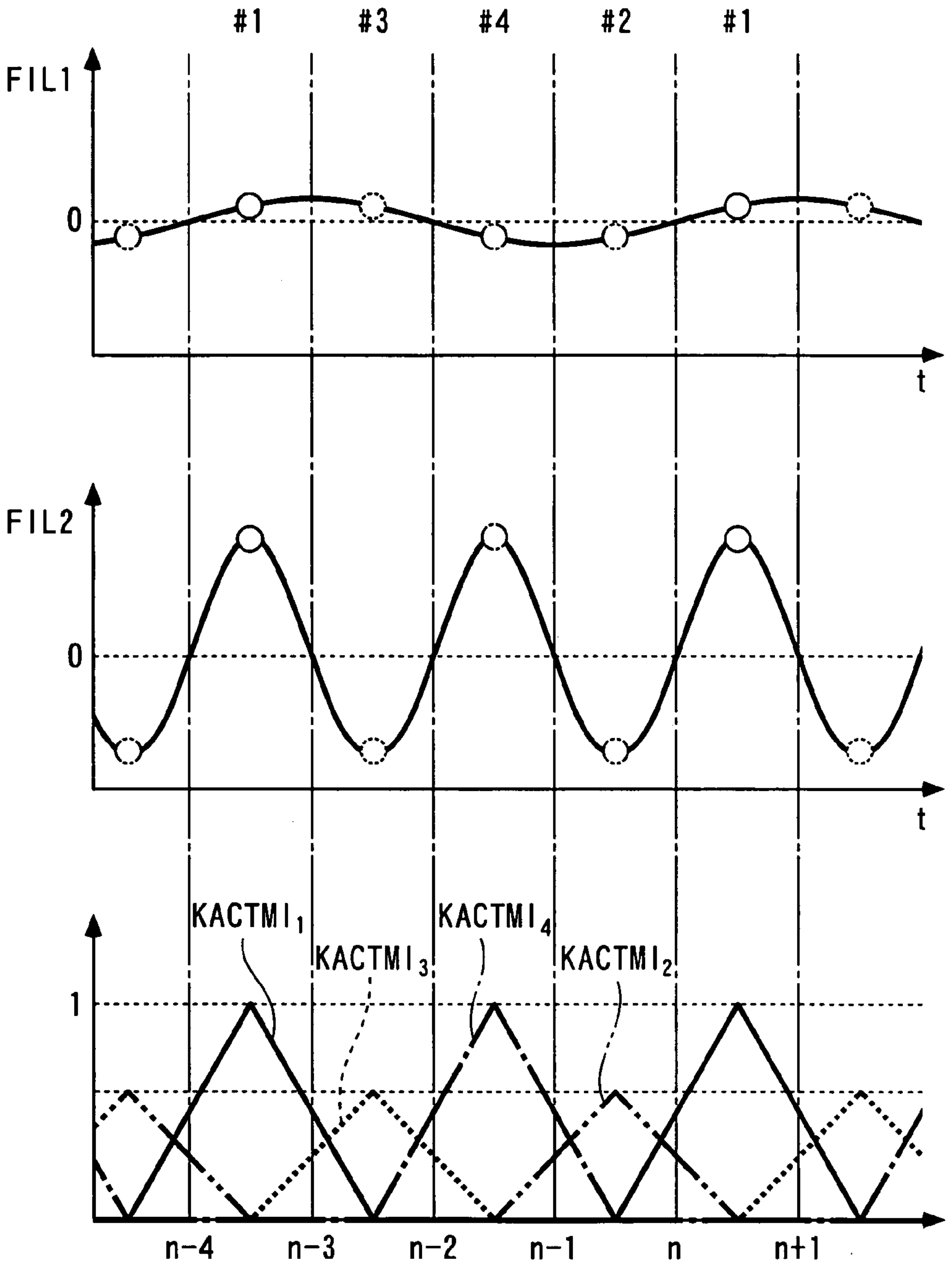
FIG. 9 is a diagram useful in explaining the relationship between the first to fourth simulative outputs and the first and second filtered values in a case where the first to fourth simulative outputs differ from each other in the two-cylinder deviation pattern.

Further, as shown in FIG. 9, in the case of the two-cylinder deviation pattern in which the first and fourth simulative outputs $KACTMI_1$ and $KACTMI_4$ were larger than the second and third simulative outputs $KACTMI_2$ and $KACTMI_3$, the second filtered value FIL2 exhibited a sinusoidal waveform in which the second filtered value FIL2 changes across a control value of 0 into positive and negative regions with a relatively large amplitude in a cycle equal to one rotation of the crankshaft. On the other hand, the first filtered value FIL1 exhibited a sinusoidal waveform in which the first filtered value FIL1 changes across a control value of 0 into the positive and negative regions with a relatively small amplitude, in a cycle equal to one combustion cycle. The second filtered value FIL2 became positive at the respective times of the first and fourth simulative outputs $KACTMI_1$ and $KACTMI_4$ being input, and became negative at the respective times of the second and third simulative outputs $KACTMI_2$ and $KACTMI_3$ being input. Further, as the difference between the first simulative output $KACTMI_1$ and the third simulative output $KACTMI_3$ was larger, the second filtered value FIL2 became a larger positive value in the aforementioned former times, and became a negative value larger in its absolute value in the aforementioned latter times.

Figure 10:
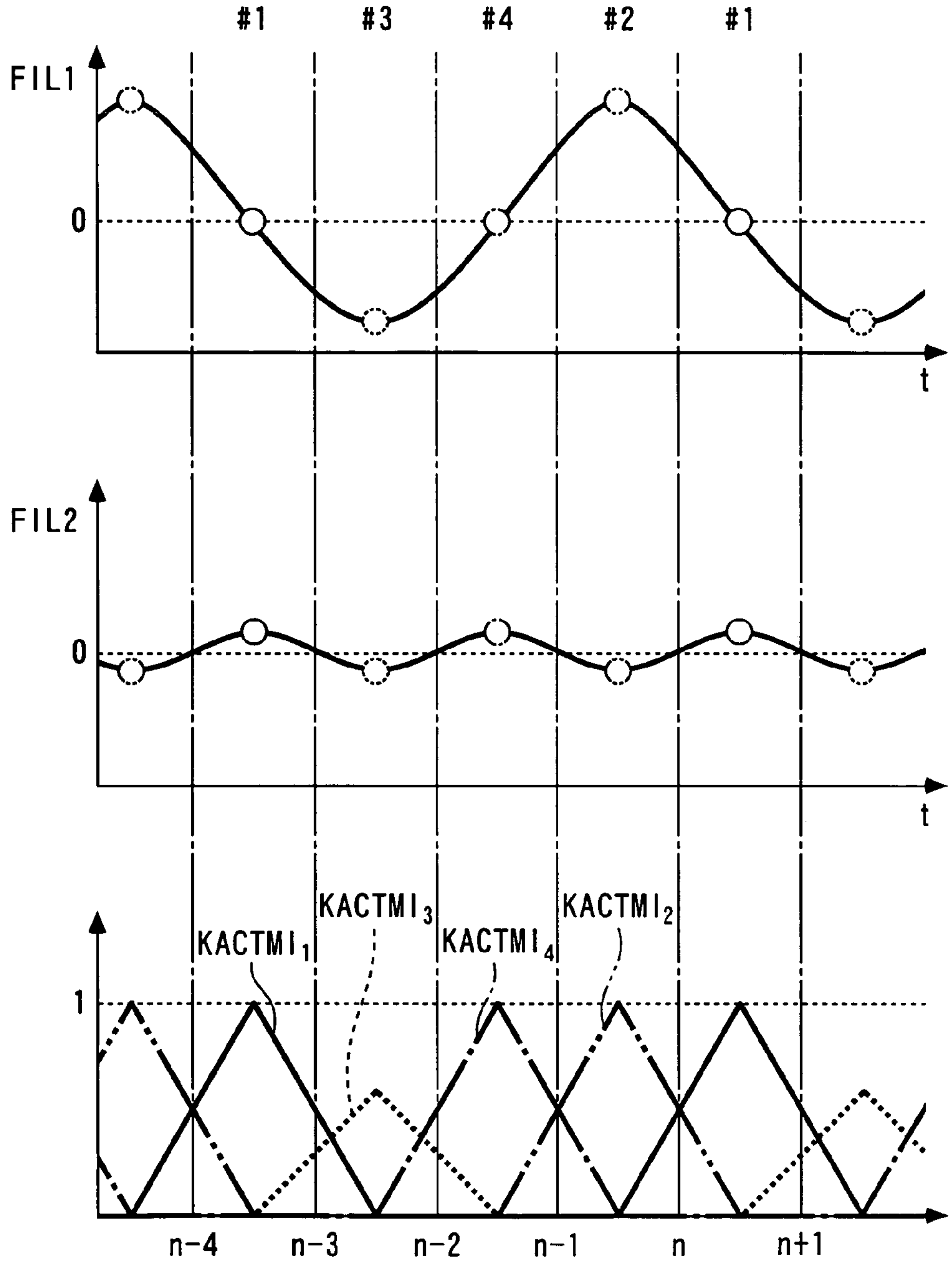
FIG. 10 is a diagram useful in explaining the relationship between the first to fourth simulative outputs and the first and second filtered values in a case where only the third simulative output is smaller than the other simulative outputs.

As shown in FIG. 10, in the non-two-cylinder deviation pattern, when the third simulative output $KACTMI_3$ alone was smaller than the other simulative outputs, for example, as distinct from the case of the two-cylinder deviation pattern, the first filtered value FIL1 exhibited a sinusoidal waveform with a relatively large amplitude, and the second filtered value FIL2 exhibited a sinusoidal waveform with a relatively small amplitude. Further, the first filtered value FIL1 became equal to 0 at the respective times of the first and fourth simulative outputs $KACTMI_1$ and $KACTMI_4$ being input, became positive at the time of the second simulative output $KACTMI_2$ being input, and became negative at the time of the third simulative output $KACTMI_3$ being input. Furthermore, as the difference between the third simulative output $KACTMI_3$ and the other simulative outputs is larger, the first filtered value FIL1 became a larger positive value at the time of the second simulative output $KACTMI_2$ being input, and became a negative value larger in its absolute value at the time of the third simulative output $KACTMI_3$ being input.

As is clear from the results of the above-described experiment, when the output KACT from the LAF sensor 14 is filtered by the first and second bandpass filters that allow components of the output KACT in the bands of the first and second frequencies fr1 and fr2 to pass therethrough, the presence or absence of a significant amplitude in each filter output represents the presence or absence of variation in air-fuel ratio between the cylinders. In the two-cylinder deviation pattern, the amplitude of the output from the second bandpass filter becomes larger, and the relationship in air-fuel ratio between the cylinders is identified based on the positive and negative values of the output. On the other hand, in the non-two-cylinder deviation pattern, the amplitude of the output of the first bandpass filter becomes larger.

Based on the above-described output characteristics of the filters, when there is variation in air-fuel ratio between the cylinders, the variation-correcting section 23 calculates the cylinder-by-cylinder variation correction coefficient $KEAF_i$ according to the output of one of the filters with a larger amplitude, such that the variation is eliminated, i.e. such that the amplitude of the output of the filter becomes equal to 0.

Figure 11:
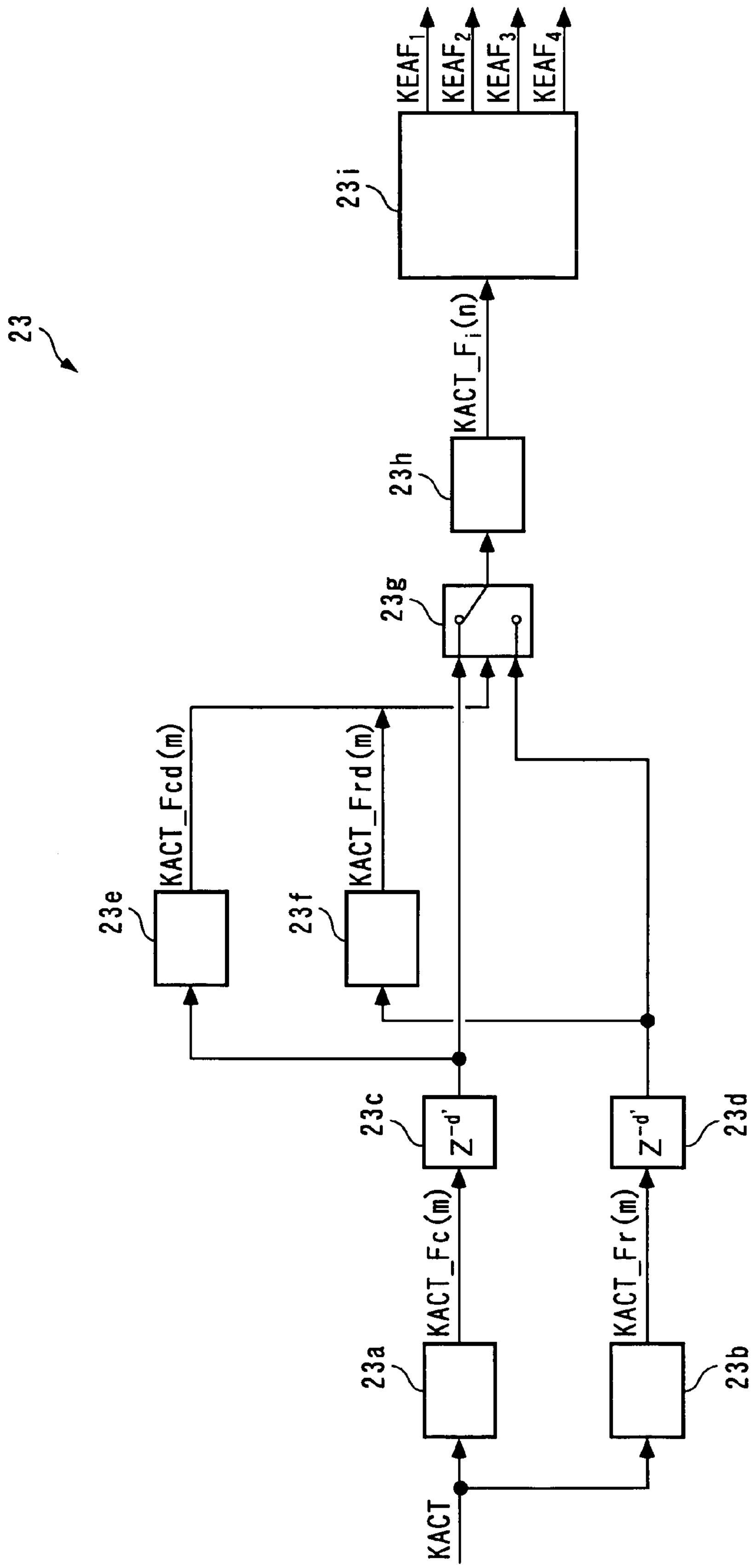
FIG. 11 is a block diagram of a variation-correcting section according to the first embodiment.

More specifically, as shown in FIG. 11, the variation-correcting section 23 is comprised of a cycle filter 23*a* (bandpass filter), a rotation filter 23*b* (bandpass filter), first and second delay elements 23*c* and 23*d* (dead time-setting means), first and second weighted average value-calculating sections 23*e* and 23*f* (weighted average value-calculating means), a control switch 23*g* (filter-selecting means), a calculating filtered value-determining section 23*h* (correction coefficient-fixing means), and a variation correction coefficient-calculating section 23*i* (correction parameter-calculating means, average value-calculating means, and correction coefficient-calculating means).

In the variation-correcting section 23, the cycle filter 23*a* and the rotation filter 23*b* generate (calculate) first and second filtered values KACT_Fc (m) and KACT_Fr (m) (bandpass filter outputs), respectively, and the first and second delay elements 23*c* and 23*d* delay outputs of the respective first and second filtered values KACT_Fc (m) and KACT_Fr (m) by a time period corresponding to predetermined dead time. Further, the first and second weighted average value-calculating sections 23*e* and 23*f* calculate first and second weighted average values KACT_Fcd (m) and KACT_Frd (m) (weighted average values of outputs from a plurality of bandpass filters), respectively, and the control switch 23*g* selects a calculating filtered value $KACT\_F_i$ (n) for calculating the variation correction coefficient $KEAF_i$. Then, finally, the calculating filtered value-determining section 23*h* determines a calculating filtered value $KACT\_F_i$ (n), and the variation correction coefficient-calculating section 23*i* calculates the variation correction coefficient $KEAF_i$ based on the determined calculating filtered value $KACT\_F_i$ (n) on a cylinder-by-cylinder basis.

Figure 12:
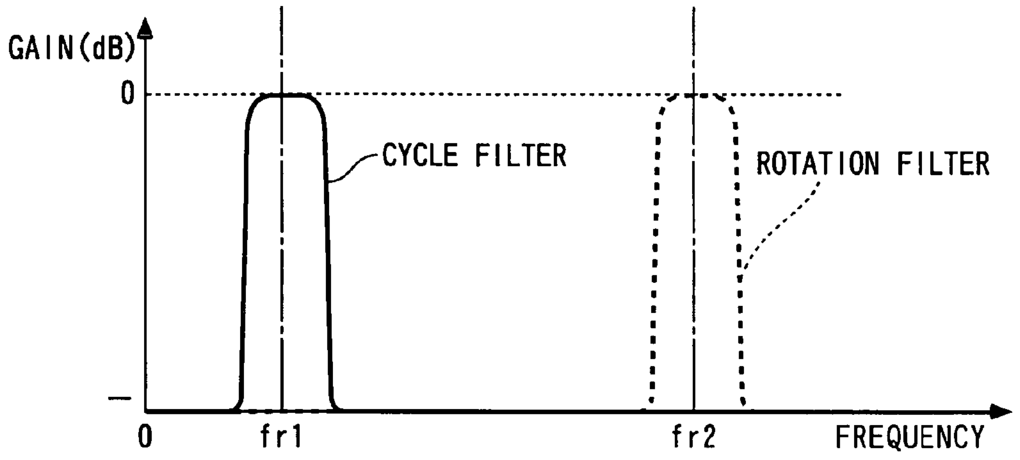
FIG. 12 is a diagram useful in explaining gain characteristics of a cycle filter and a rotation filter.

Next, a description will be given of the cycle filter 23*a* and the rotation filter 23*b*. The filters 23*a* and 23*b* are bandpass filters arranged in parallel with each other. The cycle filter 23*a* and the rotation filter 23*b* have gain characteristics as shown in FIG. 12. These filters are configured such that the gain of the cycle filter 23*a* is 0 dB when the frequency of the input signal is equal to the first frequency fr1, and the gain of the rotation filter 23*b* is 0 dB when the frequency of the input signal is equal to the second frequency fr2. The cycle filter 23*a* filters the latest output KACT from the LAF sensor 14 sampled in synchronism with input of each CRK signal pulse as described above, such that the components of the output KACT in the band of the first frequency fr1 are allowed to pass in synchronism with input of the CRK signal pulse, to thereby generate the first filtered value KACT_Fc (m). Similarly to the cycle filter 23*a*, the rotation filter 23*b* filters the output KACT from the LAF sensor 14 sampled in synchronism with input of the CRK signal pulse such that the components of the output KACT in the band of the second frequency fr2 are allowed to pass, to thereby generate the second filtered value KACT_Fr (m).

More specifically, the cycle filter 23*a* and the rotation filter 23*b* are IIR-type filters shown in the respective equations (20) and (21) in FIG. 13. The first and second filtered values KACT_Fc (m) and KACT_Fr (m) are calculated (generated) using the equations (20) and (21). The calculated first and second filtered values KACT_Fc (m) and KACT_Fr (m) are sequentially stored in a plurality of buffers for storing the first filtered values KACT_Fc (m) and a plurality of buffers for storing the second filtered values KACT_Fr (m), in synchronism with input of each CRK signal pulse. It should be noted that the initial values of the first and second filtered values KACT_Fc (m) and KACT_Fr (m) are calculated by setting KACT(m−1) to KACT(m−p) to a value of 1, and KACT_Fc(m−1) to KACT(m−q) and KACT_Fr(m−1) to KACT(m−q) to a value of 0. The symbol m represents a discretized time, and each portion with (m) represents discrete data sampled in timing synchronous with generation of each pulse of the CRK signal. This also applies to discrete data referred to hereinafter.

As is clear from the results of the experiment described hereinabove, the first and second filtered values KACT_Fc (m) and KACT_Fr (m) indicate the presence or absence of variation in air-fuel ratio between the cylinders by the presence or absence of a significant amplitude thereof. Further, in the case of the two-cylinder deviation pattern, the second filtered value KACT_Fr (m) changes with the larger amplitude to represent the relationship in air-fuel ratio between the cylinders by its positive and negative values. In the case of the non-two-cylinder deviation pattern, the first filtered value KACT_Fc (m) changes with the larger amplitude.

The first and second delay elements 23*c* and 23*d* delay the respective outputs of the first and second filtered values KACT_Fc (m) and KACT_Fr (m) by a time period corresponding to dead time from emission of exhaust gasses from each cylinder to arrival of the exhaust gasses at the LAF sensor 14, as will be described in detail hereinafter.

Then, the first weighted average value-calculating section 23*e* calculates the first weighted average value KACT_Fcd (m) by an equation (22) in FIG. 13, using the absolute value |KACT_Fc (m)| of the current value of the first filtered value output from the first delay element 23*c* and an averaging coefficient Ac. It should be noted that the averaging coefficient Ac is equal to 0.5, for example. As is apparent from this calculation method, the first weighted average value KACT_Fcd (m) is obtained by calculating the weighted average of the absolute value |KACT_Fcd (m−1)| of its immediately preceding value and the absolute value |KACT_Fc (m)| of the current value of the first filtered value.

Then, the second weighted average value-calculating section 23*f* calculates the second weighted average value KACT_Frd (m) by an equation (23) in FIG. 13, using an absolute value |KACT_Fr (m)| of the current value of the second filtered value output from the second delay element 23*d* and an averaging coefficient Ar. It should be noted that the averaging coefficient Ar is equal to 0.5, for example. As is apparent from this calculation method, the second weighted average value KACT_Frd (m) is obtained by calculating the weighted average of the absolute value |KACT_Frd (m−1)| of its immediately preceding value and the absolute value |KACT_Fr (m)| of the current value of the second filtered value.

Next, a description will be given of the control switch 23*g*. The control switch 23*g* selects the calculating filtered value $KACT\_F_i$ (n) for calculating the variation correction coefficient $KEAF_i$ from the first and second filtered values KACT_Fc (m) and KACT_Fr (m), based on the first weighted average value KACT_Fcd (m), and delivers the calculating filtered value $KACT\_F_i$ (n) to the calculating filtered value-determining section 23*h*. Thus, a filtered value with the larger amplitude is output as the calculating filtered value $KACT\_F_i$ (n), as will be described in detail hereinafter.

Then, the calculating filtered value-determining section 23*h* determines the calculating filtered value $KACT\_F_i$ (n) and delivers the determined calculating filtered value $KACT\_F_i$ (n) to the variation correction coefficient-calculating section 23*i*. More specifically, if the absolute value $|KACT\_F_i$ (n) of the input calculating filtered value is smaller than a predetermined threshold value KACT-_THRESH (e.g. 0.001), the calculating filtered value $KACT\_F_i$ (n) is set to 0. On the other hand, if $|KACT\_F_i$ (n)$| \geqq$ KACT_THRESH holds, the calculating filtered value $KACT\_F_i$ (n) input from the control switch 23*g* is delivered to the variation correction coefficient-calculating section 23*i*.

Then, the variation correction coefficient-calculating section 23*i* calculates the variation correction coefficient $KEAF_i$. More specifically, first, a variation correction coefficient provisional value $keaf_i$ (correction parameter) is calculated using the calculating filtered value $KACT\_F_i$ (n) input thereto, based on a PID control algorithm. The PID control algorithm is expressed by an equation (24) in FIG. 13. In the equation (24), FI, GI, and HI represent a P-term gain, an I-term gain, and a D-term gain, as respective predetermined feedback gains. It should be noted that the initial value of the variation correction coefficient provisional value $keaf_i$ is calculated by setting $KACT\text{-}F_i(n-4)$ to $KACT\text{-}F_i(n-4m)$ to 0.

Then, a moving average value KEAFave (average value of a plurality of correction parameters) of the variation correction coefficient provisional value $keaf_i$ is calculated using an equation (25) in FIG. 13. It should be noted that in the equation (25), a cylinder count mc is equal to 4 in the present embodiment, and the initial value of the moving average value KEAFave is calculated by setting each of the values $keaf_2$ to $keaf_4$ to 1. As is apparent from the equation (25), the moving average value KEAFave is the average value of the correction coefficient provisional values $keaf_1$ to $keaf_4$ of the first to fourth cylinders #1 to #4.

Then, using an equation (26) in FIG. 13, the variation correction coefficient provisional value $keaf_i$ is divided by the moving average value KEAFave, whereby the cylinder-by-cylinder variation correction coefficient $KEAF_i$ is calculated. The reason for calculating the variation correction coefficient $KEAF_i$ by dividing the variation correction coefficient provisional value $keaf_i$ by the moving average value KEAFave is to properly calculate the variation correction coefficient $KEAF_i$ by leveling off the influences of noise on the cylinder-by-cylinder variation correction coefficient $KEAF_i$ when the first and second filtered values KACT_Fc (m) and KACT_Fr (m) contain noise.

Further, when the absolute value $|KACT\_F_i$ (n)$|$ of the calculating filtered value is smaller than the threshold value KACT_THRESH, the variation correction coefficient $KEAF_i$ is calculated using the calculating filtered value $KACT\_F_i$ (n) set to 0. This holds the product (hereinafter referred to as "the P term") of the $KACT\_F_i$ (n) and the P-term gain FI in the equation (24) at 0, and the product (hereinafter referred to as "the I term") of the cumulative value of $KACT\_F_i$ (n) and the I-term gain GI at the value of the I-term set immediately before the above-mentioned condition ($|KACT\_F_i$ (n)$|$<KACT_THRESH) was satisfied. Further, if the above-described calculation of the variation correction coefficient $KEAF_i$ is continued, the product (hereinafter referred to as "the D term") of the difference between the current value of $KACT\_F_i$ (n) and the immediately preceding value of the same and the D-term gain HI in the equation (24) at 0.

As described above, when $|KACT\_F_i$ (n)$|$<KACT-_THRESH holds, the I term is held at the value set immediately before this condition has been satisfied, and the P term and the D term are held at 0. Further, since the calculating filtered value $KACT\_F_i$ (n) is approximately equal to 0 immediately before the condition has been satisfied, the P term and the D term are set to values approximately equal to 0. Therefore, the variation correction coefficient provisional value $keaf_i$ is calculated as a value approximately equal to a value calculated immediately before the condition has been satisfied, and fixedly held at the value. As a result, when the absolute value $|KACT\_F_i$ (n)$|$ of the calculating filtered value becomes smaller than the threshold value KACT_THRESH, the variation correction coefficient $KEAF_i$ calculated based on the variation correction coefficient provisional value $keaf_i$ as described above is fixedly held at the value approximately equal to the value calculated immediately before the condition has been satisfied. This makes it possible to prevent the variation correction coefficient $KEAF_i$ from being varied due to noise contained in the first and second filtered values KACT_Fc (m) and KACT_Fr (m), and hence to avoid the hunting phenomenon described hereinbefore.

Figure 14:
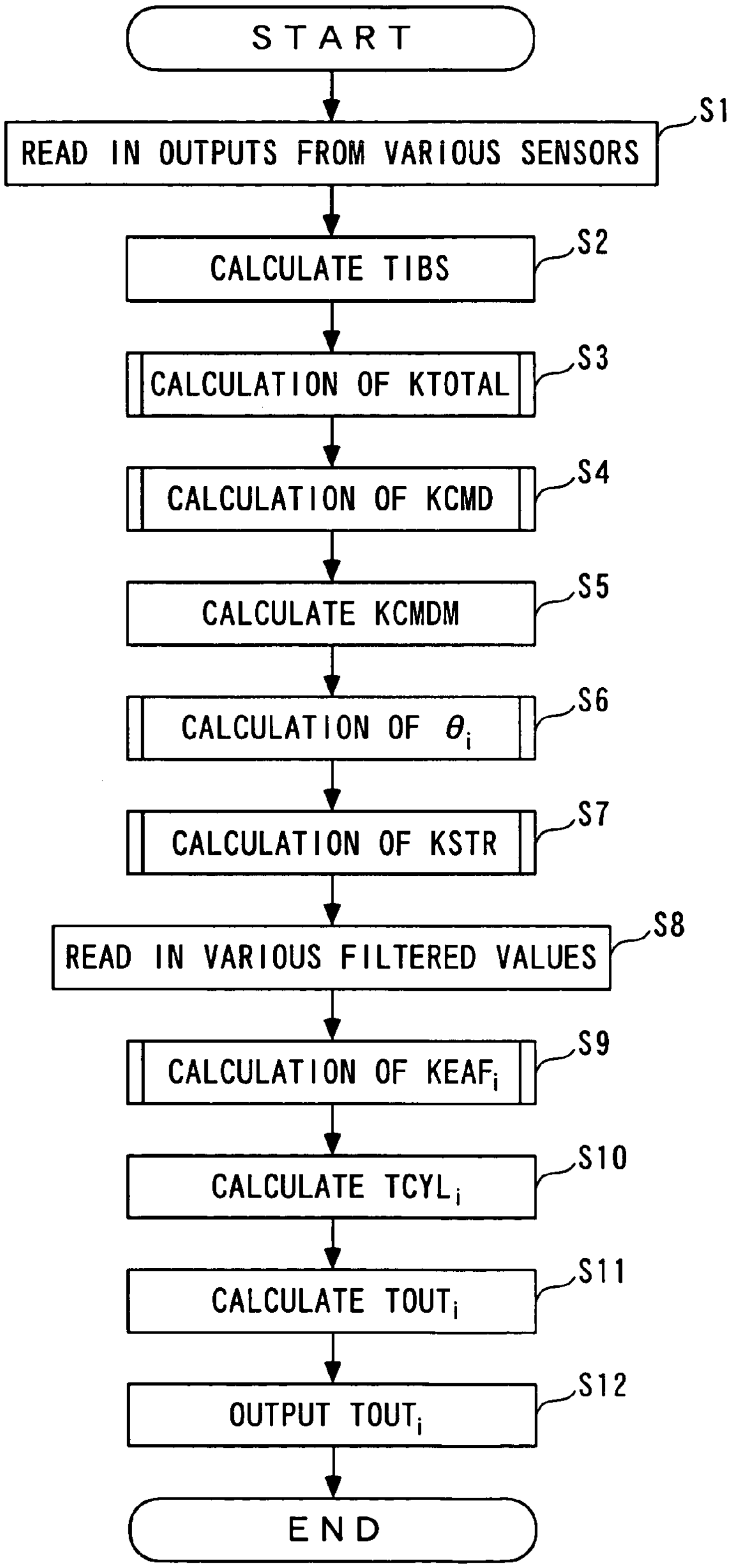
FIG. 14 is a flowchart of an air-fuel ratio control process.

In the following, a fuel injection control process including the air-fuel ratio control process, which is executed by the ECU 2, will be described in detail with reference to FIGS. 14 to 18. It should be noted that in the following description, the symbols (k), (n), and (m) indicative of current values will be omitted as appropriate. FIG. 14 shows a main routine of the present control process, which is executed by an interrupt handling routine in synchronism with input of each TDC signal pulse. In the present process, the final fuel injection amount $TOUT_i$ is calculated on a cylinder-by-cylinder basis.

First, in a step 1 (simplified to "S1" in FIG. 14; the following steps are also shown in the simplified manner), the outputs from the aforementioned sensors 10 to 18 are read in and stored in the RAM.

Then, the process proceeds to a step 2, wherein the basic fuel injection amount TIBS is calculated. In this process, the basic fuel injection amount TIBS is calculated by searching a map, not shown, according to the engine speed NE and the intake pipe absolute pressure PBA.

Then, the process proceeds to a step 3, wherein the total correction coefficient KTOTAL is calculated. The total correction coefficient KTOTAL is calculated by calculating various correction coefficients by searching associated tables and maps according to operating parameters (e.g. the intake air temperature TA, the atmospheric pressure PA, the engine coolant temperature TW, the accelerator opening AP, and the throttle valve opening TH), and then multiplying the thus calculated correction coefficients by each other.

Then, the process proceeds to a step 4, wherein the target air-fuel ratio KCMD is calculated. The process for calculation of the target air-fuel ratio KCMD is not shown here, but it is executed by the same control method as described in Japanese Laid-Open Patent Publication (Kokai) No. 2000-179385. That is, the target air-fuel ratio KCMD is calculated depending on the operating conditions of the engine 3, by a sliding mode control process or a map retrieval process such that the output Vout from the O2 sensor 15 converges to the predetermined target value Vop.

Then, the process proceeds to a step 5, wherein the corrected target air-fuel ratio KCMDM is calculated. The corrected target air-fuel ratio KCMDM compensates for a change in charging efficiency due to a change in the air-fuel ratio A/F. The corrected target air-fuel ratio KCMDM is calculated by searching a table, not shown, according to the target air-fuel ratio KCMD calculated in the step 4.

Then, in steps 6 and 7, the cylinder-by-cylinder model parameter vector $\theta_i$ and the feedback correction coefficient KSTR are calculated, respectively. Processes for calculating these parameters will be described in detail hereinafter.

Then in a step 8, the first and second filtered values KACT_Fc (m) and KACT_Fr (m), which are calculated by a filtered value-calculating process described in detail hereinafter, are read in and stored in the RAM. Next, in a step 9, the cylinder-by-cylinder variation correction coefficient $KEAF_i$ is calculated. The process for calculating the variation correction coefficient $KEAF_i$ will be described in detail hereinafter.

Then, the process proceeds to a step 10, wherein the cylinder-by-cylinder demanded fuel injection amount $TCYL_i$ is calculated using the thus calculated basic fuel injection amount TIBS, total correction coefficient KTOTAL, corrected target air-fuel ratio KCMDM, feedback correction coefficient KSTR, and variation correction coefficient KEAFi, by the following equation (27):

$$TCYL_i = TIBS \cdot KTOTAL \cdot KCMDM \cdot KSTR \cdot KEAF_i \tag{27}$$

Then, the process proceeds to a step 11, wherein the cylinder-by-cylinder final fuel injection amount $TOUT_i$ is calculated by subjecting the cylinder-by-cylinder demanded fuel injection amount $TCYL_i$ to fuel attachment-dependent correction. More specifically, the cylinder-by-cylinder final fuel injection amount $TOUT_i$ is calculated by calculating a ratio of an amount of fuel attached to the inner wall of the combustion chamber to the whole amount of fuel injected from the injector 6 during the current combustion cycle, and the like, depending on the operating conditions of the engine 3, and then correcting the cylinder-by-cylinder demanded fuel injection amount $TCYL_i$ based on the above-mentioned ratio and the like thus calculated.

Then, the process proceeds to a step 12, wherein the drive signal generated based on the cylinder-by-cylinder final fuel injection amount $TOUT_i$ calculated as described above is delivered to one of the injectors 6 associated with the present cylinder for which the current calculation is performed, followed by terminating the present process.

Figure 15:
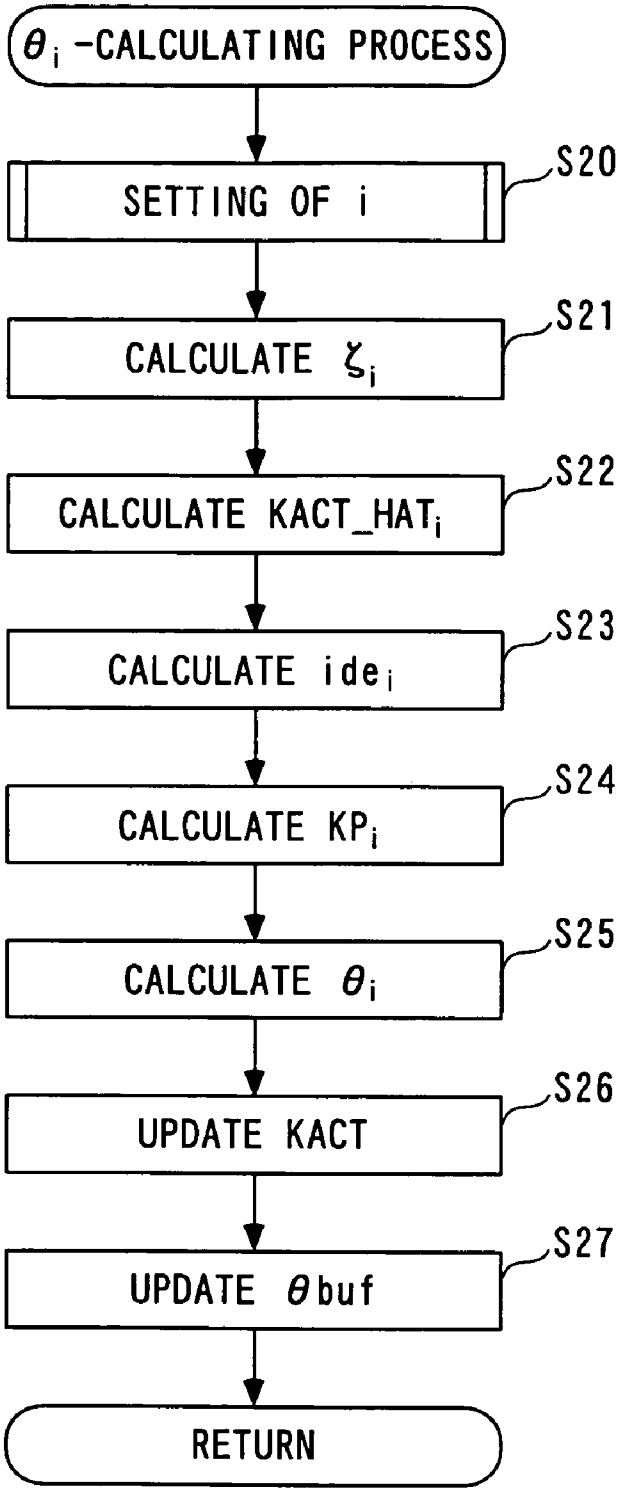
FIG. 15 is a flowchart of a process for calculating a model parameter vector, which is executed in a step in the air-fuel ratio control process in FIG. 14.

Next, the process for calculating the cylinder-by-cylinder model parameter vector $\theta_i$ executed in the step 6 will be described with reference to FIG. 15. In this process, first, in a step 20, there is carried out a process for setting the cylinder number value i which corresponds to the subscript "i" in each parameter.

In this process, which is not shown here, the cylinder number value i is set, based on the immediately preceding value PRVi thereof set in the immediately preceding loop and stored in the RAM, as follows: When PRVi=1 holds, the cylinder number value i is set to 3, when PRVi=2 holds, the same is set to 1, when PRVi=3 holds, the same is set to 4, and when PRVi=4 holds, the same is set to 2. That is, the cylinder number value i is cyclically set in the order of 1→3→4→2→1→3→4→2→1 . . . It should be noted that the initial value of the cylinder number value i is set based on the aforementioned cylinder-discriminating signal.

Then, the process proceeds to a step 21, wherein a vector $\zeta_i$ of the feedback correction coefficient KSTR and the detected air-fuel ratio KACT is calculated using the equation (17) in FIG. 4, referred to hereinbefore, and then in a step 22, the identified value $KACT\_HAT_i$ of the detected air-fuel ratio KACT is calculated using the equation (16) in FIG. 4, referred to hereinbefore.

Then, the process proceeds to a step 23, wherein the identification error $ide_i$ is calculated using the equation (15) in FIG. 4, referred to hereinbefore, and then in a step 24, the vector $KP_i$ of the gain coefficient is calculated using the equation (18) in FIG. 4, referred to hereinbefore. Then, the process proceeds to a step 25, wherein the model parameter vector $\theta_i$ is calculated using the equation (13) in FIG. 4.

Then, the process proceeds to a step 26, wherein a predetermined number (twelve, in the present embodiment) of values of the output KACT from the LAF sensor 14, which were calculated on and before the immediately preceding occasion and stored in the RAM, are updated. More specifically, each value of the output KACT stored in the RAM is set to an older value by one control cycle of the fuel injection control (for example, the current value KACT(n) is set to the immediately preceding value KACT(n−1), the immediately preceding value KACT(n−1) is set to the second preceding value KACT(n−2), and so forth).

Then, the process proceeds to a step 27, wherein a predetermined number (twelve, in the present embodiment) of oversampling values θbuf of the model parameter vector $\theta_1$ of the first cylinder #1, stored in the RAM, are updated. More specifically, similarly to the step 26, each of the oversampling values θbuf stored in the RAM is set to an older value by one control cycle of the fuel injection control (for example, the current oversampling value θbuf(n) is set to the immediately preceding oversampling value θbuf(n−1), the immediately preceding oversampling value θbuf(n−1) is set to the second preceding oversampling value θbuf(n−2), and so forth), followed by terminating the present process.

Figure 16:
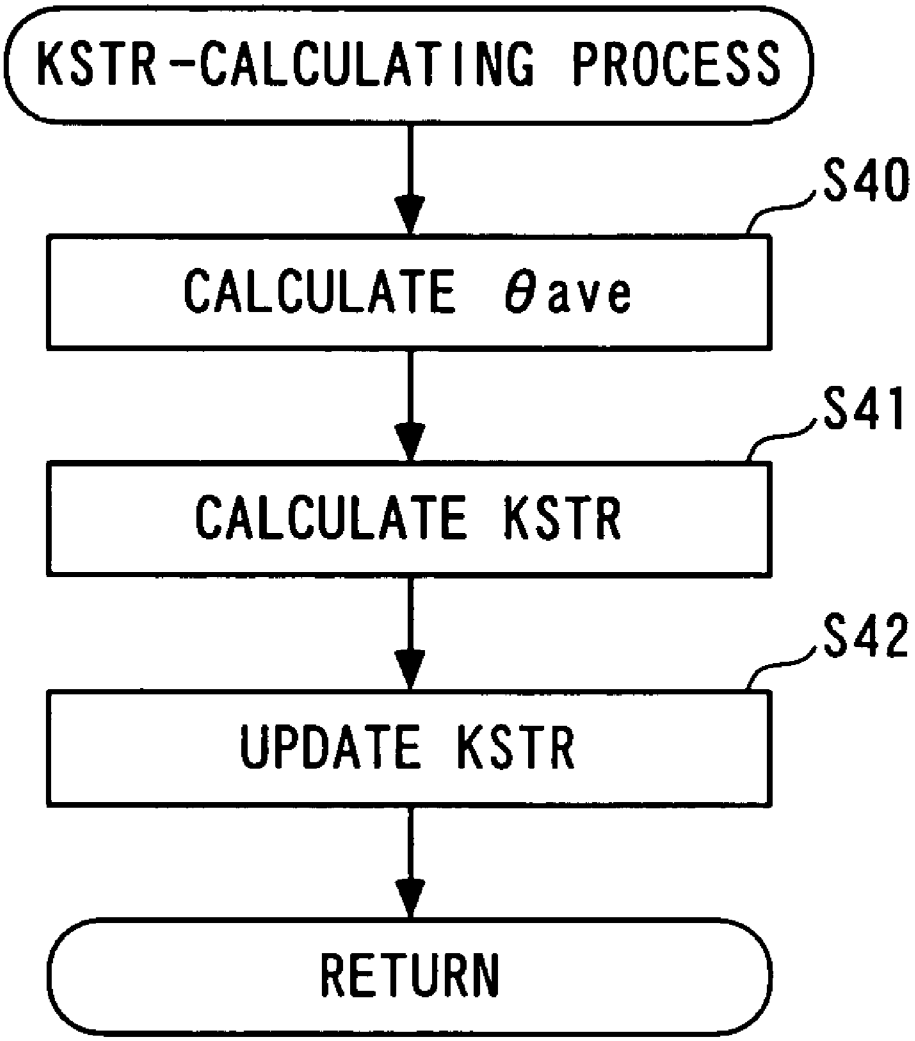
FIG. 16 is a flowchart of a process for calculating the feedback correction coefficient, which is executed in a step in the air-fuel ratio control process in FIG. 14.

Next, the process for calculating the feedback correction coefficient KSTR in the step 7 will be described with reference to FIG. 16. In this process, first, in a step 40, the moving average value θ_ave is calculated based on the oversampling values θbuf updated in the step 27, using the equation (10) in FIG. 4.

Then, in a step 41, the feedback correction coefficient KSTR is calculated based on the moving average value θ_ave calculated in the step 40, using the equation (12) in FIG. 4, referred to hereinbefore. It should be noted that the calculated feedback correction coefficient KSTR is compared with an upper limit value KSTRH (e.g. 1.7) and a lower limit value KSTRL (e.g. 0.3) and set to the upper limit value KSTRH when it is larger than the upper limit value KSTRH, and set to the lower limit value KSTRL when it is smaller than the lower limit value KSTRL.

Then, the process proceeds to a step 42, wherein a predetermined number (twelve in the present embodiment) of values of the feedback correction coefficient KSTR calculated in the preceding loops, which are stored in the RAM, are updated. More specifically, each value of the feedback correction coefficient KSTR is set to an older value by one control cycle (for example, the current value KSTR(n) is set to the immediately preceding value KSTR(n−1), the immediately preceding value KSTR(n−1) is set to the second preceding value KSTR(n−2), and so forth), and then the present process is terminated.

Figure 17:
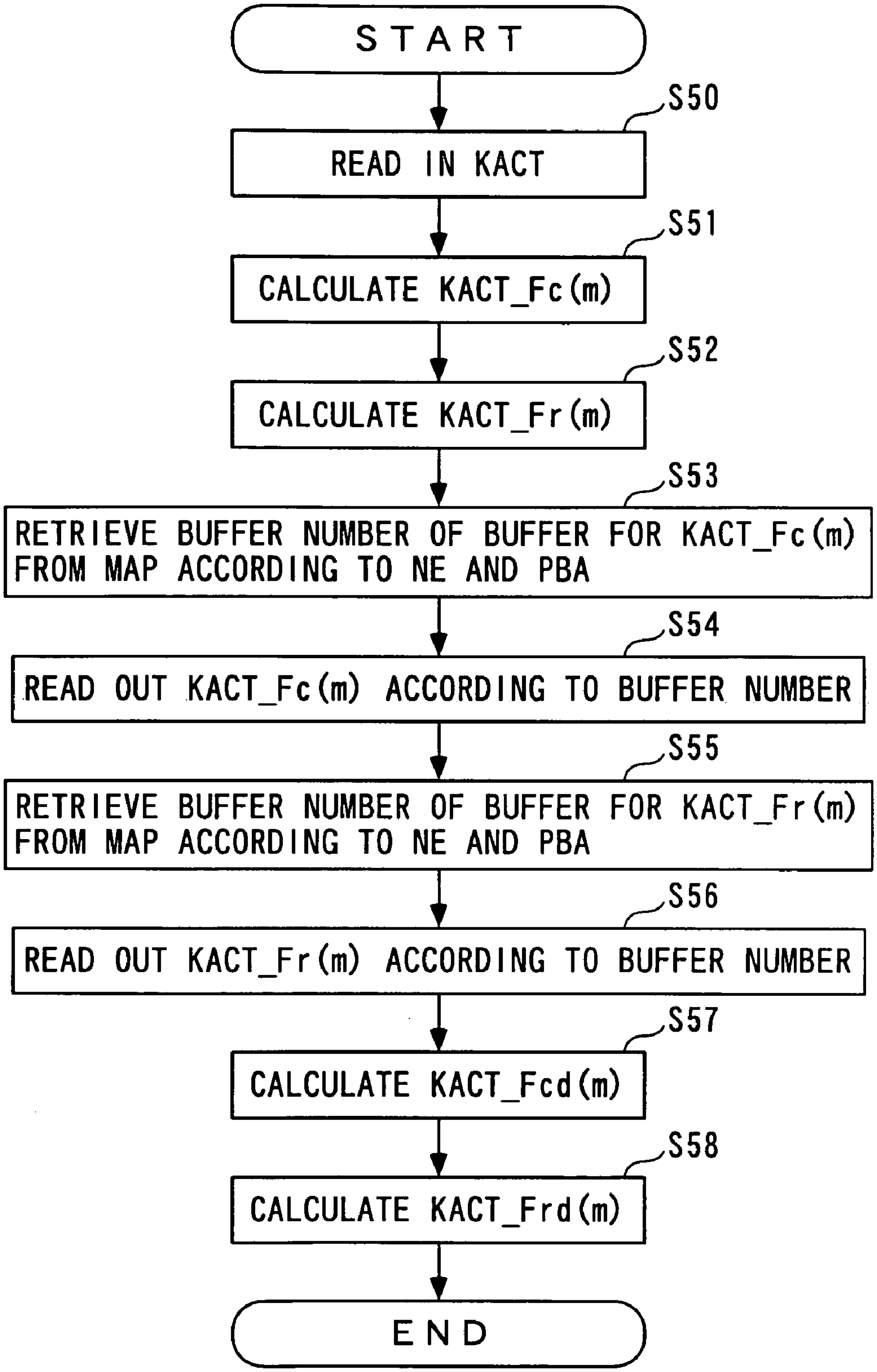
FIG. 17 is a flowchart of a filtered value-calculating process.

Next, the filtered value-calculating process for calculating the first and second filtered values KACT_Fc (m) and KACT_Fr (m) read in in the step S8 in FIG. 14 will be described with reference to FIG. 17. The present process is executed by an interrupt handling routine in synchronism with input of each CRK signal pulse. First, in a step 50, the output KACT from the KAF sensor 14 is read in and stored in the RAM. Then, in a step 51, the first filtered value KACT_Fc (m) is calculated using the equation (20) in FIG.

13, referred to hereinbefore, and the calculated first filtered value KACT_Fc (m) is sequentially stored in the buffers for storing the first filtered values KACT_Fc (m). Then, in a step 52, the second filtered value KACT_Fr (m) is calculated using the equation (21), referred to hereinbefore, and the calculated second filtered value KACT_Fr (m) is sequentially stored in the buffers for storing the second filtered values KACT_Fr (m).

The following steps 53 and 54 correspond to the process for delaying the output of the first filtered value KACT_Fc (m) by the first delay element 23*c* by a time period corresponding to dead time, described hereinabove. In the step 53, a buffer number is obtained from the buffer numbers of the buffers storing the first filtered values KACT_Fc (m) by searching a map (not shown) according to the intake pipe absolute pressure PBA and the engine speed NE. Next, the first filtered value KACT_Fc stored in the buffer having the obtained buffer number is read out as the first filtered value KACT_Fc (m) for calculating the cylinder-by-cylinder variation correction coefficient $KEAF_i$ (step 54).

In the above-mentioned map, the buffer numbers are set such that as the intake pipe absolute pressure PBA is higher and the engine rotating speed NE is lower, a value calculated earlier is selected as the first filtered value KACT_Fc (m) for calculating the variation correction coefficient $KEAF_i$. The reason for this is as follows: As the intake pipe absolute pressure PBA is higher, i.e. the load on the engine 3 is higher, the flow velocity of exhaust gasses becomes higher to reduce the dead time from emission of the exhaust gasses from each cylinder to arrival of the exhaust gasses at the LAF sensor 14. Further, as the engine speed NE is lower, the cycle or repetition period of the CRK signal in synchronism with which the output KACT is read from the LAF sensor 14 becomes longer, and hence assuming that the flow velocity of the exhaust gasses is constant, the number of pulses of the CRK signal generated before the exhaust gasses reach the LAF sensor 14 is reduced, which shortens the dead time relative to generation of the CRK signal pulses.

The following steps 55 and 56 correspond to the process for delaying the output of the second filtered value KACT_Fr (m) by the second delay element 23*d* by a time period corresponding to the dead time. In the step 55, similarly to the step 53 described above, a buffer number is obtained from the buffer numbers of the buffers storing the second filtered values KACT_Fr (m) by searching a map (not shown) according to the intake pipe absolute pressure PBA and the engine speed NE. In the next step 56, the second filtered value KACT_Fr stored in the buffer having the obtained buffer number is read out as the second filtered value KACT_Fr (m) for calculating the cylinder-by-cylinder variation correction coefficient $KEAF_i$. It should be noted that the characteristic of this map is similar to that of the map for use in retrieving a buffer number from the buffer numbers of the buffers for the first filtered values KACT_Fc (m), and therefore description thereof is omitted.

Next, the first weighted average value KACT_Fcd (m) is calculated by the equation (22), using the first filtered value KACT_Fc (m) selected in the steps 53 and 54, in a step 57. Then, the second weighted average value KACT_Frd (m) is calculated by the equation (23), using the second filtered value KACT_Fr (m) selected in the steps S55 and S56, in a step 58, followed by terminating the present process. The first and second filtered values KACT_Fc (m) and KACT_Fr (m) selected as above and the first and second weighted average values KACT_Fcd (m) and KACT_Frd (m) are read in and stored in the RAM in the step S8 in FIG. 14.

As described above, the output KACT from the LAF sensor 14 is sampled in synchronism with input of each CRK signal pulse, and the first and second filtered values KACT_Fc and KACT_Fr are calculated based on the sampled values KACT, and sequentially stored in the buffers (steps 50 to 52). Then, the buffer number corresponding to the dead time from emission of exhaust gasses from each cylinder to arrival of the exhaust gasses at the LAF sensor 14 is selected from each associated map according to the intake pipe absolute pressure PBA and the engine rotation speed NE (steps 53 and 55). Next, the first and second filtered values KACT_Fc and KACT_Fr stored in the respective buffers of the selected buffer numbers are read out as the first and second filtered values KACT_Fc (m) and KACT_Fr (m) for calculating the variation correction coefficient $KEAF_i$ (steps 54 and 56). Thus, after output of each pulse of the TDC signal corresponding to a time of emission of exhaust gasses from each cylinder, the first and second filtered values KACT_Fc and KACT_Fr are selected which are generated based on the output KACT from the LAF sensor 14 detected at the time of the lapse of dead time corresponding to the selected buffer number. As the result, the first and second filtered values KACT_Fc (m) and KACT_Fr (m) for calculating the variation correction coefficient $KEAF_i$ can be properly selected while compensating for the dead time.

Next, the process for calculating the variation correction coefficient $KEAF_i$ in the step 9 in FIG. 14 will be described in detail with reference to FIG. 18. First, it is determined in a step 60 whether or not the first weighted average value KACT_Fcd read in in the step 8 is larger than a predetermined reference value KACT_REF. As is apparent from FIGS. 9 and 10 referred to hereinbefore, the first weighted average KACT_Fcd has characteristics that the first weighted average KACT_Fcd is very small in the two-cylinder deviation pattern, and very large in the non-two-cylinder deviation pattern. Therefore, if the answer to the question of the step S60 is affirmative (YES), it is judged that the variation in air-fuel ratio between the cylinders is the non-two-cylinder deviation pattern, and the calculating filtered value $KACT\_F_i$ (n) is set to the first filtered value KACT_Fc (step S61). On the other hand, if the answer to the question of the step S60 is negative (NO), i.e. if $KACT\_Fcd \leqq KACT\_REF$ holds, it is judged the variation in air-fuel ratio between the cylinders is the two-cylinder deviation pattern, and the calculating filtered value $KACT\_F_i$ (n) is set to the second filtered value KACT_Fr (step 62).

Thus, in the non-two-cylinder deviation pattern, the first filtered value KACT_Fc having the larger amplitude is selected as the calculating filtered value $KACT\_F_i$ (n), while in the two-cylinder deviation pattern, the second filtered value KACT_Fc having the larger amplitude and representing the relationship in air-fuel ratio between the cylinders by its positive and negative values is selected as the calculating filtered value $KACT\_F_i$ (n). The process executed in the steps 60 to 62 corresponds to the selection of a filtered value by the control switch 23*g*, described hereinbefore.

In a step 63 following the step 61 or 62, it is determined whether or not the absolute value $|KACT\_F_i\ (n)|$ of the set calculating filtered value is smaller than the threshold value KACT_THRESH used by the calculating filtered value-determining section 23*h*. If the answer to the question of the step S63 is affirmative (YES), the filtered value with the larger amplitude is approximately equal to 0, so that it is judged that the variation in air-fuel ratio between the cylinders has been eliminated, and the calculating filtered value $KACT\_F_i$ (n) is set to 0 (step 64), followed by the process proceeding to a step 65.

On the other hand, if the answer to the question of the step 63 is negative (NO), i.e. if $|KACT\_F_i(n)| \geqq KACT\_THRESH$ holds, it is judged that there is variation in air-fuel ratio between the cylinders, and the process skips over the step 64 to the step 65.

In the step S65, the variation correction coefficient provisional value $keaf_i$ is calculated by the equation (24), using the calculating filtered value $KACT\_F_i$ (n) set in the step 61, 62 or 64. Then, the moving average value KEAFave is calculated by the equation (25), using the calculated variation correction coefficient provisional value $keaf_i$ (step 66).

Then, the variation correction coefficient $KEAF_i$ is calculated by the equation (26), using the variation correction coefficient provisional value $keaf_i$ and the moving average value KEAFave calculated in the respective steps 65 and 66 (step 67), followed by terminating the present process.

Next, a description will be given of a process for correcting variation in air-fuel ratio between the cylinders by the variation correction coefficient $KEAF_i$ calculated as above. As described hereinbefore, the first and second filtered values KACT_Fc and KACT_Fr are read in in timing synchronous with output of each TDC signal pulse (step 8 in FIG. 14), and one of the first and second filtered values read in which has the larger amplitude is selected as the cylinder-by-cylinder calculating filtered value $KACT\_F_i$ (n) (steps 60 to 62 in FIG. 18). Then, the variation correction coefficient $KEAF_i$ is calculated based on the selected calculating filtered value $KACT\_F_i$ (n) (steps 65 to 67) by the equations (24) to (26).

As described above, the cylinder-by-cylinder calculating filtered value $KACT\_F_i$ (n) is set to one of the first and second filtered values KACT_Fc and KACT_Fr which has the larger amplitude. Therefore, in the two-cylinder deviation pattern (equivalent ratios associated with the cylinders #1 and #4>equivalent ratios associated with the cylinders #2 and #3) shown in FIG. 9, the calculating filtered value $KACT\_F_i$ (n) is set to the second filtered value KACT_Fr whenever a pulse of the TDC signal is output. As described hereinbefore, the second filtered value KACT_Fr excellently reflects the cylinder-by-cylinder air fuel ratio through compensation of dead time, so that the relationship in air-fuel ratio between the cylinders is excellently represented by the positive and negative values of the second filtered value KACT_Fr. Therefore, as is apparent from FIG. 9 and the results of the experiments described hereinbefore, the calculating filtered values KACT-Fi(n) in the two-cylinder deviation pattern are set such that the calculating filtered values $KACT\_F_1$ (n) and $KACT\_F_4$ (n) are set to positive values, and the calculating filtered values $KACT\_F_2$ (n) and $KACT\_F_3$ (n) are set to negative values.

As a result, as is apparent from the equations (24) to (26), the variation correction coefficient $KEAF_1$ for the cylinder #1 and the variation correction coefficient $KEAF_4$ for the cylinder #4 are calculated as positive values smaller than 1, while the variation correction coefficient $KEAF_2$ for the cylinder #2 and the variation correction coefficient $KEAF_3$ for the cylinder #3 are calculated as values larger than 1. Thus, the air-fuel ratios associated with the respective four cylinders #1 to #4 are controlled such that the final fuel injection amounts $TOUT_1$ and $TOUT_4$ for the respective cylinders #1 and #4 having the larger equivalent ratios associated therewith are reduced, and the final fuel injection amounts $TOUT_2$ and $TOUT_3$ for the respective cylinders #2 and #3 having the smaller equivalent ratios associated therewith are increased, i.e. such that the air-fuel ratios associated with the respective four cylinders #1 to #4 are leveled off. The cylinder-by-cylinder final fuel injection amount $TOUT_i$ is thus calculated such that variation in air-fuel ratio between the cylinders is eliminated, i.e. such that the amplitude of the first or second filtered value KACT_Fc or KACT_Fr becomes equal to 0.

On the other hand, in the non-two-cylinder deviation pattern, i.e. in the variation pattern (equivalent ratios associated with the cylinder #3<equivalent ratios associated with the cylinders #1, #2 and #4) shown in FIG. 10, for example, the calculating filtered value $KACT\_F_i$ (n) is set to the first filtered value KACT_Fc. Similarly to the second filtered value KACT_Fr, the first filtered value KACT_Fc excellently reflects the cylinder-by-cylinder air fuel ratio through compensation of dead time. Therefore, as is apparent from FIG. 10 and the results of the experiments described hereinbefore, the calculating filtered values $KACT\_F_1$ (n) and $KACT\_F_4$ (n) for the respective cylinders #1 and #4 are set to 0, the calculating filtered value $KACT\_F_3$ (n) for the cylinder #3 is set to a negative value, and the calculating filtered value $KACT\_F_2$ (n) for the cylinder #2 is set to a positive value.

As a result, the variation correction coefficient $KEAF_1$ for the cylinder #1 and the variation correction coefficient $KEAF_4$ for the cylinder #4 are calculated as a value of 1, the variation correction coefficient $KEAF_3$ for the cylinder #3 as a value larger than 1, and the variation correction coefficient $KEAF_2$ for the cylinder #2 as a positive value smaller than 1. This increases the final fuel injection amount $TOUT_3$ for the cylinder #3 having the smaller equivalent ratio associated therewith, and reduces the final fuel injection amount $TOUT_2$ for the cylinder #2, so that the air-fuel ratios associated with the respective four cylinders #1 to #4 come to exhibit the two-cylinder deviation pattern an example of which is shown in FIG. 9. Thereafter, the correction by the variation correction coefficient $KEAF_i$ for the two-cylinder deviation pattern is executed, whereby the air-fuel ratios associated with the respective four cylinders #1 to #4 are controlled such that they are leveled off. As described above, in the two-cylinder deviation pattern as well, the cylinder-by-cylinder final fuel injection amount $TOUT_i$ is calculated such that variation in air-fuel ratio between the cylinders is finally eliminated, i.e. such that the amplitudes of the first and second filtered values KACT_Fc and KACT_Fr become equal to 0.

Although not shown, also when there is variation in air-fuel ratio between the cylinders in another non-two-cylinder deviation pattern than one shown in FIG. 10, due to the variation correction coefficient $KEAF_i$ calculated based on the first or second filtered value KACT_Fc or KACT_Fr, the air-fuel ratios associated with the four cylinders #1 to #4 are controlled such that the air-fuel ratios are leveled off, whereby the variation in air-fuel ratio between the cylinders is eliminated.

Further, when the absolute value $|KACT\_F_i$ (n)$|$ of the calculating filtered value is smaller than the threshold value KACT_THRESH (YES to step 63 in FI. 18), it is judged that the variation in air-fuel ratio between the cylinders has been eliminated, so that the calculating filtered value $KACT\_F_i$ (n) is set to 0 (step 64), whereafter the variation correction coefficient $KEAF_i$ is calculated using the thus set calculating filtered value $KACT\_F_i$ (n) (step 65 to 67). As a result, as described hereinbefore, the variation correction coefficient $KEAF_i$ is fixedly held at a value approximately equal to the value of the variation correction coefficient $KEAF_i$ calculated in the immediately preceding loop.

Figure 19:
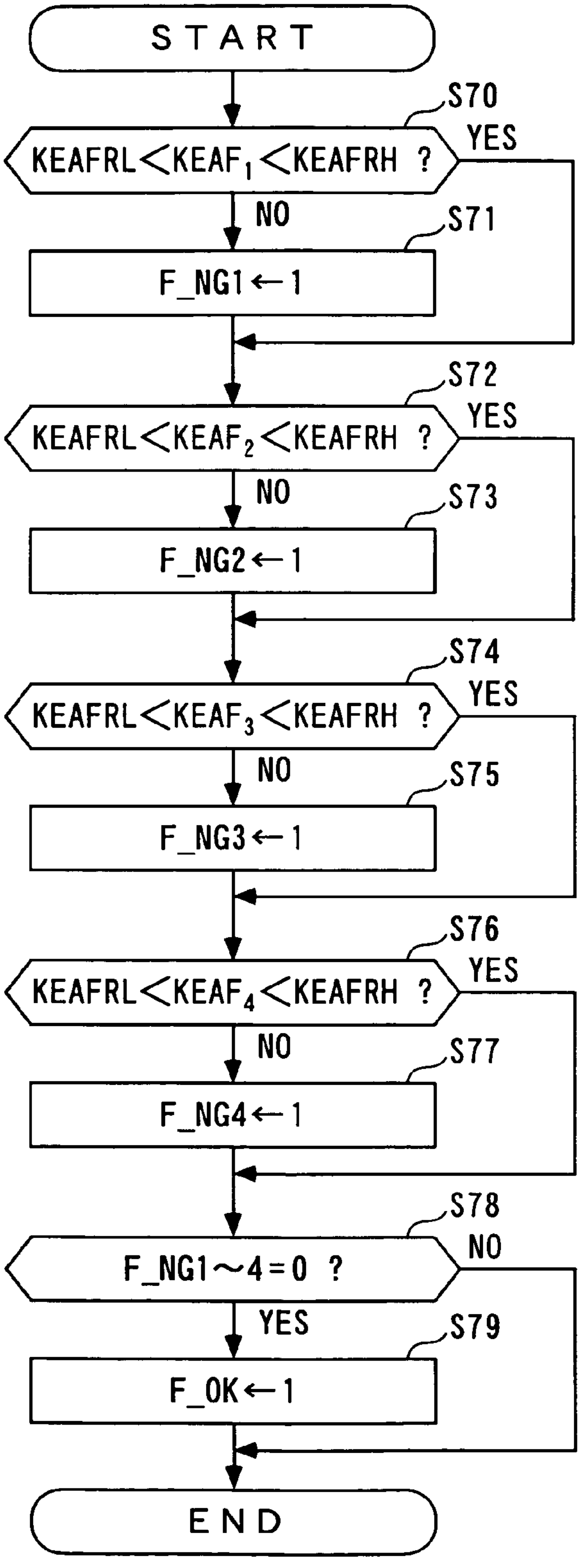
FIG. 19 is a flowchart of a process for determining whether or not a fuel supply system of each cylinder is normally operating.

Next, a process executed by the ECU 2 for determining whether or not the fuel supply system of each cylinder including the injector 6 and the intake valve is operating normally will be described in detail with reference to a flowchart in FIG. 19. The present process is executed e.g. whenever each pulse of the TDC signal is input. First, it is determined in a step 70 whether or not the variation correction coefficient $KEAF_1$ calculated for the first cylinder #1 in the step 67 is larger than a first reference value KEAFRL and smaller than a second reference value KEAFRH.

If the answer to the question is negative (NO), i.e. if $KEAF_1 \leqq KEAFRL$ or $KEAF_1 \geqq KEAFRL$ holds, it is judged that the variation correction coefficient $KEAF_1$ for the first cylinder #1 is too small or too large, and hence it is determined that the fuel supply system including the injector 6 and the intake valve is not operating normally, and a first abnormality flag F_NG1 is set to 1 (step 71) so as to indicate the fact, followed by the process proceeding to a step 72. On the other hand, if the answer to the question of the step 70 is affirmative (YES), i.e. if $KEAFRL<KEAF_1<KEAFRH$ holds, the process skips over the step 71 to the step 72.

The reason why it is determined that the fuel supply system is not operating normally in the above-mentioned case is as follows: As is obvious from the calculation method described hereinbefore, the variation correction coefficient $KEAF_i$ represents original relative variation in air-fuel ratio between the cylinders exhibited in a case where correction has not been made by the variation correction coefficient $KEAF_i$. The original variation in air-fuel ratio between the cylinders occurs due to variation in operating characteristics of the fuel supply system between the cylinders. Therefore, when the variation correction coefficient $KEAF_i$ is too large or too small, the operating characteristics of the fuel supply system of the cylinder are very different from those of the fuel supply system of the other cylinders and hence it can be determined that the fuel supply system is not operating normally. Further, similarly to the step 70 and 71, the following steps 72 to 77 are executed to determine whether or not the fuel supply systems of the respective cylinders #2 to #4 are operating normally.

More specifically, in each of the steps 72, 74 and 76, it is determined whether or not the corresponding one of the variation correction coefficients $KEAF_2$ to $KEAF_4$ of the cylinders #2 to #4 is larger than the first reference value KEAFRL and smaller than the second reference value KEAFRH. If the answer to the question is negative (NO), it is judged that the fuel supply system of the corresponding cylinder is not operating normally, and the corresponding one of second to fourth abnormality flags F_NG2 to F_NG4 is set to 1 (steps 73, 75, and 77). It should be noted that the first to fourth abnormality flags F_NG1 to F_NG4 are reset to 0 at the start of the engine 3.

Then, it is determined in a step 78 whether or not the first to fourth abnormality flags F_NG1 to F_NG4 are all 0. If the answer to the question is affirmative (YES), it is judged that the fuel supply systems of all the cylinders are operating normally, and a fuel supply system normality flag F_OK is set to 1 (step 79), followed by terminating the present process. On the other hand, if the answer to the question of the step 78 is negative (NO), i.e. if any of the first to fourth abnormality flags F_NG1 to F_NG4 is 1, the step 79 is skipped, followed by terminating the present process.

Figure 21:
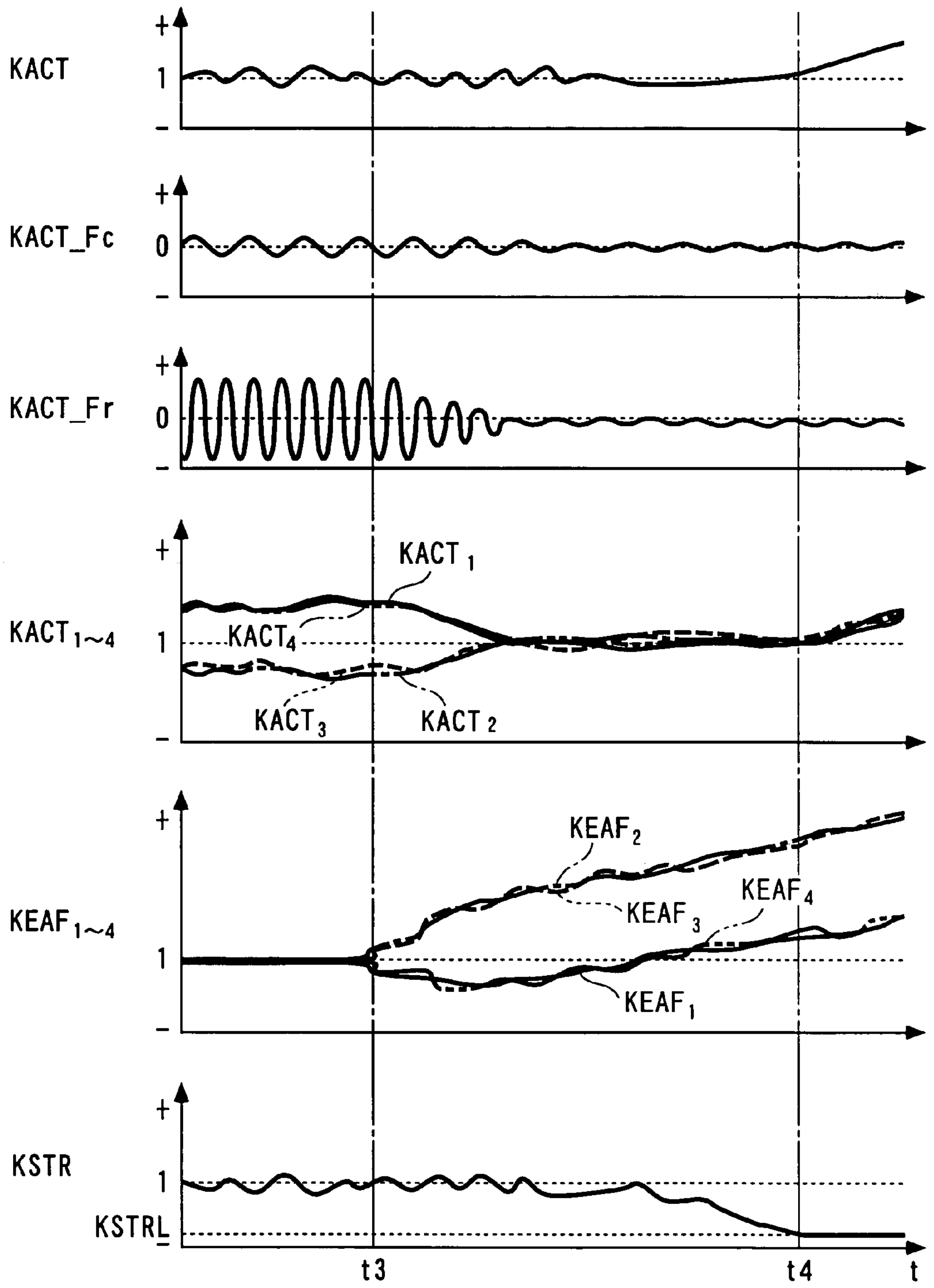
FIG. 21 is a timing chart showing a first comparative for comparison with the example in FIG. 20.
Figure 22:
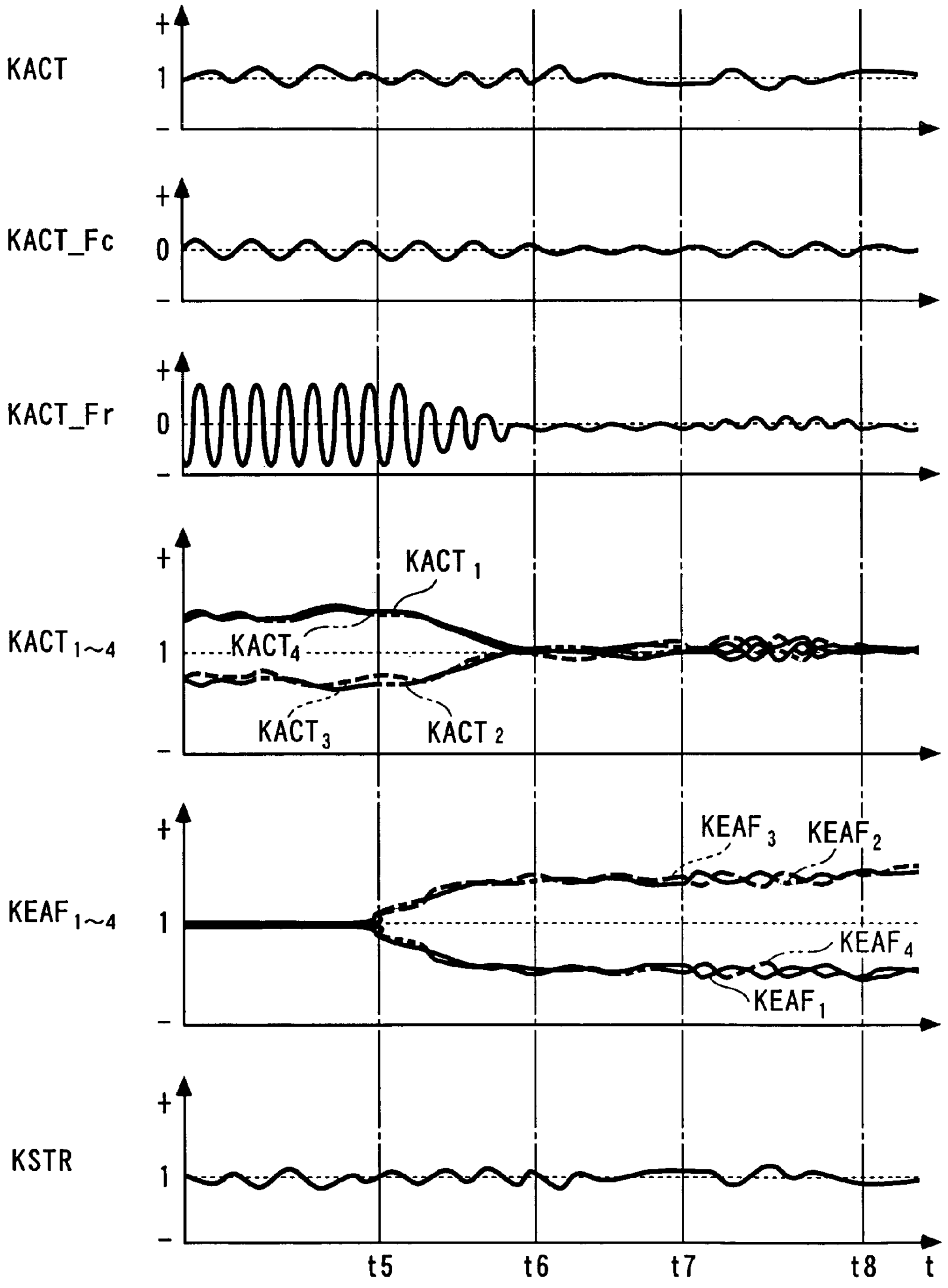
FIG. 22 is a timing chart showing a second comparative for comparison with the example in FIG. 20.

Next, a description will be given of an example of the operation of the air-fuel ratio control by the air-fuel ratio control system 1 in the case where there is variation in air-fuel ratio between the cylinders, in comparison with first and second comparative examples, with reference to FIGS. 20 to 24. The first comparative example in FIG. 21 shows a case where the variation correction coefficient $KEAF_i$ is directly set to the correction coefficient provisional value $keaf_i$ without execution of the process for calculating the variation correction coefficient $KEAF_i$ by dividing the correction coefficient provisional value $keaf_i$ by the moving average value KEAFave according to the equation (26) (this process will be hereinafter referred to as "the correction coefficient averaging process"). The second comparative example in FIG. 22 shows a case where the variation correction coefficient $KEAF_i$ in the present embodiment is continuously calculated and updated without execution of the process for fixing the variation correction coefficient $KEAF_i$ after elimination of variation in air-fuel ratio between the cylinders (this process will be referred to as "the correction coefficient fixing process").

Each of these examples shows operations of correction performed using the variation correction coefficient $KEAF_i$, under the condition of the first and second filtered values KACT_Fc and KACT_Fr containing noise, in a case where the output KACT from the LAF sensor 14 is controlled to a value of 1 (equivalent ratio corresponding to the stoichiometric air-fuel ratio) by the STR 22. It should be noted that in FIGS. 20 to 24, the values $KACT_{1-4}$ represent respective values of the air-fuel ratio (values in terms of the equivalent ratio) of exhaust gases which have been emitted from the first to fourth cylinders #1 to #4 but not mixed yet. More specifically, the values $KACT_{1-4}$ correspond to respective outputs from four LAF sensors (not shown) which are additionally disposed in the exhaust manifold 7*a* for experiment at respective locations immediately downstream of the exhaust ports of the cylinders #1 to #4.

Figure 20:
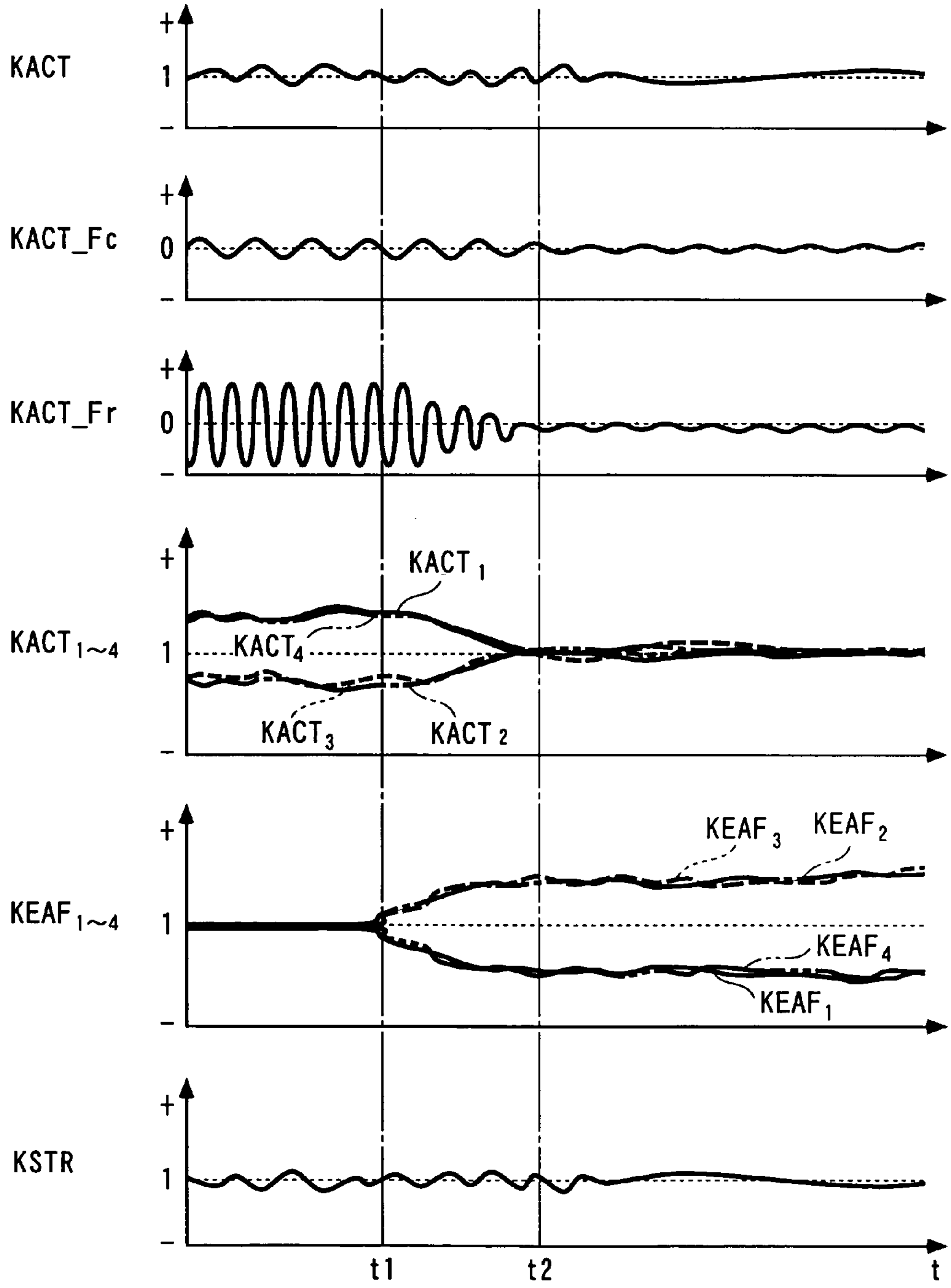
FIG. 20 is a timing chart showing an example of operations of the air-fuel ratio control executed by the air-fuel ratio control system when the variation pattern is the two-cylinder deviation pattern.

As shown in FIG. 20, in the two-cylinder deviation pattern ($KACT_1=KACT_4>KACT_3=KACT_2$), the output KACT from the LAF sensor 14 remains slightly unstable until correction by the variation correction coefficient $KEAF_i$ is started (up to time t1). Further, the second filtered value KACT_Fr changes with a large amplitude to represent the relationship in air-fuel ratio between the cylinders by its positive and negative values, whereas the first filtered value KACT_Fc changes with a small amplitude.

In this case, when the correction by the variation correction coefficient $KEAF_i$ is started (time t1), the second filtered value KACT_Fr is selected as the calculating filtered value $KACT\_F_i$ for calculating the variation correction coefficient $KEAF_i$, as described hereinbefore. Further, of the variation correction coefficients $KEAF_i$ calculated based on the second filtered value KACT_Fr, the variation correction coefficients $KEAF_1$ and $KEAF_4$ for the first and fourth cylinders #1 and #4 are reduced to a smaller positive value than 1, and the variation correction coefficients $KEAF_2$ and $KEAF_3$ for the second and third cylinders #2 and #3 are increased to a larger value than 1. Due to the changes in the variation correction coefficients $KEAF_i$ for the respective cylinders, the values $KACT_1$ and $KACT_4$ decrease, and the values $KACT_2$ and $KACT_3$ increase, whereby the air-fuel ratios associated with the four cylinders #1 to #4 are controlled such that they are leveled off.

As a result, the values $KACT_{1-4}$ all converge to a value of 1 (equivalent ratio corresponding to the stoichiometric air-fuel ratio) at time t2. Accordingly, the first and second filtered values KACT_Fc and KACT_Fr converge to 0, that is, the amplitude of each of the filtered values converges to a value of 0, and the output KACT from the LAF sensor 14 converges to a value of 1. Further, the variation correction coefficients $KEAF_1$ and $KEAF_4$ for the first and fourth cylinders #1 and #4 are stabilized and converge to a value slightly smaller than 1, while the variation correction coefficients $KEAF_2$ and $KEAF_3$ for the second and third cylinders #2 and #3 are stabilized and converge to a value slightly larger than 1. As described above, the air-fuel ratio control system 1 of the present embodiment is capable of controlling the air-fuel ratios associated with the four cylinders #1 to #4 such that they are leveled off, and properly eliminating variation in air-fuel ratio between the cylinders. It should be noted that the first and second filtered values KACT_Fc and KACT_Fr do not completely converge to 0 even after elimination of variation in air-fuel ratio between the cylinders, due to the influence of noise contained in the filtered values.

In contrast, in the first comparative example shown in FIG. 21, the variation correction coefficient $KEAF_i$ is directly set to the correction coefficient provisional value $keaf_i$, and hence after the start of the correction (time t3), each of the variation correction coefficients $KEAF_1$ to $KEAF_4$ for the first to fourth cylinders #1 to #4 progressively increases without being stabilized, due to the influence of noise contained in the second filtered value KACT_Fr. Further, with the increase in the variation correction coefficient $KEAF_i$, the feedback correction coefficient KSTR is reduced to a smaller value than 1 to prevent the output KACT from the LAF sensor 14 from increasing from a value of 1. Then, when the variation correction coefficient $KEAF_i$ further increases due to the influence of noise, and the feedback correction coefficient KSTR reaches its lower limit value KSTRL (time t4), each of the values $KACT_{1-4}$ starts to increase from a value close to 1, and accordingly the output KACT from the LAF sensor 14 also starts to increase from around 1.

As described above, the present embodiment is distinguished from the first comparative example in which the variation correction coefficient $KEAF_i$ is directly set to the correction coefficient provisional value $keaf_i$, in that even when the first and second filtered values KACT_Fc and KACT_Fr contain noise, the variation correction coefficient $KEAF_i$ can be stabilized by executing the correction coefficient averaging process. Therefore, even when the first and second filtered values KACT_Fc and KACT_Fr contain noise, correction can be properly performed, using the feedback correction coefficient KSTR, so as to cause the output KACT from the LAF sensor 14 to converge to the target air-fuel ratio KCMD.

On the other hand, in the second comparative example shown in FIG. 22, the cylinder-by-cylinder variation correction coefficient $KEAF_i$ is continuously calculated and updated after the start of correction (time t5) and even after elimination of variation in air-fuel ratio (time t6), and hence the variation correction coefficients $KEAF_1$ to $KEAF_4$ for the respective first to fourth cylinders #1 to #4 change such that each of them repeatedly increases and decreases in a short cycle, due to the influence of noise contained in the first and second filtered values KACT_Fc and KACT_Fr (after time t7). As the values $KACT_{1-4}$ start to slightly vary again with respect to a value of 1 in accordance with the changes in the respective variation correction coefficients $KEAF_1$ to $KEAF_4$, the respective amplitudes of the first and second filtered values KACT_Fc and KACT_Fr become slightly larger. Thereafter (after time t8), the values $KACT_{1-4}$ converge to a value of 1 again in accordance with stabilization of the variation correction coefficients $KEAF_1$ to $KEAF_4$, which causes the first and second filtered values KACT_Fc and KACT_Fr to converge to 0. Thus, the hunting phenomenon occurs in which the variation and convergence of the values $KACT_{1-4}$ is repeated.

The present embodiment is distinguished from the second comparative example in that the correction coefficient fixing process is executed after elimination of variation in air-fuel ratio to thereby prevent variation in the variation correction coefficient $KEAF_i$ due to noise contained in the first and second filtered values KACT_Fc and KACT_Fr. Consequently, the present embodiment makes it possible to avoid the hunting phenomenon, thereby maintaining a state free of variation in air-fuel ratio between the cylinders.

The hunting phenomenon could be avoided e.g. by setting each of the feedback gains FI, GI and HI used in the equation (24) for calculating the variation correction coefficient $KEAF_i$ to a smaller value. In this case, however, the first and second filtered values KACT_Fc and KACT_Fr cannot converge to 0 quickly, and hence variation in air-fuel ratio between the cylinders cannot be eliminated quickly. In contrast, the present embodiment executes the correction coefficient fixing process to thereby make it possible to avoid the hunting phenomenon without setting the gains including the gain GI to smaller values. Therefore, variation in air-fuel ratio between the cylinders can be eliminated quickly, which makes it possible to fully respond to a transitional operation or the like of the engine 3 in which quick elimination of variation in air-fuel ratio is particularly necessitated.

Figure 23:
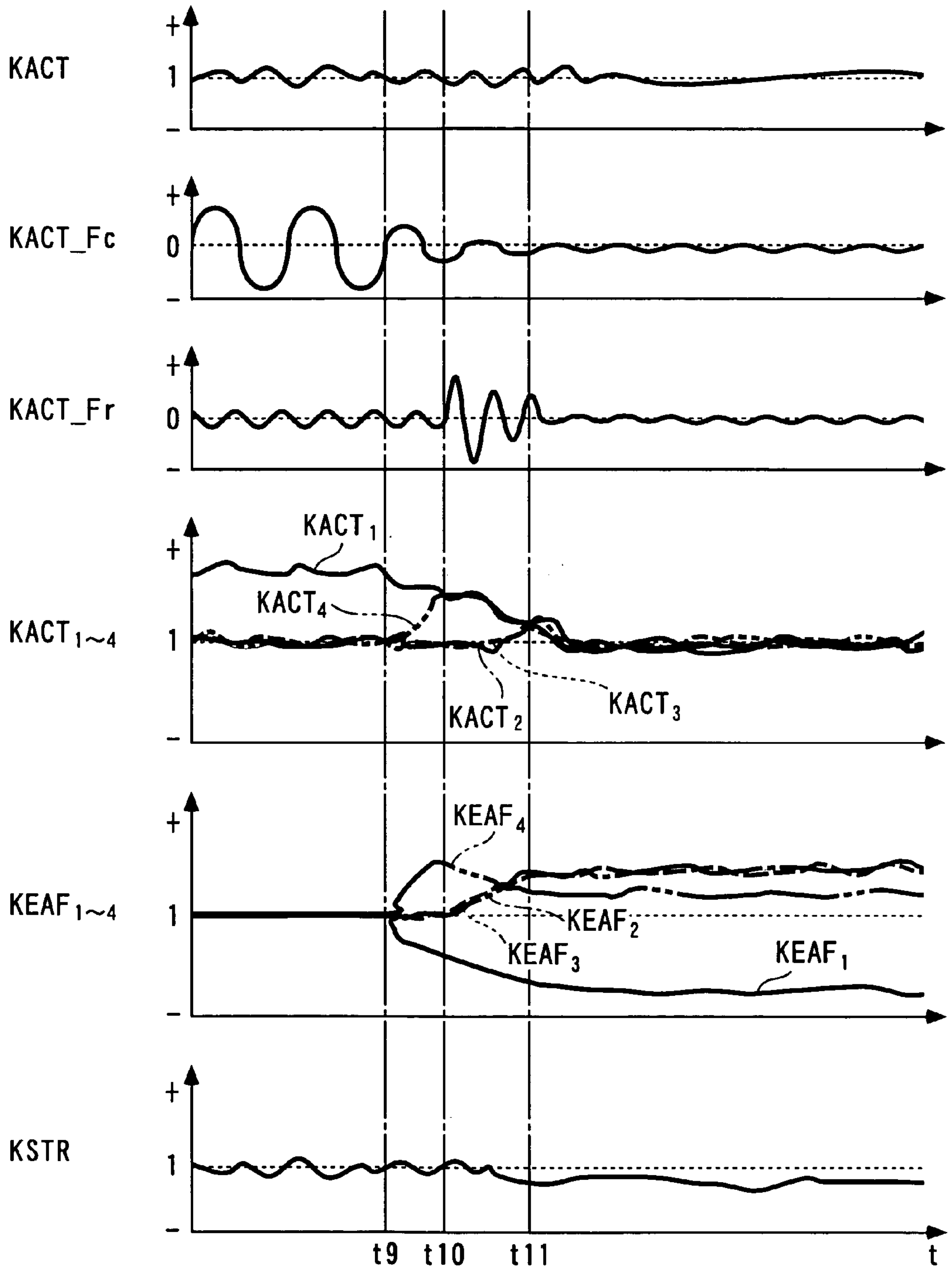
FIG. 23 is a timing chart showing an example of operations of the air-fuel ratio control executed by the air-fuel ratio control system when the variation pattern is the non-two-cylinder deviation pattern.

FIG. 23 shows an example of operations in the non-two-cylinder deviation pattern, e.g. in a variation pattern where the air-fuel ratio of a mixture supplied to the first cylinder #1 is richer than those associated with the other cylinders ($KACT_i > KACT_2 = KACT_3 = KACT_4$). First, similarly to the two-cylinder deviation pattern, the output KACT from the LAF sensor 14 remains slightly unstable until correction by the variation correction coefficient $KEAF_i$ is started (up to time t9). Further, the first filtered value KACT_Fc changes with a large amplitude, whereas the second filtered value KACT_Fr changes with a small amplitude.

In this case, when the correction by the variation correction coefficient $KEAF_i$ is started (time t9), the first filtered value KACT_Fc is selected as the calculating filtered value $KACT\_F_i$. Then, of the variation correction coefficients $KEAF_i$ calculated based on the first filtered value KACT_Fc, the variation correction coefficients $KEAF_2$ and $KEAF_3$ for the second and third cylinders #2 and #3 are held at a value of 1, the variation correction coefficient $KEAF_1$ for the first cylinder #1 is reduced to a positive value than smaller 1, and $KEAF_4$ for the fourth cylinder #4 is increased to a value larger than 1. When the variation correction coefficients $KEAF_i$ change as above, the values KACT2 and KACT3 do not either increase or decrease, but the value $KACT_1$ decreases and the value $KACT_4$ increases.

As a result, at time t10, the air-fuel ratios of exhaust gases from the respective first to fourth cylinders #1 to #4 come to exhibit the two-cylinder deviation pattern in which $KACT_1 = KACT_4 > KACT_2 = KACT_3$ holds. Further, in response to the changes in the air-fuel ratios, the first filtered value KACT_Fc comes to change with a small amplitude, and the second filtered value KACT_Fr comes to change with a large amplitude to represent the relationship in air-fuel ratio between the cylinders, so that the calculating filtered value $KACT\_F_i$ is switched to the second filtered value KACT_Fr. As a result, of the variation correction coefficients $KEAF_i$, the variation correction coefficients $KEAF_1$ and $KEAF_4$ for the first and fourth cylinders #1 and #4 are reduced, and the variation correction coefficients $KEAF_2$ and $KEAF_3$ for the second and third cylinders #2 and #3 are increased to a larger value than 1, whereby the values $KACT_1$ and $KACT_4$ are reduced, and the values $KACT_2$ and $KACT_3$ are increased. Thus, the air-fuel ratios associated with the respective four cylinders #1 to #4 are controlled such that they are leveled off.

As a result, at time t11, the values $KACT_{1-4}$ all converge to a value slightly larger than 1, and accordingly, the first and second filtered values KACT_Fc and KACT_Fr converge to 0, that is, the amplitude of each of the filtered values converges to a value of 0. Immediately after the time t11, the values $KACT_{1-4}$ all converge to a value of 1, whereby the output KACT from the LAF sensor 14 converges to a value of 1. Further, the variation correction coefficient $KEAF_1$ for the first cylinder #1 is stabilized and converges to a value slightly smaller than 1, while the variation correction coefficients $KEAF_{2-4}$ for the second to fourth cylinders #2 to #4 are stabilized and converge to a value slightly larger than 1. As described above, also in the non-two-cylinder deviation pattern, even when the first and second filtered values KACT_Fc and KACT_Fr contain noise, the air-fuel ratios associated with the four cylinders #1 to #4 can be controlled such that they are leveled off, so that variation in air-fuel ratio between the cylinders can be properly eliminated, and the correction coefficients $KEAF_i$ for the respective cylinders can be stabilized.

Figure 24:
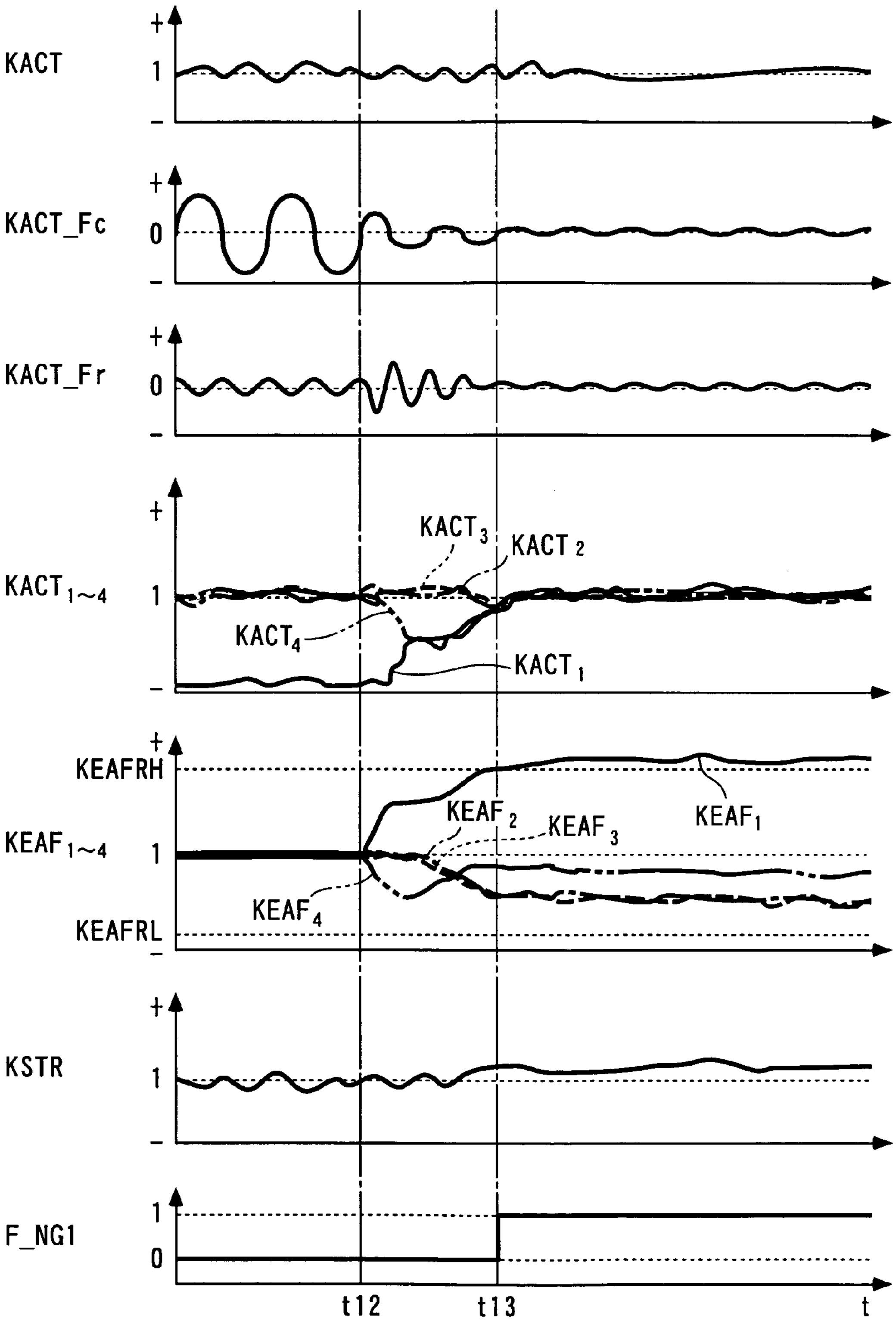
FIG. 24 is a timing chart showing an example of operations of the air-fuel ratio control executed by the air-fuel ratio control system when the fuel supply system of a first cylinder is not operating normally.

FIG. 24 shows an example of operation in a case where the fuel supply system of the first cylinder #1 is not operating normally, and only the air-fuel ratio associated with the first cylinder #1 has become much leaner than those associated with the other cylinders before the start of correction by the cylinder-by-cylinder variation correction coefficient $KEAF_i$. First, when the correction by the cylinder-by-cylinder variation correction coefficient $KEAF_i$ is started (time t12), the variation correction coefficient $KEAF_1$ for the first cylinder #1 increases to exceed the second reference value KEAFRH (NO to S70 in FIG. 19), so that the first abnormal flag F_NG1 is set to 1 (time t13, step 71). Therefore, when the variation correction coefficient $KEAF_1$ is equal to or larger than the second reference value KEAFRH, it can be determined that the fuel supply system of the first cylinder #1 is not operating normally.

Although not shown, when the fuel supply system of the first cylinder #1 is not operating normally, and conversely to the case shown in FIG. 24, only the air-fuel ratio associated with the first cylinder #1 has become much richer than those associated with the other cylinders, it can be determined, based on a fact that the variation correction coefficient $KEAF_1$ for the first cylinder #1 is smaller than the first reference value KEAFRL, that the fuel supply system of the first cylinder #1 is not operating normally.

As described above, according to the present embodiment, the cycle filter 23*a* and the rotation filter 23*b* are arranged in parallel with each other, and the output KACT from the LAF sensor 14 is filtered by the cycle filter 23*a* for passage of the components of the output KACT in the band of the first frequency fr1, which indicate the presence or absence of variation in air-fuel ratio between the cylinders in the non-two-cylinder deviation pattern, whereby the first filtered value KACT_Fc is calculated. Further, the output KACT from the LAF sensor 14 is filtered by the rotation filter 23*b* for passage of components of the output KACT in the band of the second frequency fr2, which indicate the presence or absence of variation in air-fuel ratio between the cylinders in the two-cylinder deviation pattern, whereby the second filtered value KACT_Fr is calculated. Furthermore, the first weighted average value KACT_Fcd is obtained by calculating the weighted average of the absolute value |KACT_Fcd (m−1)| of its immediately preceding value and the absolute value |KACT_Fc (m)| of the current value of the first filtered value.

Then, when the first weighted average value KACT_Fcd is larger than the reference value KACT_REF, i.e. when the first filtered value KACT_Fc has a larger amplitude, the cylinder-by-cylinder variation correction coefficient $KEAF_i$ is calculated based on the first filtered value KACT_Fc. On the other hand, when the first weighted average value KACT_Fcd is smaller than the reference value KACT_REF, i.e. when the second filtered value KACT_Fr has the larger amplitude, the cylinder-by-cylinder variation correction coefficient $KEAF_i$ is calculated based on the second filtered value KACT_Fr. The cylinder-by-cylinder final fuel injection amount $TOUT_i$ is calculated based on the corresponding variation correction coefficient $KEAF_i$ calculated as above, such that the amplitude of the first and second filtered values KACT_Fc and KACT_Fr become equal to 0.

Since the cylinder-by-cylinder variation correction coefficient $KEAF_i$ is calculated, as described above, based on one of the first and second filtered values KACT_Fc and KACT_Fr, which has the larger amplitude and hence excellently indicates the presence or absence of variation in air-fuel ratio between the cylinders, such that the amplitude of the filtered value becomes equal to 0, the air-fuel ratios associated with the four cylinders #1 to #4 can be controlled in any variation pattern such that they are leveled off, which makes it possible to eliminate variation in air-fuel ratio between the cylinders quickly and properly. Further, the filtered value for calculating the cylinder-by-cylinder variation correction coefficient $KEAF_i$ is selected based on the first weighted average value KACT_Fcd, so that even when the air-fuel ratios associated with the respective cylinders change temporarily, the weighted averaging can accommodate the changes. As a result, frequent switching between the bandpass filters can be prevented, which makes it possible to eliminate variation in air-fuel ratio between the cylinders quickly even when the air-fuel ratios associated with the respective cylinders change temporarily.

Further, the cylinder-by-cylinder final fuel injection amount $TOUT_i$ is calculated in synchronism with generation of each pulse of the TDC signal, and the output KACT from the LAF sensor 14 for use in calculating the first and second filtered values KACT_Fc and KACT_Fr is sampled in synchronism with generation of each pulse of the CRK signal. The output KACT from the LAF sensor 14 is thus sampled in a shorter cycle than a cycle in which the final fuel injection amount $TOUT_i$ is determined, i.e. a cycle in which exhaust gases are emitted from each cylinder, so that the output KACT sampled as above can represent the changing state of the air-fuel ratio of exhaust gases from each cylinder in a fine-grained manner. As a result, the presence or absence of variation in air-fuel ratio between the cylinders is properly indicated in a fine-grained manner by the first and second filtered values KACT_Fc and KACT_Fr, which makes it possible to eliminate variation in air-fuel ratio between the cylinders more quickly and properly.

Further, as the first and second filtered values KACT_Fc and KACT_Fr for calculating the cylinder-by-cylinder variation correction coefficient $KEAF_i$, values thereof are selected which are based on the output KACT from the LAF sensor 14, which is detected at a time when dead time has elapsed after the time of outputting each TDK signal pulse from each cylinder, corresponding to the time of emission of exhaust gases from each cylinder, so that the filtered values can excellently reflect the air-fuel ratio of the exhaust gases from each cylinder. This makes it possible to properly calculate the cylinder-by-cylinder final fuel injection amount $TOUT_i$ while compensating for the dead time. Further, since the dead time is determined according to the intake pipe absolute pressure PBA and the engine speed NE, i.e. according to the operating condition of the engine 3, it is possible to properly compensate for the dead time according to the operating condition and optimally calculate the first and second filtered values KACT_Fc and KACT_Fr excellently reflecting the air-fuel ratio of the exhaust gases from each cylinder.

Furthermore, since the cylinder-by-cylinder variation correction coefficient $KEAF_i$ is calculated by dividing the variation correction coefficient provisional value $keaf_i$ by the moving average value KEAFave, even when the filtered values contain noise, the influence of the noise on the cylinder-by-cylinder variation correction coefficient $KEAF_i$ can be leveled off, which makes it possible to properly calculate the variation correction coefficient $KEAF_i$ and hence avoid changes in the air-fuel ratio associated with each cylinder. Moreover, when the cylinder-by-cylinder variation correction coefficient $KEAF_i$ for correcting variation in air-fuel ratio between the cylinders is too large or too small, it is determined that the fuel supply system of the corresponding cylinder is not operating normally, which enables proper determination as to whether the fuel supply system is normal or abnormal.

Further, when the absolute value $|KACT\_F_i(n)|$ of the calculating filtered value becomes smaller than the threshold value KACT_THRESH, it is judged that variation in air-fuel ratio between the cylinders has been eliminated, and the variation correction coefficient $KEAF_i$ is fixedly held at a value approximately equal to a value calculated in the immediately preceding loop. This makes it possible to prevent the variation correction coefficient $KEAF_i$ from being changed due to noise contained in the first and second filtered values KACT_Fc and KACT_Fr. Thus, the aforementioned hunting phenomenon can be avoided, and the engine 3 can be held in a state free of variation in air-fuel ratio between the cylinders.

Although in the present embodiment, the filtered value for calculating the variation correction coefficient $KEAF_i$ is selected based on the result of comparison between the first weighted average value KACT_Fcd and the reference value KACT_REF, the filtered value may be selected based on the result of comparison between the first weighted average value KACT_Fcd and the second weighted average value KACT_Frd. More specifically, in this case, when KACT_Fcd>KACT_Frd holds, the first filtered value KACT_Fc is selected as the filtered value for calculating the variation correction coefficient $KEAF_i$, whereas when KACT_Fcd≦KACT_Frd holds, the second filtered value KACT_Fr is selected as the filtered value. In this case as well, as in the present embodiment, one of the first and second filtered values KACT_Fc and KACT_Fr, which has the larger amplitude and hence more excellently indicates the presence or absence of variation in air-fuel ratio between the cylinders, can be used as the filtered value for calculating the variation correction coefficient $KEAF_i$.

Figure 25:
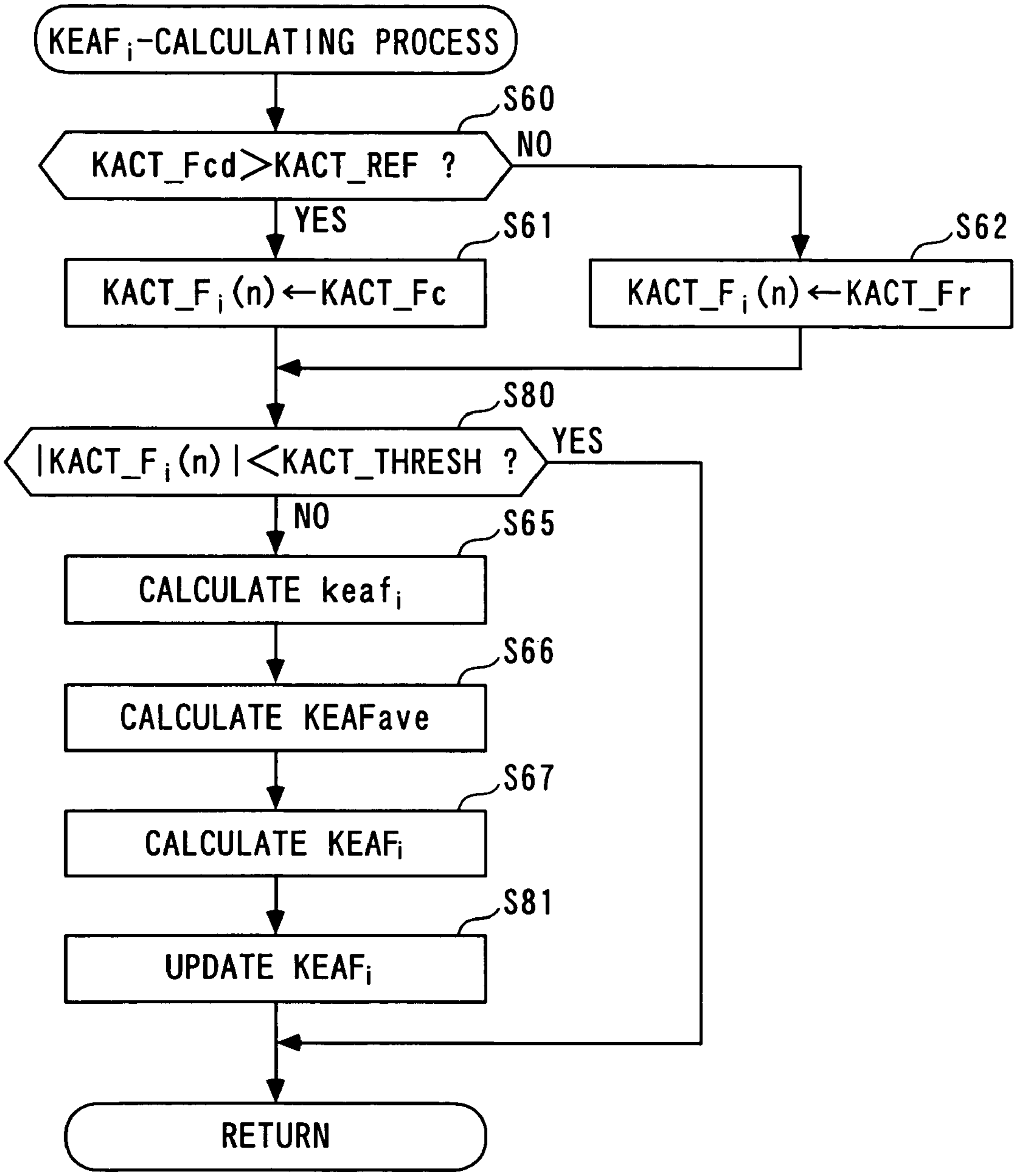
FIG. 25 is a flowchart showing a variation of the process for calculating the variation correction coefficient.

Next, a variation of the process for calculating the variation correction coefficient $KEAF_i$ will be described with reference to FIG. 25. The present process is distinguished from the process in FIG. 18 only by processing corresponding to the steps 63 and 64 in FIG. 18. Therefore, the following description will be mainly given of the different points, with steps identical to those of the process in FIG. 18 being designated by the same step numbers while omitting description thereof. In a step 80 which replaces the steps 63 and 64, it is determined whether or not the absolute value $|KACT\_F_i(n)|$ of the calculating filtered value is smaller than the threshold value KACT_THRESH.

If the answer to the question is negative (NO), it is judged that there is variation in air-fuel ratio between the cylinders, and the steps 65 to 67 are executed so as to calculate the cylinder-by-cylinder variation correction coefficient $KEAF_i$. Then, the calculated variation correction coefficients $KEAF_i$ are stored in the RAM to update their corresponding immediately preceding values (step 81), followed by terminating the present process.

On the other hand, if the answer to the question of the step 80 is affirmative (YES), i.e. if $|KACT\_F_i(n)|$<KACT_THRESH holds, it is judged that the variation in air-fuel ratio between the cylinders has been eliminated. Therefore, the steps 65 to 67 and 81, in which calculation and update of the cylinder-by-cylinder variation correction coefficient $KEAF_i$ is carried out, are skipped, and the present process is immediately terminated.

As described above, when the absolute value $|KACT\_F_i(n)|$ of the calculating filtered value is smaller than the threshold value KACT_THRESH, it is judged that the variation in air-fuel ratio between the cylinders has been eliminated, and the cylinder-by-cylinder variation correction coefficient $KEAF_i$ is not calculated or updated, but fixedly held at a value calculated immediately before the condition of $|KACT\_F_i(n)|$<KACT_THRESH is satisfied. Therefore, similarly to the first embodiment described above, the hunting phenomenon can be avoided, which makes it possible to maintain the engine 3 in a state free of variation in air-fuel ratio between the cylinders. Further, when the above condition ($|KACT\_F_i(n)|$<KACT_THRESH) is satisfied, the calculation and update of the cylinder-by-cylinder variation correction coefficient $KEAF_i$ is omitted, which makes it possible to reduce computational load on the ECU 2.

Figure 26:
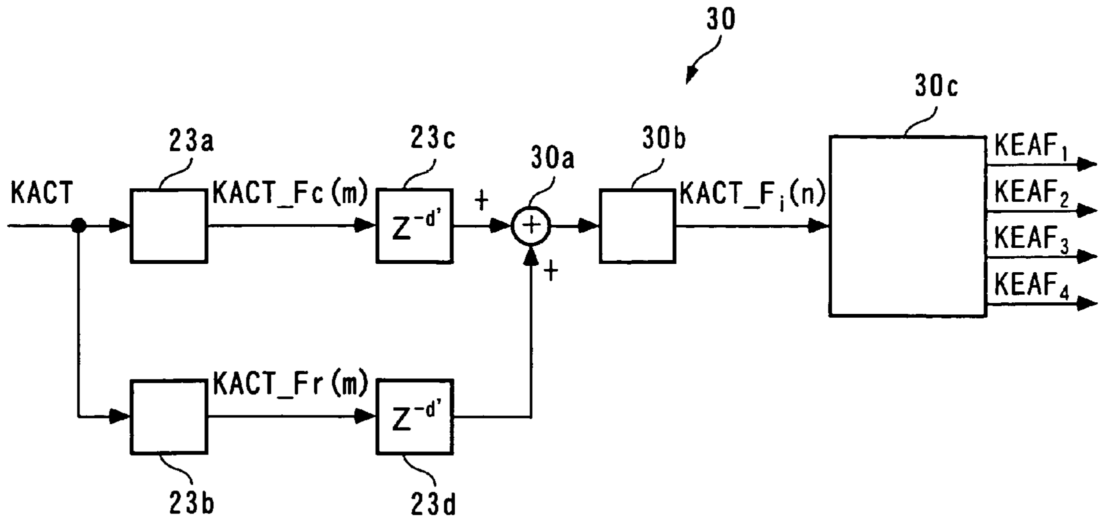
FIG. 26 is a block diagram of a variation-correcting section according to a second embodiment of the present invention.

Next, a second embodiment of the present invention will be described with reference to FIG. 26. The present embodiment is distinguished from the first embodiment only in that there is provided a variation-correcting section 30 in place of the variation-correcting section 23, and hence in the following, a description will be mainly given of the configuration of the variation-correcting section 30. In FIG. 26, component elements of the variation-correcting section 30 identical to those of the variation-correcting section 23 are designated by identical reference numerals.

In the variation-correcting section 30, the first filtered value KACT_Fc (m) output from the first delay element 23*c* and the second filtered value KACT_Fr (m) output from the second delay element 23*d* are added by an adder 30*a* (total-calculating means). Then, the sum (total) obtained by this addition is output as the calculating filtered value $KACT\_F_i(n)$ to a calculating filtered value-determining section 30*b* (correction coefficient-fixing means). Similarly to the calculating filtered value-determining section 23*h*, the calculating filtered value-determining section 30*b* determines the calculating filtered value $KACT\_F_i(n)$ based on the absolute value of the calculating filtered value $KACT\_F_i(n)$ input from the adder 30*a*, and outputs the determined calculating filtered value $KACT\_F_i(n)$ to a variation correction coefficient-calculating section 30*c* (correction parameter-calculating means, average value-calculating means, and correction coefficient-calculating means). In the variation correction coefficient-calculating section 30*c*, the variation correction coefficient $KEAF_i$ is calculated based on the calculating filtered value $KACT\_F_i(n)$ input from the calculating filtered value-determining section 30*b*.

Figure 27:
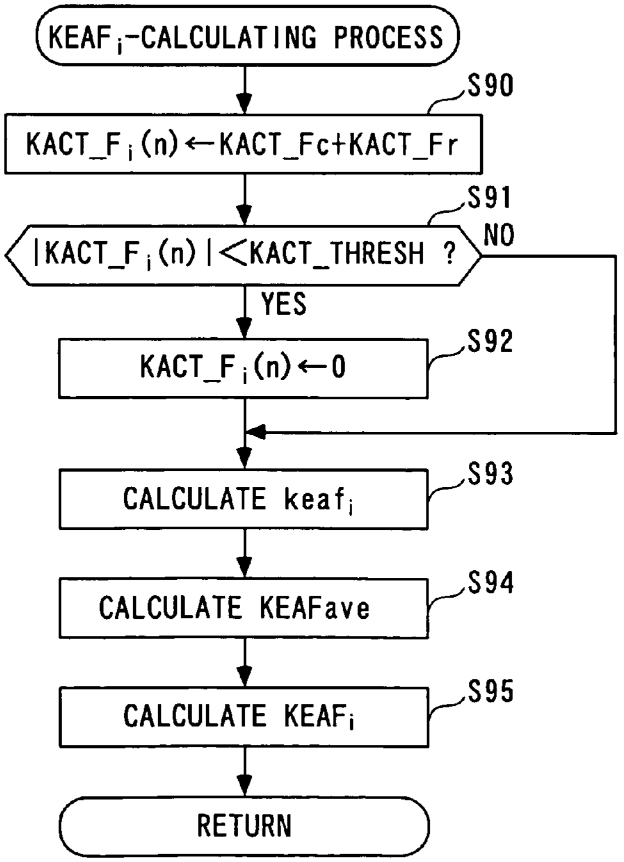
FIG. 27 is a flowchart of a process for calculating the variation correction coefficient, according to the second embodiment.

The calculation of the variation correction coefficient $KEAF_i$ will be described with reference to a flowchart in FIG. 27. First, in a step 90, the sum of the first and second filtered values KACT_Fc and KACT_Fr read in in the step 8 in FIG. 14 is set as the calculating filtered value $KACT\_F_i$ (n).

Figure 18:
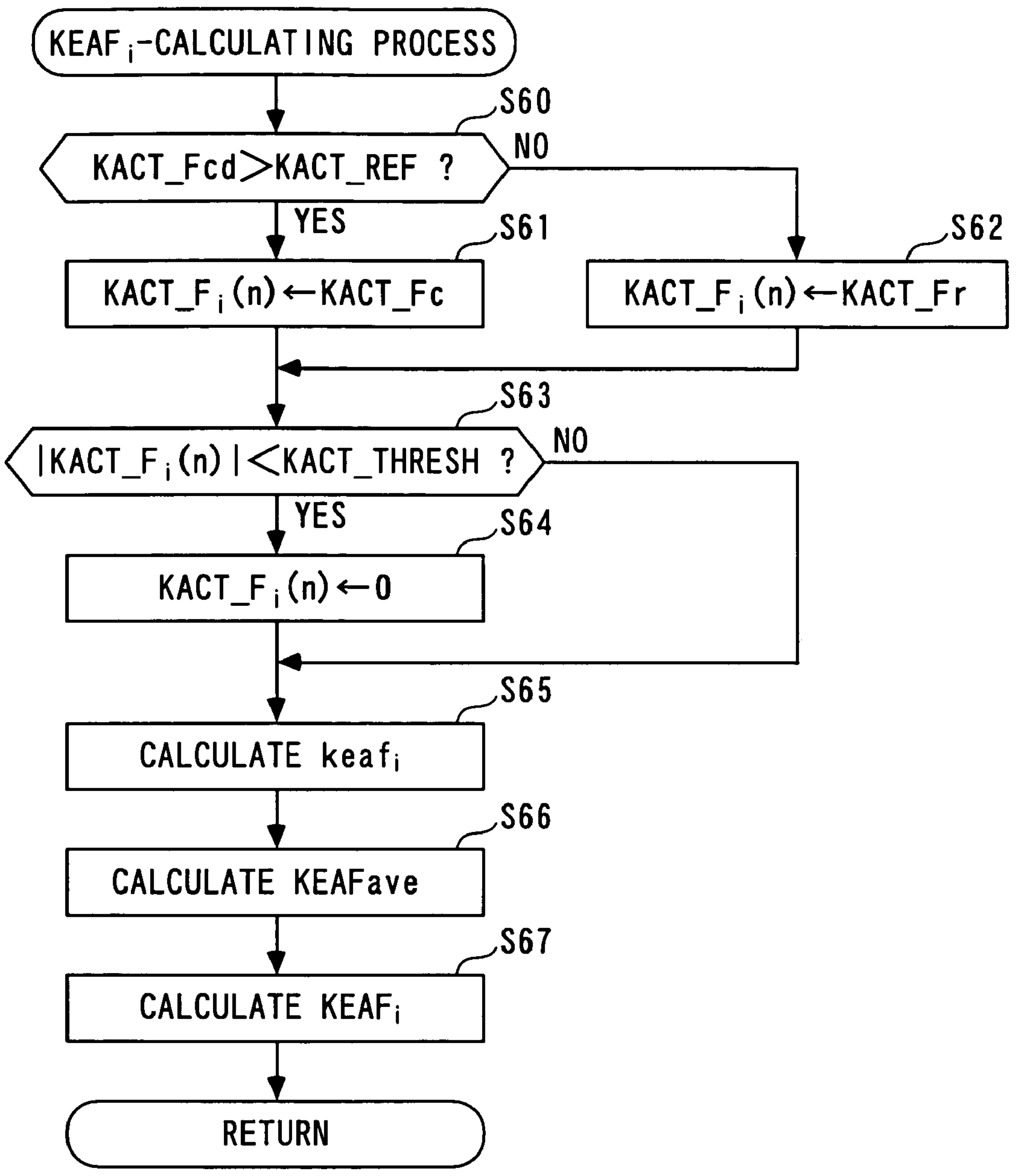
FIG. 18 is a flowchart of a process for calculating the variation correction coefficient, which is executed in a step in the air-fuel ratio control process in FIG. 14.

Then, it is determined whether or not the absolute value $|KACT\_F_i(n)|$ of the calculating filtered value $KACT\_F_i$ (n) set in the step 90 is smaller than the threshold value KACT_THRESH used in the step 63 in FIG. 18 (step 91). If the answer to the question is affirmative (YES), the sum of the first and second filtered values KACT_Fc and KACT_Fr is approximately equal to 0, which means that variation in air-fuel ratio between the cylinders has been eliminated, so that the calculating filtered value $KACT\_F_i$ (n) is set to 0 (step 92), whereafter steps 93 to 95 are executed. On the other hand, if the answer to the question of the step 91 is negative (NO), i.e. if $|KACT\_F_i(n)| \geqq KACT\_THRESH$ holds, it is judged that there is variation in air-fuel ratio between the cylinders, so that the process skips over the step 92 to execute the steps 93 to 95.

In the steps 93 to 95, similarly to the steps 65 to 67, the cylinder-by-cylinder correction coefficient $KEAF_i$ is calculated. First, in the step 93, the variation correction coefficient provisional value $keaf_i$ is calculated by the equation (24), using the calculating filtered value $KACT\_F_i$ (n) set in the step 90 or 92. Then, in the step 94, the moving average value KEAFave is calculated by the equation (25), using the variation correction coefficient provisional value $keaf_i$ calculated in the step 93.

Next, in the step 95, the variation correction coefficient KEAFi is calculated by the equation (26), using the variation correction coefficient provisional value $keaf_i$ calculated in the step 93 and the moving average value KEAFave calculated in the step 94, followed by terminating the present process.

Figure 28:
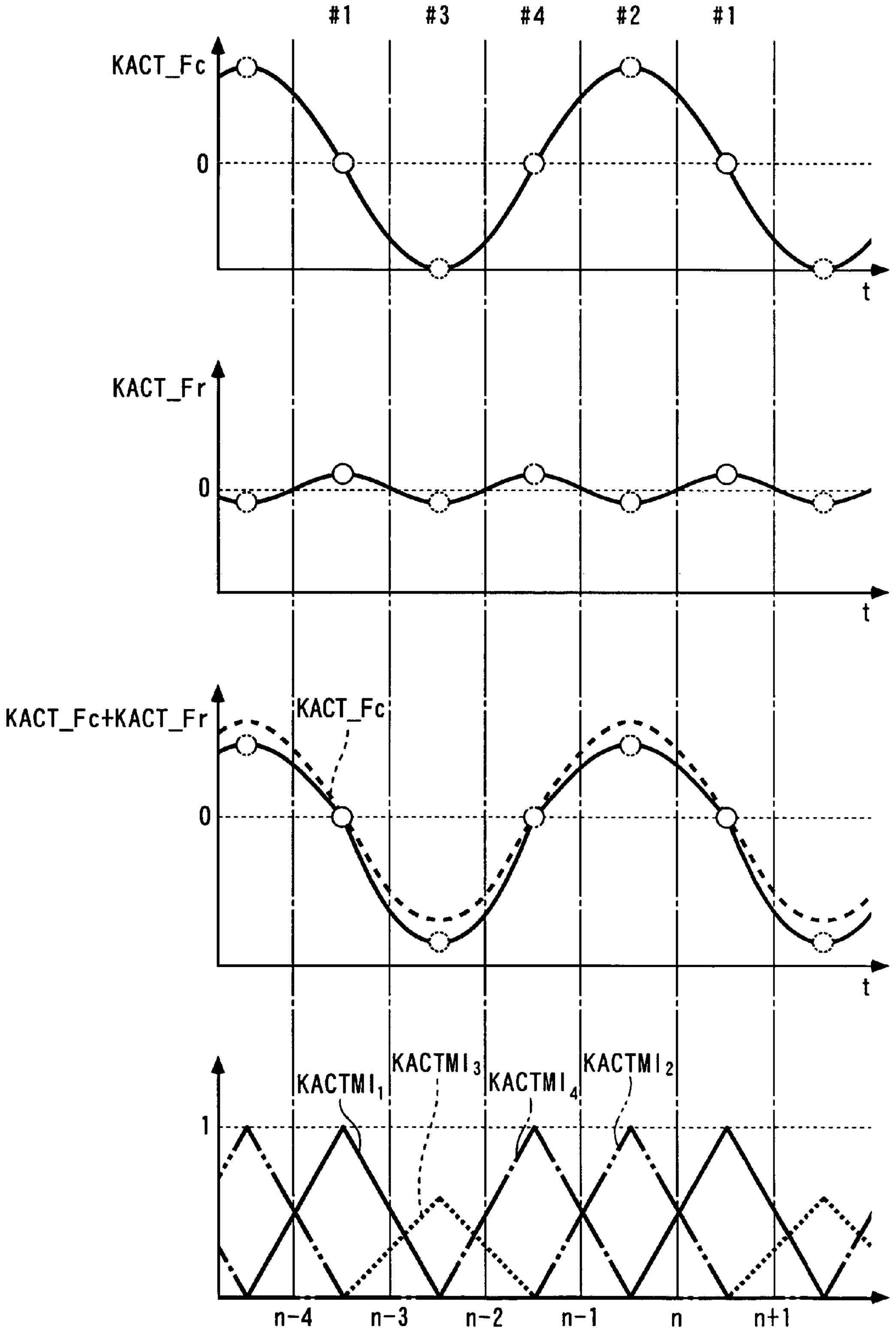
FIG. 28 is a diagram useful in explaining the relationship of first to fourth simulative outputs, first and second filtered values, and the sum of these filtered values, in a case where only the third simulative output is smaller than the other simulative outputs.

The reason why the variation correction coefficient $KEAF_i$ is thus calculated based on the sum of the first and second filtered values KACT_Fc and KACT_Fr (step 90, 93 to 95) is as follows: As shown in FIG. 28, when the aforementioned simulative outputs KACTMI are input to the variation correction section 30 as the output KACT from the LAF sensor 14, with the third simulative output $KACTMI_3$ alone being made smaller than the others, the first filtered value KACT_Fc changes with a relatively large amplitude, and the second filtered value KACT_Fr changes with a relatively small amplitude. In comparison with the first filtered value KACT_Fc indicated by a broken line in FIG. 28, the sum of the filtered values (KACT_Fc+KACT_Fr) becomes a negative value larger in its absolute value at the time of the third simulative output $KACTMI_3$ being input, and becomes a smaller positive value at the time of the second simulative output $KACTMI_2$ being input. As is apparent from this comparison, the sum of the first and second filtered values KACT_Fc and KACT_Fr exhibits a characteristic closer to actual variation in air-fuel ratio between the cylinders than the first filtered value KACT_Fc does. It should be noted that such a characteristic also holds true with a variation pattern in which an air-fuel ratio associated with only one cylinder, which is not necessarily the third cylinder #3, is deviated toward the rich or lean side. For the above-described reason, the variation-correcting section 30 can eliminate variation in air-fuel ratio between the cylinders more quickly than the variation-correcting section 23 in the first embodiment.

As in the first embodiment, when the absolute value $|KACT\_F_i(n)|$ of the calculating filtered value becomes smaller than the threshold value KACT_THRESH (YES to step 91), it is judged that the variation in air-fuel ratio between the cylinders has been eliminated, so that the calculating filtered value $KACT\_F_i$ (n) is set to 0 (step 92), and the variation correction coefficient $KEAF_i$ is calculated using the calculating filtered value $KACT\_F_i$ (n) set in the step 92 (steps 93 to 95). As a result, the variation correction coefficient $KEAF_i$ is fixedly held at a value approximately equal to a value of the variation correction coefficient $KEAF_i$ calculated in the immediately preceding loop.

Next, a description will be given of an example of operations in a case where the air-fuel ratios associated with the four cylinders are controlled according to the second embodiment in comparison with first and second comparative examples, with reference to FIGS. 29 to 31. The first comparative example in FIG. 30, similarly to the first comparative example in FIG. 21 in the first embodiment, shows a case where the variation correction coefficient $KEAF_i$ is directly set to the correction coefficient provisional value $keaf_i$, and the second comparative example in FIG. 31, similarly to the second comparative example in FIG. 22 in the first embodiment, shows a case where the variation correction coefficient $KEAF_i$ is continuously calculated and updated after elimination of variation in air-fuel ratio between the cylinders. Further, similarly to the example in FIG. 23, each of the present examples shows operations in a case where when the output KACT from the LAF sensor 14 is being controlled to a value of 1 by the STR 22 in a variation pattern in which the air-fuel ratio of the mixture supplied to the first cylinder #1 is richer than those of the mixtures supplied to the other cylinders, the correction using the variation correction coefficient $KEAF_i$ is carried out under the condition of the first and second filtered value KACT_Fc and KACT_Fr containing noise. It should be noted that in FIGS. 29 to 31, similarly to FIGS. 20 to 24, values $KACT_{1\text{-}4}$ correspond to respective outputs from the four LAF sensors (not shown) which are additionally provided for experiment in the exhaust manifold 7*a* at respective locations immediately downstream of the exhaust ports of the cylinders #1 to #4.

Figure 29:
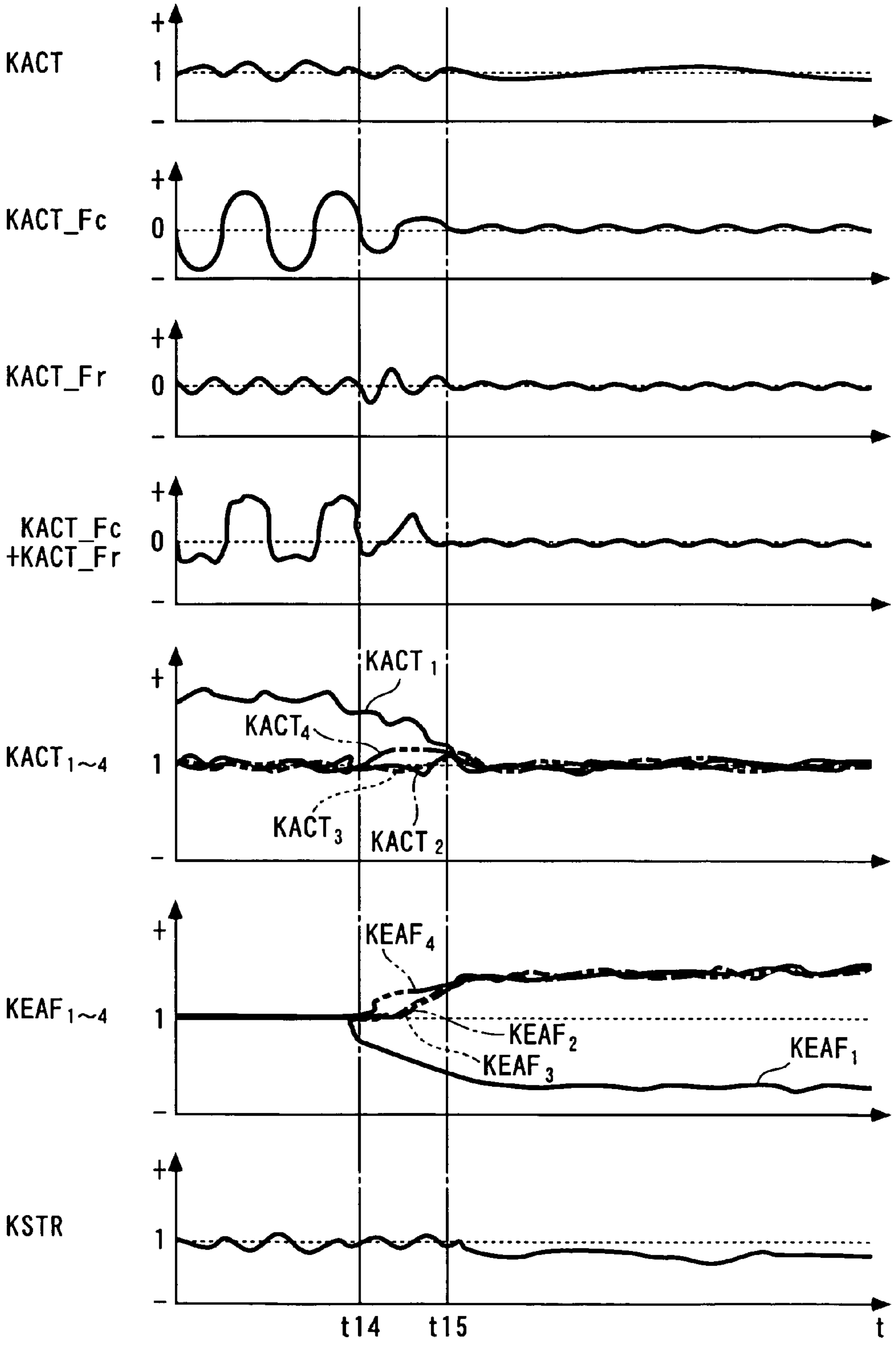
FIG. 29 is a timing chart showing an example of operations of air-fuel ratio control executed by an air-fuel ratio control system according to the second embodiment when the variation pattern is the non-two-cylinder deviation pattern.

As shown in FIG. 29, before the start of the correction by the variation correction coefficient $KEAF_i$ (up to time t14), the first filtered value KACT_Fc changes with a relatively large amplitude, whereas the second filtered value KACT_Fr changes with a relatively small amplitude. As described with reference to FIG. 28, the sum of the first and second filtered values KACT_Fc and KACT_Fr exhibits a characteristic close to actual variation in air-fuel ratio between the cylinders. Therefore, when the correction by the variation correction coefficient $KEAF_i$ is started (time t14) in this state, the variation correction coefficient $KEAF_1$ for the first cylinder #1 is more reduced, and the variation correction coefficient $KEAF_4$ for the fourth cylinder #4 is less increased than in the case of the first embodiment shown in FIG. 23.

As a result, as distinct from the case of the first embodiment, there is a slight difference between the value $KACT_1$ and the value $KACT_4$, and hence the variation pattern approximates to the two-cylinder-deviation pattern, which makes the amplitude of the second filtered value KACT_Fr slightly larger. In response to this, the variation correction coefficient $KEAF_1$ for the first cylinder #1 is further reduced, the variation correction coefficients $KEAF_2$ and $KEAF_3$ for the respective cylinders #2 and #3 are increased, and the variation correction coefficient $KEAF_4$ for the fourth cylinder #4 is slightly increased. Further, in accordance with these changes, the value $KACT_1$ is further reduced, the values $KACT_2$ and $KACT_3$ are increased, and $KACT_4$ is slightly increased, whereby the air-fuel ratios associated with the respective four cylinders #1 to #4 are controlled such that they are leveled off.

As a result, as the values $KACT_{1-4}$ all converge to a predetermined value at time t15 earlier than the time t11 appearing in FIG. 23 of the first embodiment, the first and second filtered values KACT_Fc and KACT_Fr converge to 0, and the sum of the filtered values (KACT_Fc+KACT_Fr) also converges to 0. Further, immediately after that, as the values $KACT_{1-4}$ all converge to a value of 1, the output KACT from the LAF sensor 14 converges to 1. Furthermore, the variation correction coefficient $KEAF_1$ for the first cylinder #1 is stabilized and converges to a slightly smaller value than 1, and the variation correction coefficients $KEAF_{2-4}$ for the second to fourth cylinders #2 to #4 are stabilized and converge to a slightly larger value than 1. As described above, the present embodiment makes it possible to eliminate variation in air-fuel ratio between the cylinders more quickly than the first embodiment.

Figure 30:
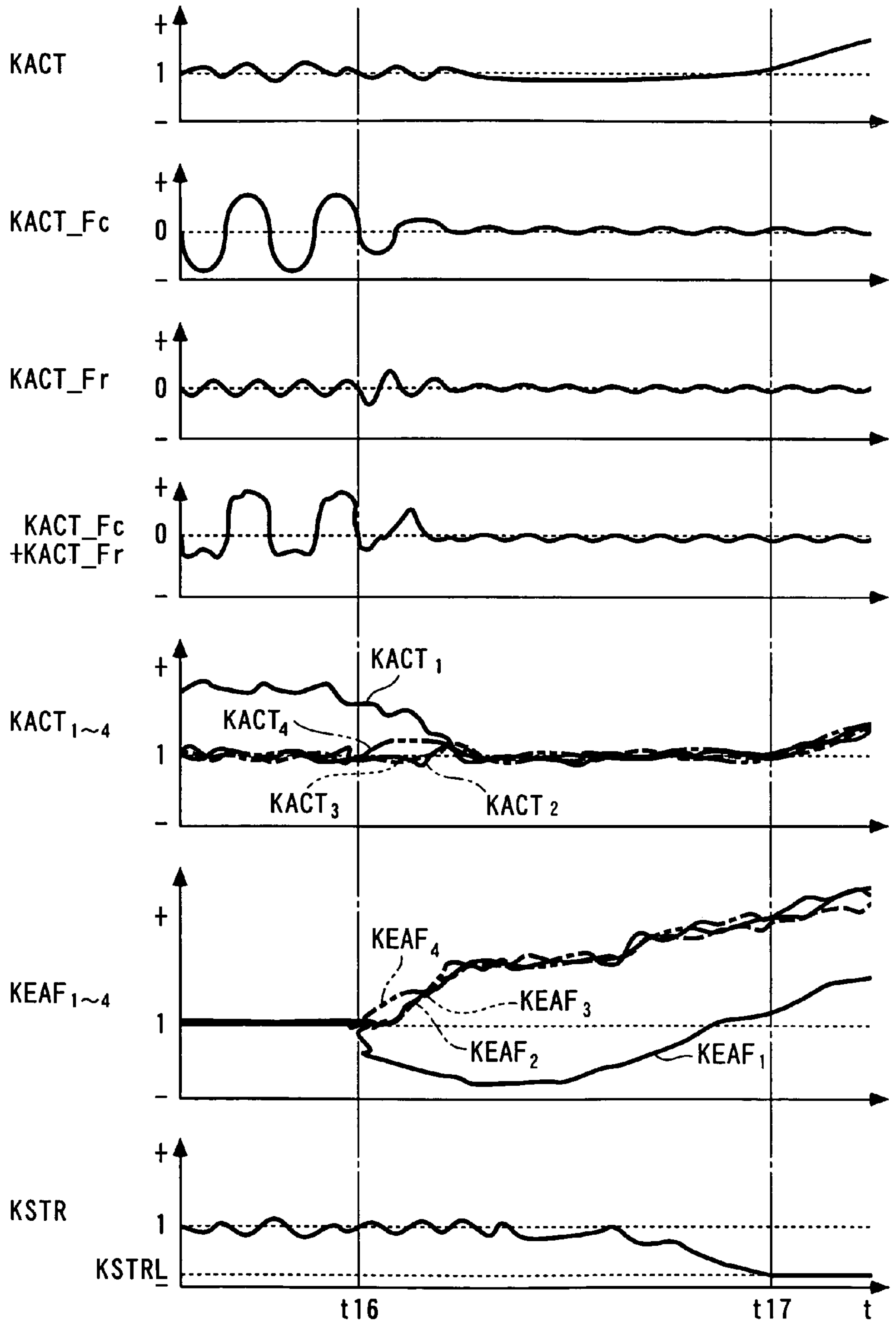
FIG. 30 is a timing chart showing a first comparative for comparison with the example in FIG. 29.

In contrast, in the first comparative example shown in FIG. 30, as in the first comparative example described hereinbefore with reference to FIG. 21, after the start of correction (after time t16), the variation correction coefficients $KEAF_{1-4}$ for the first to fourth cylinders #1 to #4 all increase due to the influence of noise contained in the first and second filtered values KACT_Fc and KACT_Fr, and hence they cannot be stabilized. Further, with the increase in the cylinder-by-cylinder variation correction coefficient $KEAF_i$, the feedback correction coefficient KSTR is reduced to a smaller value than 1. Then, when the cylinder-by-cylinder variation correction coefficient $KEAF_i$ is further increased due to the influence of the noise, and the feedback correction coefficient KSTR reaches its lower limit value KSTRL (time t17), the values $KACT_{1-4}$ all start to increase from around 1, and accordingly the output KACT from the LAF sensor also starts to increase from around 1. As is apparent from this, also in the present embodiment, the cylinder-by-cylinder variation correction coefficient $KEAF_i$ can be stabilized by executing the correction coefficient averaging process even when the first and second filtered values KACT_Fc and KACT_Fr contain noise.

Figure 31:
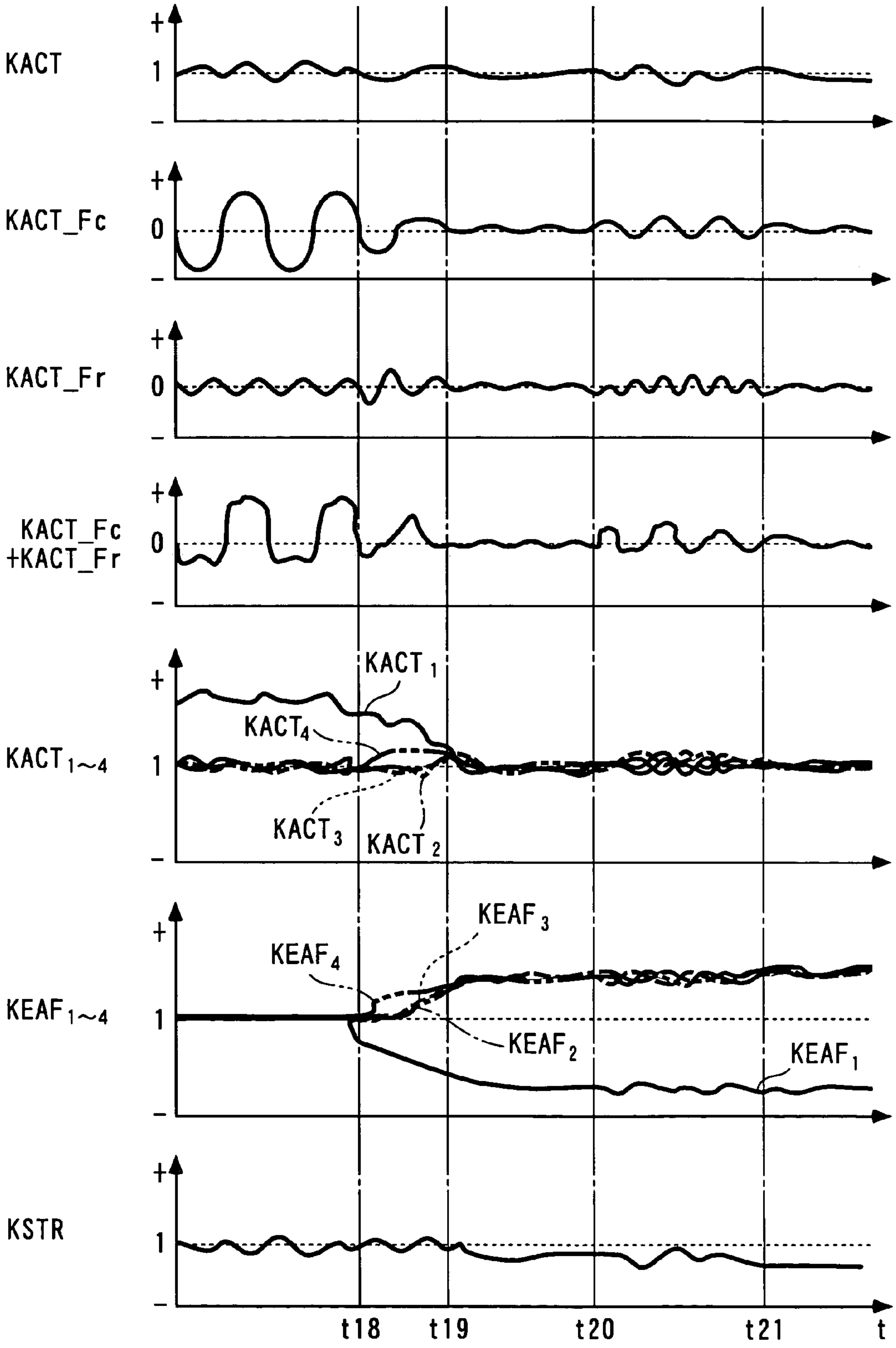
FIG. 31 is a timing chart showing a second comparative for comparison with the example in FIG. 29.

On the other hand, in the second comparative example shown in FIG. 31, the cylinder-by-cylinder variation correction coefficient $KEAF_i$ is continuously calculated and updated after the start of correction (time t18) and even after elimination of variation in air-fuel ratio (time t19), which makes operations similar to those in the second comparative example described hereinbefore with reference to FIG. 22. More specifically, the variation correction coefficients $KEAF_1$ to $KEAF_4$ change due to the influence of noise contained in the first and second filtered values KACT_Fc and KACT_Fr (after time t20). As the values $KACT_{1-4}$ slightly vary again with respect to a value of 1 in accordance with the changes in the respective variation correction coefficients $KEAF_1$ to $KEAF_4$, the amplitudes of the respective first and second filtered values KACT_Fc and KACT_Fr become slightly larger. Thereafter (after time t21), the values $KACT_{1-4}$ converge to a value of 1 again in accordance with stabilization of the respective variation correction coefficients $KEAF_1$ to $KEAF_4$. Thus, the hunting phenomenon occurs as in the case of the comparative example shown in FIG. 22.

As described above, in the present embodiment, the correction coefficient fixing process also makes it possible to prevent variation in the variation correction coefficient $KEAF_i$ from being caused by noise contained in the first and second filtered values KACT_Fc and KACT_Fr. Therefore, the present embodiment can provide exactly the same advantageous effects, including prevention of occurrence of the hunting phenomenon, as obtained by the first embodiment.

As described above, according to the second embodiment, the cylinder-by-cylinder variation correction coefficient $KEAF_i$ is calculated based on the sum of the first and second filtered values KACT_Fc and KACT_Fr, which exhibits a characteristic closer to actual variation in air-fuel ratio between the cylinders, such that the air-fuel ratios associated with the four cylinders #1 to #4 are leveled off, i.e. such that the sum of the first and second filtered values KACT_Fc and KACT_Fr becomes equal to 0. Therefore, variation in air-fuel ratio between the cylinders can be eliminated more quickly and properly.

It should be noted that when the absolute value $|KACT\_F_i(n)|$ of the calculating filtered value is smaller than the threshold value KACT_THRESH, the variation correction coefficient $KEAF_i$ may be fixedly held at its immediately preceding value, as in the variation of the first embodiment, without calculating the variation correction coefficient $KEAF_i$.

Figure 35:
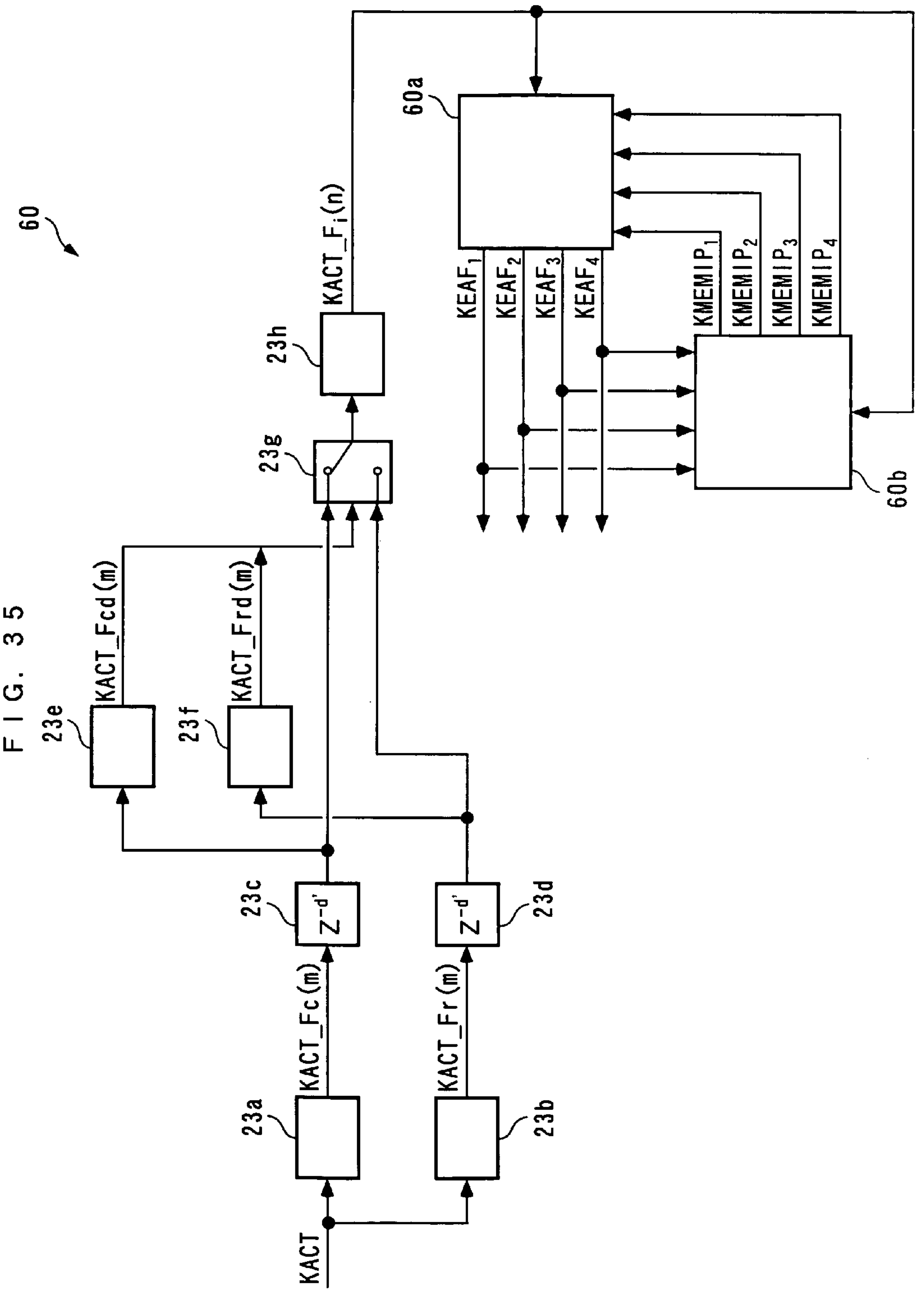
FIG. 35 is a block diagram of a variation-correcting section according to a third embodiment of the present invention.

Next, a third embodiment of the present invention will be described with reference to FIG. 35. The present embodiment is distinguished from the first embodiment only in that a variation-correcting section 60 replaces the variation-correcting section 23, and hence in the following, a description will be mainly given of the configuration of the variation-correcting section 60. In FIG. 35, component elements of the variation-correcting section 60 identical to those of the variation-correcting section 23 are designated by identical reference numerals.

In the variation-correcting section 60, a variation correction coefficient-calculating section 60*a* (correction coefficient-calculating means) calculates a cylinder-by-cylinder variation correction coefficient $KEAF_i(n)$ based on a calculating filtered value $KACT\_F_i(n)$ input from the calculating filtered value-determining section 23*h* and a first retrieval value $KMEMIP_i(n)$ input from a learned correction coefficient-calculating and storing section 60*b* (learned correction coefficient-calculating means, and storage means), and outputs the calculated variation correction coefficient $KEAF_i(n)$ to the learned correction coefficient-calculating and storing section 60*b*. This process will be described in detail hereinafter.

The learned correction coefficient-calculating and storing section 60*b* calculates a current value of the learned correction coefficient KMEMi(n) based on the variation correction coefficient $KEAF_i(n)$ input from the variation correction coefficient-calculating section 60*a* and a learned correction coefficient $KMEM_i(n)$ which was stored. The learned correction coefficient $KMEM_i$ is the learned value of the variation correction coefficient $KEAF_i$, which is used for correcting variation in air-fuel ratio between the cylinders. The calculated learned correction coefficient KMEMi(n) is stored in association with an operating condition of the engine 3. One of the values of the stored learned correction coefficients $KMEM_i(n)$ corresponding to the current operating condition of the engine 3 is output as the first retrieval value KMEMIPi(n) to the variation correction coefficient-calculating section 60*a*. The processing executed by the learned correction coefficient-calculating and storing section 60*b* will be described in detail hereinafter.

Figure 36:
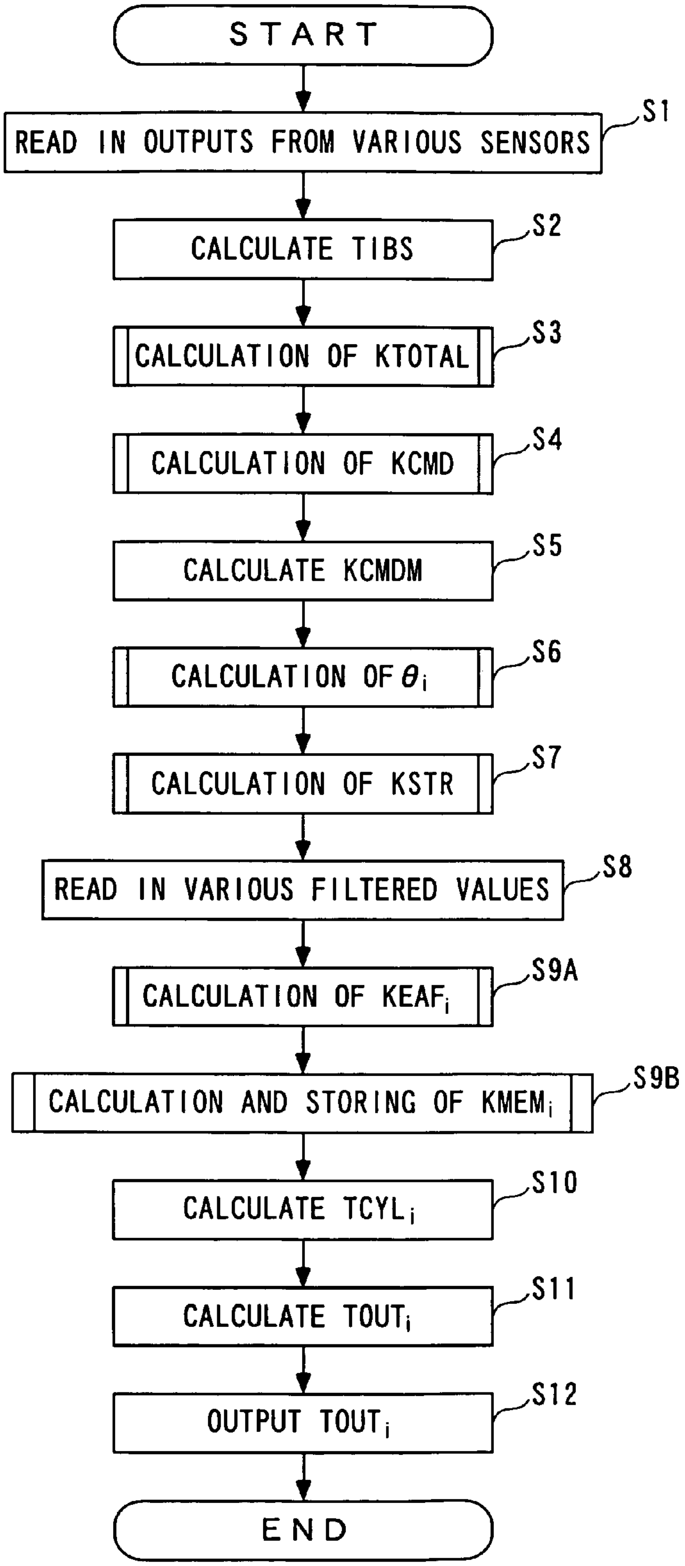
FIG. 36 is a flowchart of an air-fuel ratio control process according to the third embodiment.

Next, a fuel injection control process including air-fuel ratio control according to the present embodiment will be described with reference to FIG. 36. The present process is distinguished from the fuel injection control process described hereinbefore with reference to FIG. 14 only in that a step 9A for calculating the variation correction coefficient $KEAF_i$, and the following step 9B for calculating and storing the learned correction coefficient $KMEM_i$ replaces the step 9, and hence in the following, a description will be mainly given of the different points, with steps identical to those of the process in FIG. 14 being designated by the same step numbers while omitting description thereof.

First, the process executed in the step 9A for calculating the variation correction coefficient $KEAF_i$ will be described with reference to FIG. 37. The present process is distinguished from the process for calculating the variation correction coefficient $KEAF_i$, which has been described hereinbefore with reference to FIG. 18, only in that steps 100 and 101 replace the step 65, and hence in the following, a description will be mainly given of the different point, with steps identical to those of the process in FIG. 18 being designated by the same step numbers.

In the step 100 following the step 63 or 64, the first retrieval value $KMEMIP_i$ is set. This setting is performed by reading out a learned correction coefficient $KMEM_i$ from a $KMEM_i$ memory shown in FIG. 38. The $KMEM_i$ memory is implemented by an EEPROM 2a, and comprised of $KMEM_{1-4}$ memories for storing learned correction coefficients $KMEM_{1-4}$ for the respective four cylinders #1 to #4. Further, each of the $KMEM_{1-4}$ memories has numerous storage locations for storing value of the learned correction coefficients $KMEM_i$. Each storage location is defined by an NE number $NE'_i(n-e)$ and a PB number $PB'_i(n-e)$, and each value of the learned correction coefficient $KMEM_i$ is stored in a corresponding one of these storage locations in association with an operating condition of the engine 3 represented by the engine speed NE and the intake pipe absolute pressure PBA.

The first retrieval value $KMEMIP_i(n)$ is set to a value of the learned correction coefficient $KMEM_i$ stored in a storage location defined by a value of the NE number $NE'_i(n-e)$ corresponding to the current engine speed NE and a value of the PB number $PB'_i(n-e)$ corresponding to the current intake pipe absolute pressure PBA. It should be noted that if there are no values of the NE and PB numbers $NE'_i(n-e)$ and $PB'_i(n-e)$ corresponding to the current engine speed NE and the current intake pipe absolute pressure PBA, the first retrieval value $KMEMIP_i$ is set by interpolation.

In the step 101 following the step 100, the variation correction coefficient provisional value $keaf_i(n)$ is calculated by the following equation (31), using the first retrieval value $KMEMIP_i(n)$ set in the step 100 and the calculating filtered value $KACT\_F_i(n)$ set in the step 61, 62 or 64.

$$keaf_i = FI \cdot \mathrm{KACT\_F}_i(n) - GI \cdot \sum_{j=0}^{J} \mathrm{KACT\_F}_i(n-4j) - HI \cdot [\mathrm{KACT\_F}_i(n) - \mathrm{KACT\_F}_i(n-4)] + KMEMIP_i(n) \tag{31}$$

Then, in the following steps 66 and 67, the variation correction coefficient $KEAF_i(n)$ is calculated based on the calculated variation correction coefficient provisional value $keaf_i(n)$, using the equations (25) an (26).

As described above, the value of the learned correction coefficient $KMEM_i$ corresponding to the current engine speed NE and the current intake pipe absolute pressure PBA is selected from the values of the learned correction coefficient $KMEM_i$ stored in the $KMEM_i$ memory, and set as the first retrieval value $KMEMIP_i(n)$, and then the variation correction coefficient $KEAF_i(n)$ is calculated according to the first retrieval value $KMEMIP_i(n)$ and the calculating filtered value $KACT\_F_i(n)$.

Figure 39:
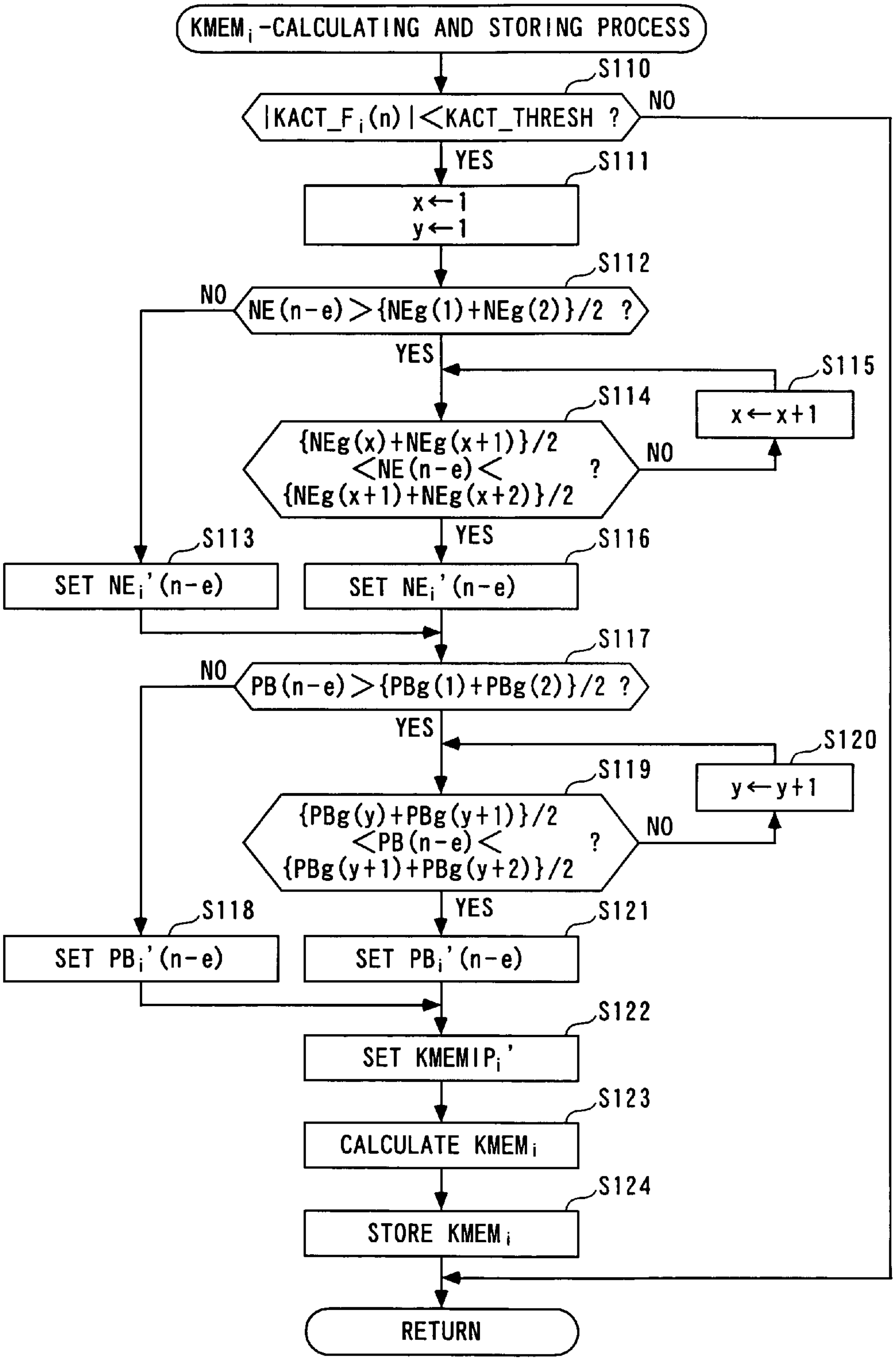
FIG. 39 is a flowchart of a process for calculating and updating a learned correcting coefficient, which is executed in a step in the air-fuel ratio control process in FIG. 36.

Next, the process executed in the step 9B for calculating and storing the learned correction coefficient $KMEM_i$ will be described with reference to FIG. 39. First, in a step 110, similarly to the step 63, it is determined whether or not the absolute value $|KACT\_F_i(n)|$ of the calculating filtered value is smaller than the threshold value KACT_THRESH. If the answer to the question is negative (NO), it is judged that there is variation in air-fuel ration between the cylinders, and the present process is immediately terminated without calculating and storing the learned correction coefficient $KMEM_i$.

On the other hand, if the answer to the question of the step S110 is affirmative (YES), i.e. if $|KACT\_F_i(n)| < KACT\_THRESH$ holds, it is judged that there is no variation in air-fuel ratio between the cylinders, and a storage location in the $KMEM_i$ memory for storing a value of the learned correction coefficient $KMEM_i$, which is to be calculated in the current loop, is set in the following steps 111 to 121. More specifically, NE and PB numbers $NE'_i(n-e)$ and $PB'_i(n-e)$ are set to define the storage location.

This setting is performed based on the engine speed NE and the intake pipe absolute pressure PBA obtained a predetermined dead time earlier. The reason for this is as follows; As described hereinbefore, the variation correction coefficient $KEAF_i$ is calculated based on the calculating filtered value $KACT\_F_i$ which is obtained by filtering the output KACT from the LAF sensor 14. Further, as is apparent from the steps 2, 10 and 11, the final fuel injection amount $TOUT_i$ is determined according to the engine speed NE and the intake pipe absolute pressure PBA. Dead time occurs between a time when fuel is injected based on the final fuel injection amount $TOUT_i$ and a time when the concentration of oxygen contained in exhaust gases generated by the combustion of the fuel is reflected in the output from the LAF sensor 14. As is apparent from the above, the output KACT from the LAF sensor 14 and the variation correction coefficient $KEAF_i$ calculated based on the output KACT correspond to the air-fuel ratio of exhaust gases emitted from the corresponding cylinder the dead time earlier. Therefore, it is required to make the variation correction coefficient $KEAF_i$ correspondent to the actual engine speed NE and intake pipe absolute pressure PBA obtained the dead time earlier. By setting the variation correction coefficient $KEAF_i$ as above, the learned correction coefficient $KMEM_i$ can be stored in proper association with the operating condition of the engine 3 while compensating for the influence of the dead time.

First, in the step 111, a symbol x and a symbol y are set to 1. Then, it is determined whether or not an e-cycle preceding engine speed NE(n−e) is larger than a simple average ({NEg(1)+NEg(2)}/2) of a first predetermined value NEg(1) and a second predetermined value NEg(2) (step 112).

The e-cycle preceding engine speed NE(n−e) is an engine speed NE detected e cycles before the present processing, i.e. at a time when an e-cycle preceding pulse of the TDK signal was generated, and stored in the RAM. Further, the value e corresponds to the above-mentioned dead time, and it is obtained by searching an e map (not shown) according to the engine speed NE and the intake pipe absolute pressure PBA. In the e map, the value e is set to a smaller value as the engine speed NE or the intake pipe absolute pressure PBA is higher. The reason for this is that as the engine speed NE or the intake pipe absolute pressure PBA is higher, the flow velocity of exhaust gases is higher, and hence the dead time is shorter. Further, the first and second predetermined values NEg(1) and NEg(2) are set in association with the NE number $NE'_i(n-e)$ such that the relationship of NEg(1)<NEg(2) holds.

If the answer to the question of the step 112 is negative (NO), i.e. if NE(n−e)≦{NEg(1)+NEg(2)}/2 holds, an NE number $NE'_i(n-e)$ corresponding to the first predetermined value NEg(1) is selected from the numerous NE numbers $NE'_i(n-e)$, and set as the NE number $NE'_i(n-e)$ defining the storage location for storing the learned correction coefficient $KMEM_i$ (step 113).

On the other hand, if the answer to the question of the step 112 is affirmative (YES), i.e. if NE(n−e)>{NEg(1)+NEg(2)}/2 holds, it is determined whether or not the e-cycle preceding engine speed NE(n−e) is larger than an average value ({NEg(x)+NEg(x+1)}/2) of an x-th predetermined value NEg(x) and an (x+1)-th predetermined value NEg(x+1) and smaller than an average value ({NEg(x+1)+NEg(x+2)}/2) of the (x+1)-th predetermined value NEg(x+1) and an (x+2)-th predetermined value NEg(x+2) (step 114). These x-th to (x+2)-th predetermined values NEg(x) to NEg(x+2) are set to a larger value as the value of the symbol x is larger, and set in association with the NE number $NE'_i(n-e)$ similarly to the first predetermined value NEg(1).

If the answer to the question of the step 114 is negative (NO), the value of the symbol x is incremented (step 115), and the step 114 is executed again. On the other hand, if the answer to the question of the step 114 is affirmative (YES), an NE number $NE'_i(n-e)$ corresponding to the (x+1)-th predetermined value NEg(x+1) is set as the NE number $NE'_i(n-e)$ defining the storage location for storing the learned correction coefficient $KMEM_i$ (step 116). The value of the symbol x is thus incremented until the answer to the question of the step 114 becomes affirmative (YES), whereby the x-th to (x+2)-th predetermined values NEg(x) to NEg(x+2) used in the step 114 are increased, from the first to third predetermined values NEg(1) to NEg(3), respectively. The NE number $NE'_i(n-e)$ is set as above in order to obtain an NE number $NE'_i(n-e)$ as close to the target NE number $NE'_i(n-e)$ as possible by interpolation since an NE number $NE'_i(n-e)$ exactly corresponding to the e-cycle preceding engine speed NE(n−e) is usually absent.

In the step 117 following the step 113 or 116, it is determined whether or not an e-cycle preceding absolute pressure PB(n−e) is larger than an average value ({PBg(1)+PBg(2)}/2) of a first predetermined value PBg(1) and a second predetermined value PBg(2) (step 117). The e-cycle preceding absolute pressure PB(n−e) is an intake pipe absolute pressure PBA detected e cycles before the present processing and stored in the RAM. Further, the first and second predetermined values PBg(1) and PBg(2) are set in association with the PB number $PB'_i(n-e)$ such that the relationship of PBg(1)<PBg(2) holds.

If the answer to the question of the step 117 is negative (NO), i.e. if PB(n−e)≦{PBg(1)+PBg(2)}/2 holds, a PB number $PB'_i(n-e)$ corresponding to the first predetermined value PBg(1) is selected from the numerous PB numbers $PB'_i(n-e)$, and set as the PB number $PB'_i(n-e)$ defining the storage location for storing the learned correction coefficient $KMEM_i$ (step 118).

On the other hand, if the answer to the question of the step 117 is affirmative (YES), i.e. if PB(n−e)>{PBg(1)+PBg(2)}/2 holds, it is determined whether or not the e-cycle preceding absolute pressure PB(n−e) is larger than an average value ({PBg(y)+PBg(y+1)}/2) of an y-th predetermined value PBg(y) and an (y+1)-th predetermined value PBg(y+1) and smaller than an average value ({PBg(y+1)+PBg(y+2)}/2) of the (y+1)-th predetermined value PBg(y+1) and an (y+2)-th predetermined value PBg(y+2) (step 119). These y-th to (y+2)-th predetermined values-PBg(x) to PBg(y+2) are set to a larger value as the value of the symbol y is larger, and set in association with the PB number $PB'_i(n-e)$ similarly to the first predetermined value PBg(1).

If the answer to the question of the step 119 is negative (NO), the value of the symbol y is incremented (step 120), and the step 119 is executed again. On the other hand, if the answer to the question of the step 119 is affirmative (YES), an PB number $PB'_i(n-e)$ corresponding to the (y+1)-th predetermined value PBg(y+1) is set as the PB number $PB'_i(n-e)$ defining the storage location for storing the learned correction coefficient $KMEM_i$ (step 121). The value of the symbol y is thus incremented until the answer to the question of the step 119 becomes affirmative (YES), whereby the y-th to (y+2)-th predetermined values PBg(y) to PBg(y+2) used in the step 119 are increased, from the first to third predetermined values PBg(1) to PBg(3), respectively. The PB number $PB'_i(n-e)$ is set as above in order to obtain a PB number $PB'_i(n-e)$ as close to the target PB number $PB'_i(n-e)$ as possible by interpolation since a PB number $PB'_i(n-e)$ exactly corresponding to the e-cycle preceding absolute pressure PB(n−e) is usually absent.

In a step 122 following the step 118 or 121, a second retrieval value $KMEMIP_i'$ is set using the NE number $NE'_i(n-e)$ set in the step 113 or 116 and the PB number $PB'_i(n-e)$ set in the step 118 or 121. More specifically, the learned correction coefficient $KMEM_i$ stored in the storage location of the $KMEM_i$ memory defined by the NE and PB numbers $NE'_i(n-e)$ and $PB'_i(n-e)$ is read out and set as the second retrieval value $KMEMIP_i'$ (n).

Figure 37:
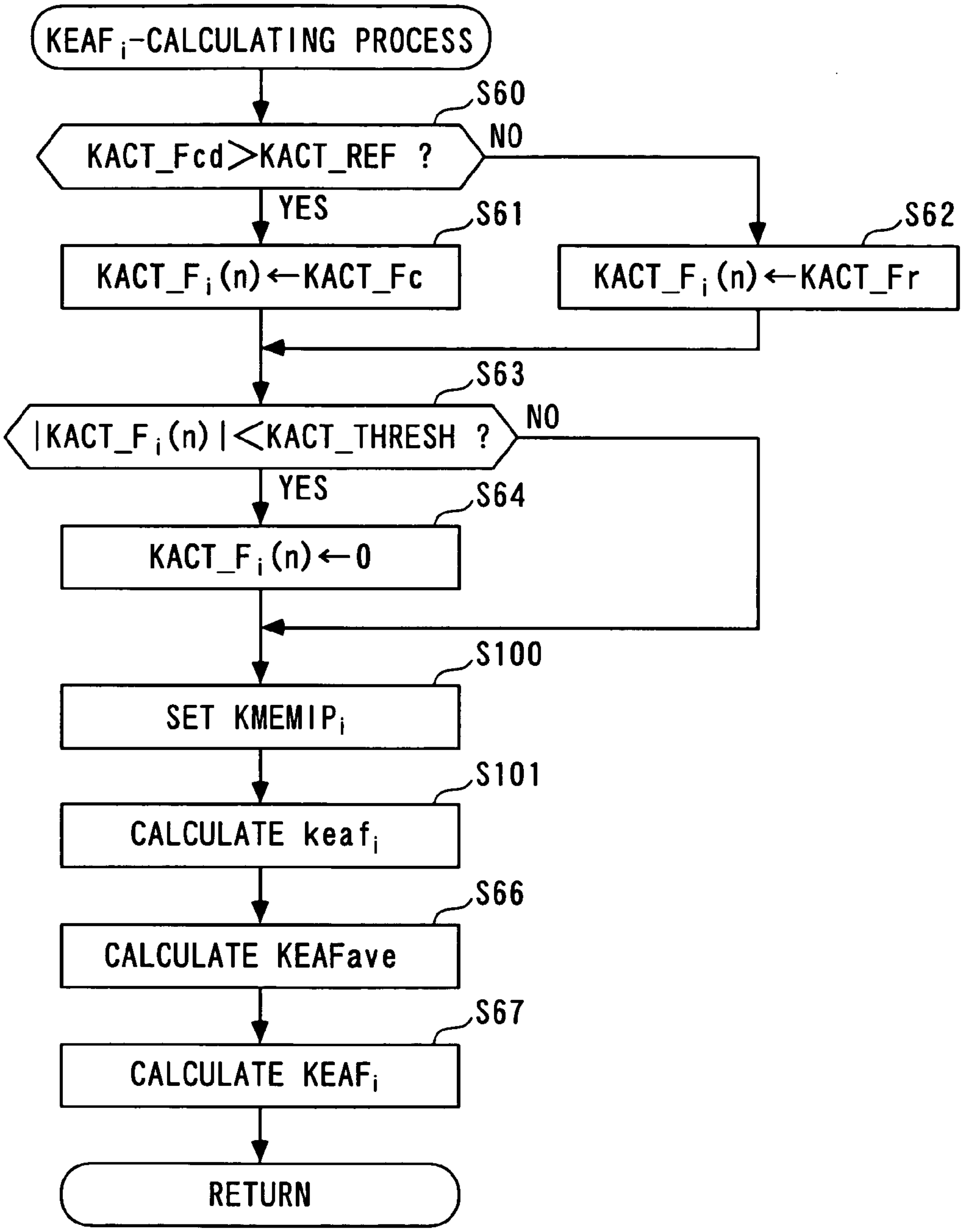
FIG. 37 is a flowchart of a process for calculating the variation-correcting coefficient, which is executed in a step in the air-fuel ratio control process in FIG. 36.

Then, the learned correction coefficient $KMEM_i(n)$ is calculated by the following equation (32), using the second retrieval value $KMEMIP_i'$ (n) set in the step 122 and the variation correction coefficient $KEAF_i$ calculated in the process shown in FIG. 37 (step 123):

$$KMEM_i(n)=Ks \cdot KEAF_i(n)+(1-Ks) \cdot KMEMIP_i'(n) \tag{32}$$

wherein Ks represents a predetermined learning speed coefficient, and is set such that 0<Ks≦1 holds.

Next, the calculated learned correction coefficient $KMEM_i(n)$ is stored in the storage location in the $KMEM_i$ memory, which is defined by the NE and PB numbers $NE'_i(n-e)$ and $PB'_i(n-e)$ (step 124) to update the stored value, followed by terminating the present process.

As described above, when it is judged that there is little variation in air-fuel ratio between the cylinders, the storage location of the learned correction coefficient $KMEM_i(n)$ is set based on the e-cycle preceding engine speed and absolute pressure NE(n−e) and PB(n−e) indicative of the operating condition of the engine 3 detected a dead time earlier to which the variation correction coefficient $KEAF_i(n)$ corresponds. Then, a learned correction coefficient $KMEM_i$ already stored in the set storage location is read out and set as the second retrieval value $KMEMIP_i'$ (n). Further, the learned correction coefficient $KMEM_i(n)$ is calculated based on the variation correction coefficient $KEAF_i(n)$ calculated in the current loop and the second retrieval value $KMEMIP_i'$ (n), and the calculated learned correction coefficient $KMEM_i(n)$ is stored in the set storage location to update the former learned correction coefficient $KMEM_i$.

As described above, according to the present embodiment, values of the learned correction coefficient $KMEM_i$ calculated when it is judged that there is little variation in air-fuel ratio between the cylinders are stored in association with respective corresponding operating conditions of the engine 3, and the final fuel injection amount $TOUT_i$ is calculated according to the first retrieval value $KMEMIP_i$ set to a value of the learned correction coefficient $KMEM_i$ selected from the stored values thereof, as one corresponding to the current operating condition of the engine 3. Therefore, it is possible to determine the final fuel injection amount $TOUT_i$ according to the operating condition of the engine 3, using the learned correction coefficient $KMEM_i$ most suitable for the actual operating condition of the engine 3. As a result, variation in air-fuel can be properly corrected according to the operating condition of the engine 3 and hence can be suppressed. Further, in storing a learned correction coefficient $KMEM_i$, the above-described dead time is taken into consideration, so that the learned correction coefficient $KMEM_i$ can be stored by associating the same with the operating condition of the engine 3 while compensating for the influence of the dead time.

Further, values of the learned correction coefficient $KMEM_i$ are stored in the $KMEM_i$ memory implemented by the EEPROM 2*a* as a non-volatile memory. This makes it possible to determine the final fuel injection amount $TOUT_i$ at the start of the engine 3, using one selected from the values of the learned correction coefficient $KMEM_i$ stored during operations of the engine 3 preceding the current operation. As a result, even when the LAF sensor 14 has not been activated after the start of the engine 3, variation in air-fuel ratio can be properly corrected and suppressed.

Furthermore, since the learned correction coefficient $KMEM_i$ is calculated according to the calculated variation correction coefficient $KEAF_i$ and the second retrieval value $KMEMIP_i'$ as a value of the learned correction coefficient $KMEM_i$ having been stored, it is possible to reduce the influence of noise contained in the first or second filtered value KACT_Fc or KACT_Fr on the learned correction coefficient $KMEM_i$. Moreover, the second retrieval value $KMEMIP_i'$ is a value of the learned correction coefficient $KMEM_i$ obtained in the same operating condition of the engine 3 that has been detected when the variation correction coefficient $KEAF_i$ has been calculated, i.e. in an operating condition substantially identical to an operating condition preceding the current operating condition by e cycles corresponding to the dead time, and is used for calculating the learned correction coefficient $KMEM_i$. As a result, the learned correction coefficient $KMEM_i$ can be properly calculated according to the operating condition of the engine 3.

Although in the present embodiment, the EEPROM 2*a* is used as storage means, this is not limitative, but any memory may be employed insofar as it is a non-volatile memory. For example, a flash memory or a RAM provided with a backup power source may be used. Further, in the present embodiment, the e-cycle preceding operating condition of the engine 3 is regarded as the operating condition that has been detected when the variation correction coefficient $KEAF_i$ has been calculated, but when the dead time is short, the operating condition of the engine 3 detected at the time of calculation of the variation correction coefficient KEAF may be used. Furthermore, similarly to the variation of the first embodiment, when the absolute value $|KACT\_F_i(n)|$ of the calculating filtered value is smaller than the threshold value KACT_THRESH, the variation correction coefficient $KEAF_i$ may be fixedly held at its immediately preceding value by omitting calculation and update of the variation correction coefficient $KEAF_i$. Further, similarly to the second embodiment, the variation correction coefficient $KEAF_i$ may be calculated based on the sum of the first and second filtered values KACT_Fc(m) and KACT_Fr(m).

Figure 32:
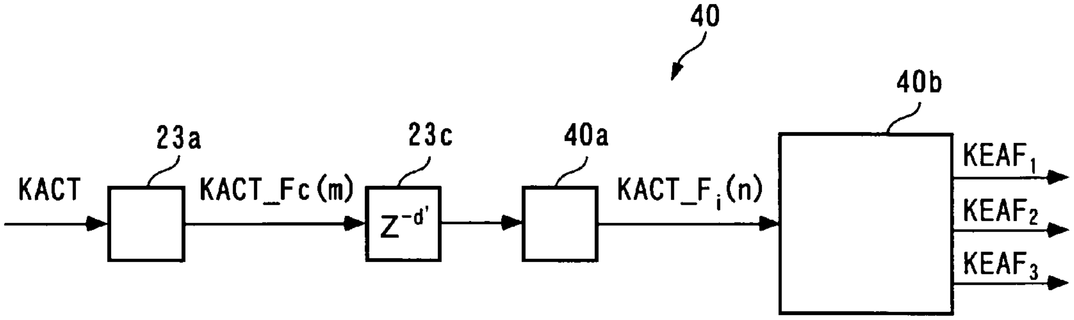
FIG. 32 is a block diagram of a variation-correcting section in a case where the present invention is applied to an air-fuel ratio control system for an in-line three-cylinder engine.

Although in the above-described embodiments, the present invention is applied to an in-line four-cylinder four-stroke engine, this is not limitative, but the present invention can be applied to other types of engine having a plurality of cylinders, such as an in-line three-cylinder four-stroke engine or a V-type six-cylinder four-stroke engine having a pair of cylinder banks each comprised of three cylinders. In the following, a description will be given of a case where the first embodiment is applied to an in-line three-cylinder four-stroke engine. An air-fuel ratio control system in this case is distinguished from the air-fuel ratio control system 1 of the first embodiment only by the configuration of a variation-correcting section 40, and hence the different points will be mainly described with reference to FIG. 32. It should be noted that in FIG. 32, component elements of the variation-correcting section 40 identical to those of the variation-correcting section 23 in the first embodiment are designated by identical reference numerals.

It was confirmed through analysis of the frequency of the output KACT from the LAF sensor 14 in the in-line three-cylinder four-stroke engine that when there is variation in air-fuel ratio between the cylinders, the PSD in a predetermined frequency band synchronous with one combustion cycle is increased, whereas when there is no variation in air-fuel, no such an event occurs. This predetermined frequency is equal to the aforementioned first frequency fr1. This is because similarly to the present three-cylinder engine, the engine 3 in the first embodiment is a four-stroke engine in which each combustion cycle completes by four strokes of a piston, i.e. by two rotations of a crankshaft, irrespective of the number of cylinders. Further, it was confirmed that in the three-cylinder engine, when there is variation in air-fuel ratio between the cylinders, the PSD of the output KACT from the LAF sensor 14 is not increased in the band of the second frequency fr2 as distinct from the engine 3 described hereinabove. Therefore, the variation-correcting section 40 is distinguished from the variation-correcting section 23 in the first embodiment in that only the cycle filter 23*a* is used as a filter for filtering the output KACT from the LAF sensor 14, and the rotation filter 23*b* is omitted. Thus, the variation-correcting section 40 is simpler in configuration than the variation-correcting section 23 in the first embodiment.

Further, similarly to the experiment described hereinbefore, air-fuel ratios $KACT_1$ to $KACT_3$ of the exhaust gasses from the three cylinders were simulatively generated as triangular wave-shaped first to third simulative outputs $KACTMI_1$ to $KACTMI_3$, each of which is output every combustion cycle, and the total of these outputs was input to the cycle filter 23*a*, as a simulative output KACTMI from the LAF sensor 14. Then, waveforms described below were obtained as the first filtered value KACT_Fc.

Figure 33A:
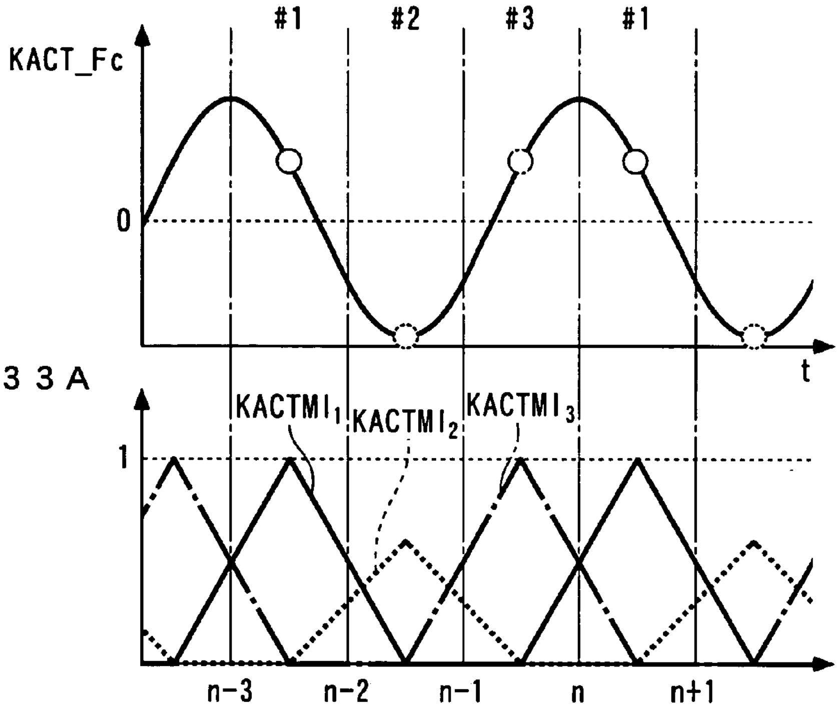

Although not shown, when the first to third simulative outputs $KACTMI_{1-3}$ were equal to each other, the first filtered value KACT_Fc became equal to 0. Further, as shown in FIG. 33A, in a variation pattern in which the first and third simulative outputs $KACTMI_1$ and $KACTMI_3$ were equal to each other, and the second simulative output $KACTMI_2$ was smaller than the first simulative output $KACTMI_1$, the first filtered value KACT_Fc exhibited a sinusoidal waveform in which the first filtered value KACT_Fc changes across a value of 0 into the positive and negative regions with a relatively large amplitude, in a cycle equal to one combustion cycle. In this case, the first filtered value KACT_Fc became positive at the respective times of the first and third simulative outputs $KACTMI_1$ and $KACTMI_3$ being input, and became negative at the time of the second simulative output $KACTMI_2$ being input. Thus, it was confirmed that the first filtered value KACT_Fc not only clearly represents the relationship in air-fuel ratio between the cylinders, but also indicates the presence or absence of variation in air-fuel ratio between the cylinders by the presence or absence of its amplitude.

Figure 33B:
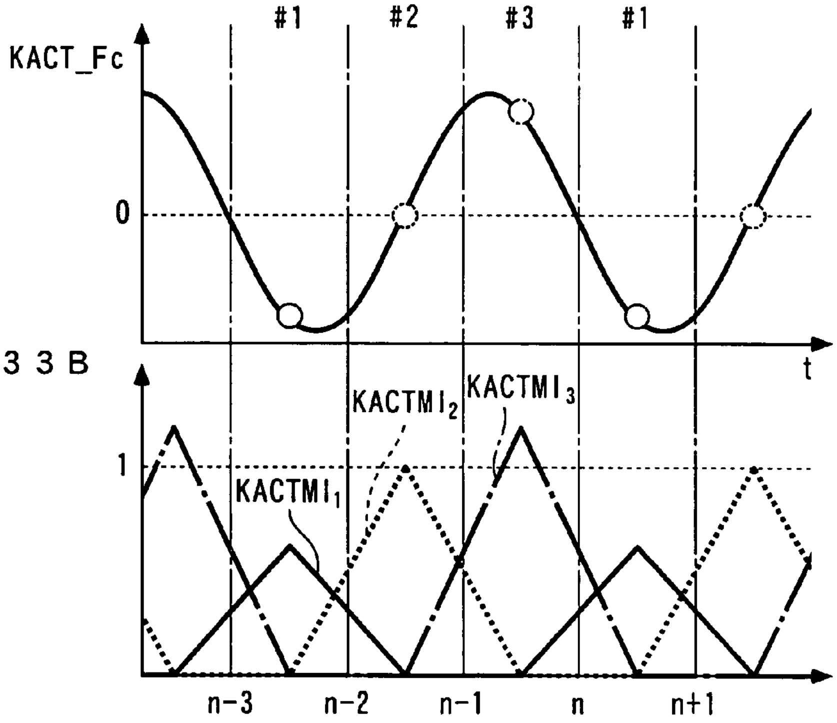

Further, as shown in FIG. 33B, in a variation pattern in which the relationship of the first simulative output $KACTMI_1$<the second simulative output $KACTMI_2$<the third simulative output $KACTMI_3$ holds, the first filtered value KACT_Fc exhibited a sinusoidal waveform with a relatively large amplitude, in a cycle equal to one combustion cycle, similarly to the case described above. In this case, the first filtered value KACT_Fc became negative at the time of the first simulative output $KACTMI_1$ being input, became equal to 0 at the time of the second simulative output $KACTMI_2$ being input, and became positive at the time of the third simulative output $KACTMI_3$ being input. Thus, also in this case, it was confirmed that the first filtered value KACT_Fc not only clearly represents the relationship in air-fuel ratio between the cylinders, but also indicates the presence or absence of variation in air-fuel ratio between the cylinders by the presence or absence of a significant amplitude thereof. In other variation patterns, the first filtered value KACT_Fc exhibited similar characteristics.

As described above, in any variation pattern, the first filtered value KACT_Fc clearly represents the relationship in air-fuel ratio between the cylinders, and indicates the presence or absence of variation in air-fuel ratio between the cylinders by the presence or absence of a significant amplitude thereof. For this reason, similarly to the calculating filtered value-determining section 23*h*, a calculating filtered value-determining section 40*a* (correction coefficient-fixing means) of the variation-correcting section 40 determines the calculating filtered value $KACT\_F_i(n)$ based on the first filtered value KACT_Fc(m) output from the first delay element 23*c*, and delivers the determined calculating filtered value $KACT\_F_i(n)$ to a variation correction coefficient-calculating section 40*b* (correction parameter-calculating means, average value-calculating means, and correction coefficient-calculating means). Further, in the variation correction coefficient-calculating section 40*b*, the variation correction coefficient $KEAF_i$ is calculated based on the input calculating filtered value $KACT\_F_i(n)$, using the equations (24) to (26).

As described above, the variation correction coefficient $KEAF_i$ is calculated based on the first filtered value KACT_Fc alone. Therefore, also in this case, the variation correction coefficient $KEAF_i$ is calculated based on the first filtered value KACT_Fc which clearly represents the relationship in air-fuel ratio between the cylinders, and properly indicates the presence or absence of variation in air-fuel ratio between the cylinders by the presence or absence of a significant amplitude thereof, so that the same advantageous effects as provided by the first embodiment can be obtained.

It should be noted that in the case of the V-type six-cylinder four-stroke engine, each of the pair of cylinder banks may be regarded as an in-line three-cylinder engine, and a LAF sensor may be provided in the collecting section of the exhaust manifold of each cylinder bank, whereby the variation correction coefficients KEAFi may be calculated, as described above, based on filtered values obtained by filtering outputs from the respective LAF sensors by the cycle filters 23*a*.

As described above, of the output from a LAF sensor, the number of pulsation frequencies indicative of the presence or absence of variation in air-fuel ratio between cylinders varies with the number of cylinders, and even between engines having the same number of cylinders, the pulsation frequencies that indicate the presence or absence of variation in air-fuel ratio between the cylinders differ in magnitude, depending on the number of strokes required to complete one combustion cycle. For this reason, pulsation frequencies indicative of the presence or absence of variation in air-fuel ratio between cylinders are determined by experiment in advance, and if a plurality of pulsation frequencies are obtained which indicate the presence or absence of variation in air-fuel ratio, a plurality of bandpass filters are provided for filtration such that the pulsation frequencies are allowed to pass. The cylinder-by-cylinder variation correction coefficient KEAFi calculated based on the filtered values, as described hereinbefore, is used for air-fuel ratio control for each corresponding cylinder. This makes it possible to obtain the same advantageous effects as provided by the above-described embodiments.

Although in the embodiments described above, the cycle filter 23*a* and the rotation filter 23*b* are implemented by IIR filters, they may be formed by FIR filters. In this case, as distinct from the IIR filters, the FIR filters calculate filtered values without using filtered values calculated in preceding loops, it is possible to reduce the computational load on the air-fuel ratio control system 1.

Further, although in the embodiments described above, the variation correction coefficient provisional value $keaf_i$ for use in calculation of the variation correction coefficient $KEAF_i$ is calculated using the PID control algorithm, this is not limitative, but another control algorithm may be used in place of the PID control algorithm. For example, a response-specifying control algorithm (sliding mode control algorithm or back-stepping control algorithm) expressed by the equations (28) to (30) in FIG. 34 may be employed to calculate the variation correction coefficient provisional value $keaf_i$. In this case, it is possible to calculate the variation correction coefficient $KEAF_i$ such that overshooting is not caused in the converging behavior of the current value $KACT\_F_i(n)$ of the calculating filtered value to the fourth preceding value $KACT\_F_i(n-4)$. As a result, the overshooting or an oscillatory behavior of the variation correction coefficient $KEAF_i$ can be prevented, and therefore it is possible to avoid the influence of such a behavior of the variation correction coefficient $KEAF_i$ on the correction by the feedback correction coefficient KSTR.

Furthermore, the method of calculating the basic fuel injection amount TIBS is not limited to the example in the above-described embodiments, in which the basic fuel injection amount TIBS is calculated by searching a map according to the intake pipe absolute pressure PBA and the engine speed NE, but a method may be employed in which an air flow sensor 50 for detecting an intake air amount Gair is provided in the intake pipe 4 as indicated by phantom lines in FIG. 1, and the basic fuel injection amount TIBS is calculated by searching a table according to the intake air amount Gair detected by the air flow sensor 50.

Moreover, although in the embodiments described above, the feedback correction coefficient KSTR is calculated based on the model parameter vector $\theta_i$ of the first cylinder #1 by the STR 22, this is not limitative, but one of the model parameter vectors $\theta_{2-4}$ of the second to fourth cylinders #2 to #4 may be used in place of the model parameter vector $\theta_i$ to calculate the feedback correction coefficient KSTR. Further, although in the above-described embodiments, the present invention is applied to the air-fuel ratio control system for the engine 3 for an automotive vehicle, this is not limitative, but the present invention can be applied to an air-fuel ratio control system for a ship propulsion engine, including an outboard motor which has a vertically-disposed crankshaft.

It is further understood by those skilled in the art that the foregoing are preferred embodiments of the present invention, and that various changes and modifications may be made without departing from the spirit and scope thereof.

What is claimed is:

1. An air-fuel ratio control system for an internal combustion engine, which controls an amount of fuel to be supplied to a plurality of cylinders on a cylinder-by-cylinder basis, thereby controlling an air-fuel ratio of a mixture supplied to each of the cylinders, comprising:

an air-fuel ratio sensor that outputs a detection signal indicative of an air-fuel ratio of exhaust gases which have been emitted from the cylinders and merged;

a bandpass filter that filters the detection signal output from said air-fuel ratio sensor, such that a component of the detection signal in a predetermined frequency band is allowed to pass therethrough; and fuel amount-determining means for determining the amount of the fuel to be supplied, on a cylinder-by-cylinder basis, according to an output from said bandpass filter such that an amplitude of the output from said bandpass filter becomes equal to a predetermined value.

2. An air-fuel ratio control system as claimed in claim 1, wherein said bandpass filter comprises a plurality of bandpass filters arranged in parallel with each other for filtering the detection signal from said air-fuel ratio sensor such that components thereof in a plurality of frequency bands different from each other are allowed to pass through the respective bandpass filters, the air-fuel ratio control system further comprising filter-selecting means for selecting one of the bandpass filters based on an output from at least one of the bandpass filters, and wherein said fuel amount-determining means determines the amount of the fuel to be supplied, according to the output from the selected one of the bandpass filters such that the amplitude of the output from the one of the bandpass filters becomes equal to the predetermined value.

3. An air-fuel ratio control system as claimed in claim 2, further comprising weighted average value-calculating means for calculating a weighted average value of an output from each of the bandpass filters by calculating a weighted average of an absolute value of an immediately preceding value of the weighted average value and an absolute value of a current value of the output from the bandpass filter, and wherein said filter-selecting means selects the one of the bandpass filters based on at least one of the calculated weighted average values.

4. An air-fuel ratio control system as claimed in claim 1, wherein said bandpass filter comprises a plurality of bandpass filters arranged in parallel with each other for filtering the detection signal from said air-fuel ratio sensor such that components thereof in a plurality of frequency bands different from each other are allowed to pass through the respective bandpass filters, the air-fuel ratio control system further comprising total-calculating means for calculating a total of outputs from the bandpass filters, and wherein said fuel amount-determining means determines the amount of the fuel to be supplied, according to the calculated total, such that the total becomes equal to the predetermined value.

5. An air-fuel ratio control system as claimed in claim 1, wherein said fuel amount-determining means determines the amount of the fuel to be supplied, in a predetermined cycle, the air-fuel ratio control system further comprising sampling means for sampling the detection signal from said air-fuel ratio sensor in a shorter cycle than the predetermined cycle and outputting the sampled detection signal to said bandpass filter.

6. An air-fuel ratio control system as claimed in claim 1, further comprising:

crank angle-detecting means for detecting a crank angle of the engine, and dead time-setting means for setting a dead time from emission of the exhaust gasses from the cylinders to arrival of the exhaust gasses at said air-fuel ratio sensor, with respect to the crank angle, and wherein said fuel amount-determining means determines the amount of the fuel to be supplied, according to the output from said bandpass filter which is produced by filtering the detection signal from the air-fuel ratio sensor which is generated at a time of lapse of the set dead time after emission of exhaust gases from the cylinder.

7. An air-fuel ratio control system as claimed in claim 6, further comprising operating condition-detecting means for detecting an operating condition of the engine, and wherein said dead time-setting means sets the dead time according to the detected operating condition of the engine.

8. An air-fuel ratio control system as claimed in claim 1, further comprising correction parameter-calculating means for calculating a correction parameter for correcting variation in air-fuel ratio between the cylinders, on a cylinder-by-cylinder basis, based on the output from said bandpass filter, average value-calculating means for calculating an average value of the correction parameters calculated, on a cylinder-by-cylinder basis, and correction coefficient-calculating means for calculating a cylinder-by-cylinder correction coefficient by dividing the correction parameter by the calculated average value of the correction parameters, and wherein said fuel amount-determining means determines the amount of the fuel to be supplied, according to the calculated correction coefficient.

9. An air-fuel ratio control system as claimed in claim 8, further comprising operation characteristic-determining means for determining deviation from a predetermined operation characteristic of fuel supply systems for supplying fuel to the cylinders, on a cylinder-by-cylinder basis, based on the correction coefficient.

10. An air-fuel ratio control system as claimed in claim 1, further comprising:

correction coefficient-calculating means for calculating a correction coefficient for correcting variation in air-fuel ratio between the cylinders based on the output from said bandpass filter, and correction coefficient-fixing means operable, when an absolute value of the output from said bandpass filter becomes smaller than a predetermined threshold value, for fixing the correction coefficient to a value of the correction coefficient calculated by said correction coefficient-calculating means immediately before the absolute value of the output from said bandpass filter has become smaller than the predetermined threshold value, and wherein said fuel amount-determining means determines the amount of the fuel to be supplied, according to the correction coefficient.

11. An air-fuel ratio control system as claimed in claim 1, further comprising:

learned correction coefficient-calculating means for calculating a learned correction coefficient for correcting variation in air-fuel ratio between the cylinders based on the output from said bandpass filter, when an absolute value of the output from said bandpass filter is smaller than a predetermined threshold value, operating condition-detecting means for detecting an operating condition of the engine, and storage means for storing the calculated learned correction coefficient in association with the detected operating condition of the engine, and wherein said fuel amount-determining means determines the amount of the fuel to be supplied, according to one of the learned correction coefficients stored in said storage means which corresponds to a current detected operating condition of the engine.

12. An air-fuel ratio control system as claimed in claim 11, wherein said storage means is a non-volatile memory.

13. An air-fuel ratio control system as claimed in claim 12, wherein said learned correction coefficient-calculating means comprises correction coefficient-calculating means for calculating a correction coefficient based on the output from said bandpass filter, and calculates the learned correction coefficient according to the calculated correction coefficient and the learned correction coefficient stored in said storage means in association with the same operating condition of the engine that has been detected when the correction coefficient has been calculated.

14. An air-fuel ratio control system as claimed in claim 11, wherein said learned correction coefficient-calculating means comprises correction coefficient-calculating means for calculating a correction coefficient based on the output from said bandpass filter, and calculates the learned correction coefficient according to the calculated correction coefficient and the learned correction coefficient stored in said storage means in association with the same operating condition of the engine that has been calculated.

15. An engine control unit including a control program for causing a computer to control an air-fuel ratio of a mixture supplied to a plurality of cylinders of an internal combustion engine, by controlling an amount of fuel to be supplied to the cylinders, on a cylinder-by-cylinder basis, wherein the control program causes the computer to detect an air-fuel ratio of exhaust gases which have been emitted from the cylinders and merged, filter the detection signal indicative of the detected air-fuel ratio, such that a component of the detection signal in a predetermined frequency band is allowed to pass, and determine the amount of the fuel to be supplied, on a cylinder-by-cylinder basis, according to a filtered signal obtained by filtering the detection signal, such that an amplitude of the filtered signal becomes equal to a predetermined value.

16. An engine control unit as claimed in claim 15, wherein the filtering is performed by a plurality of filterings parallel with each other for allowing passage of components of the filtered signal in a plurality of frequency bands different from each other, wherein the control program further causes the computer to select one of the filterings based on at least one of filtered signals obtained by the respective filterings, and determine the amount of the fuel to be supplied, according to the selected one of filtered signals, such that the amplitude of the selected one of the filtered signals becomes equal to the predetermined value.

17. An engine control unit as claimed in claim 16, wherein the control program causes the computer to further calculate a weighted average value of the filtered signals by calculating a weighted average of an absolute value of an immediately preceding value of the weighted average value and an absolute value of a current value of the filtered signal, and select the one of the filtered signals based on at least one of the calculated weighted average values.

18. An engine control unit as claimed in claim 15, wherein the filtering is performed by a plurality of filterings parallel with each other for allowing passage of components of the filtered signal in a plurality of frequency bands different from each other, wherein the program causes the computer to further calculating a total of the filtered signals obtained by the respective filterings, and determine the amount of the fuel to be supplied, according to the calculated total such that the total becomes equal to the predetermined value.

19. An engine control unit as claimed in claim 15, wherein the control program causes the computer to determine the amount of fuel to be supplied, in a predetermined cycle, and sample the detection signal to be filtered, in a shorter cycle than the predetermined cycle.

20. An engine control unit as claimed in claim 15, wherein the engine includes crank angle-detecting means for detecting a crank angle of the engine, and an air-fuel ratio sensor for detecting the air-fuel ratio, and wherein the control program causes the computer to set a dead time from emission of the exhaust gasses from the cylinders to arrival of the exhaust gasses at the air-fuel ratio sensor, with respect to the crank angle, and determine the amount of the fuel to be supplied, according to the filtered signal which is produced by filtering the detection signal from the air-fuel ratio sensor which is generated at a time of lapse of the set dead time after emission of exhaust gases from the cylinder.

21. An engine control unit as claimed in claim 20, wherein the control program causes the computer to detect an operating condition of the engine, and set the dead time according to the detected operating condition of the engine.

22. An engine control unit as claimed in claim 15, wherein the control program causes the computer to further calculate a correction parameter for correcting variation in air-fuel ratio between the cylinders, on a cylinder-by-cylinder basis, based on the filtered signal, calculate an average value of the correction parameters calculated, on a cylinder-by-cylinder basis, calculate a cylinder-by-cylinder correction coefficient by dividing the correction parameter by the calculated average value of the correction parameters, and determine the amount of the fuel to be supplied, according to the calculated correction coefficient.

23. An engine control unit as claimed in claim 22, wherein the control program further causes the computer to determine deviation from a predetermined operation characteristic of fuel supply systems for supplying fuel to the cylinders, on a cylinder-by-cylinder basis, based on the correction coefficient.

24. An engine control unit as claimed in claim 15, wherein the control program further causes the computer to calculate a correction coefficient for correcting variation in air-fuel ratio between the cylinders based on the filtered signal, fix, when an absolute value of the filtered signal becomes smaller than a predetermined threshold value, the correction coefficient to a value of the correction coefficient calculated when the control program causes the computer to calculate the correction coefficient immediately before the absolute value of the filtered signal has become smaller than the predetermined threshold value, and determine the amount of the fuel to be supplied, according to the correction coefficient.

25. An engine control unit as claimed in claim 15, wherein the control program further causes the computer to calculate a learned correction coefficient for correcting variation in air-fuel ratio between the cylinders based on the filtered signal, when an absolute value of the filtered signal is smaller than a predetermined threshold value, detect an operating condition of the engine, store the calculated learned correction coefficient in association with the detected operating condition of the engine, and determine the amount of the fuel to be supplied, according to one of the learned correction coefficients stored which corresponds to a current detected operating condition of the engine.

26. An engine control unit as claimed in claim 25, wherein the control program causes the computer to store the calculated learned correction coefficient in a non-volatile memory.

27. An engine control unit as claimed in claim 26, wherein the control program causes the computer to calculate a correction coefficient based on the filtered signal, and calculate the learned correction coefficient according to the calculated correction coefficient and the learned correction coefficient stored when the control program caused the computer to store the learned correction coefficient in association with the same operating condition of the engine has been detected when the correction coefficient has been calculated.

28. An engine control unit as claimed in claim 25, wherein the control program causes the computer to calculate a correction coefficient based on the filtered signal, and calculate the learned correction coefficient according to the calculated correction coefficient and the learned correction coefficient stored when the control program caused the computer to store the learned correction coefficient in association with the same operating condition of the engine has been detected when the correction coefficient has been calculated.

29. A method of controlling an air-fuel ratio of a mixture supplied to each of a plurality of cylinders of an internal combustion engine, by controlling an amount of fuel to be supplied to the cylinders, on a cylinder-by-cylinder basis, comprising the steps of:

detecting an air-fuel ratio of exhaust gases which have been emitted from the cylinders and merged;

filtering the detection signal indicative of the detected air-fuel ratio, such that a component of the detection signal in a predetermined frequency band is allowed to pass; and determining the amount of the fuel to be supplied, on a cylinder-by-cylinder basis, according to a filtered signal obtained by filtering the detection signal, such that an amplitude of the filtered signal becomes equal to a predetermined value.

30. A method as claimed in claim 29, wherein the filtering is performed by a plurality of filterings parallel with each other for allowing passage of components of the filtered signal in a plurality of frequency bands different from each other, the method further comprising the step of selecting one of the filterings based on at least one of filtered signals obtained by the respective filterings, and wherein the step of determining the amount of fuel to be supplied includes determining the amount of the fuel to be supplied, according to the selected one of the filtered signals, such that the amplitude of the selected one of the filtered signals becomes equal to the predetermined value.

31. A method as claimed in claim 30, further comprising the step of calculating a weighted average value of the filtered signals by calculating a weighted average of an absolute value of an immediately preceding value of the weighted average value and an absolute value of a current value of the filtered signal, and wherein the step of selecting the filtered signal includes selecting the one of the filtered signals based on at least one of the calculated weighted average values.

32. A method as claimed in claim 29, wherein the filtering is performed by a plurality of filterings parallel with each other for allowing passage of components of the filtered signal in a plurality of frequency bands different from each other, the method further comprising the step of calculating a total of the filtered signals obtained by the respective filterings, and wherein the step of determining the amount of fuel to be supplied includes determining the amount of the fuel to be supplied, according to the calculated total such that the total becomes equal to the predetermined value.

33. A method as claimed in claim 29, wherein the step of determining the amount of fuel to be supplied includes determining the amount of fuel to be supplied, in a predetermined cycle, the method further comprising the step of sampling the detection signal to be filtered, in a shorter cycle than the predetermined cycle.

34. A method as claimed in claim 29, wherein the engine includes crank angle-detecting means for detecting a crank angle of the engine, and an air-fuel ratio sensor for detecting the air-fuel ratio, the method comprising the step of setting a dead time from emission of the exhaust gasses from the cylinders to arrival of the exhaust gasses at the air-fuel ratio sensor, with respect to the crank angle, and wherein the step of determining the amount of fuel to be supplied includes determining the amount of the fuel to be supplied, according to the filtered signal which is produced by filtering the detection signal from the air-fuel ratio sensor which is generated at a time of lapse of the set dead time after emission of exhaust gases from the cylinder.

35. A method as claimed in claim 34, further comprising the step of detecting an operating condition of the engine, and wherein the step of setting the dead time includes setting the dead time according to the detected operating condition of the engine.

36. A method as claimed in claim 29, further comprising the steps of:

calculating a correction parameter for correcting variation in air-fuel ratio between the cylinders, on a cylinder-by-cylinder basis, based on the filtered signal, calculating an average value of the correction parameters calculated, on a cylinder-by-cylinder basis, and calculating a cylinder-by-cylinder correction coefficient by dividing the correction parameter by the calculated average value of the correction parameters, and wherein the step of determining the amount of fuel to be supplied includes determining the amount of the fuel to be supplied, according to the calculated correction coefficient.

37. A method as claimed in claim 36, further comprising the step of determining deviation from a predetermined operation characteristic of fuel supply systems for supplying fuel to the cylinders, on a cylinder-by-cylinder basis, based on the correction coefficient.

38. A method as claimed in claim 29, further comprising the steps of:

calculating a correction coefficient for correcting variation in air-fuel ratio between the cylinders based on the filtered signal, and fixing, when an absolute value of the filtered signal becomes smaller than a predetermined threshold value, the correction coefficient to a value of the correction coefficient calculated in the step of calculating the correction coefficient immediately before the absolute value of the filtered signal has become smaller than the predetermined threshold value, and wherein the step of determining the amount of fuel to be supplied includes determining the amount of the fuel to be supplied, according to the correction coefficient.

39. A method as claimed in claim 29, further comprising the steps of:

calculating a learned correction coefficient for correcting variation in air-fuel ratio between the cylinders based on the filtered signal, when an absolute value of the filtered signal is smaller than a predetermined threshold value, detecting an operating condition of the engine, and storing the calculated learned correction coefficient in association with the detected operating condition of the engine, and wherein the step of determining the amount of fuel to be supplied includes determining the amount of the fuel to be supplied, according to one of the learned correction coefficients stored which corresponds to a current detected operating condition of the engine.

40. A method as claimed in claim 39, wherein the storing step includes storing the calculated learned correction coefficient in a non-volatile memory.

41. A method as claimed in claim 40, wherein the step of calculating the learned correction coefficient comprises the steps of:

calculating a correction coefficient based on the filtered signal, and calculating the learned correction coefficient according to the calculated correction coefficient and the learned correction coefficient stored in the step of storing the learned correction coefficient in association with the same operating condition of the engine that has been detected when the correction coefficient has been calculated.

42. A method as claimed in claim 39, wherein the step of calculating the learned correction coefficient comprises the steps of:

calculating a correction coefficient based on the filtered signal, and calculating the learned correction coefficient according to the calculated correction coefficient and the learned correction coefficient stored in the step of storing the learned correction coefficient in association with the same operating condition of the engine that has been detected when the correction coefficient has been calculated.

* * * * *